United States Patent
Aoyama

(10) Patent No.: US 8,224,124 B2
(45) Date of Patent: Jul. 17, 2012

(54) IMAGE PROCESSING DEVICE AND IMAGE PROCESSING METHOD, AND PROGRAM

(75) Inventor: Koji Aoyama, Saitama (JP)

(73) Assignee: Sony Corporation, Tokyo (JP)

(*) Notice: Subject to any disclaimer, the term of this patent is extended or adjusted under 35 U.S.C. 154(b) by 393 days.

(21) Appl. No.: 12/490,621

(22) Filed: Jun. 24, 2009

(65) Prior Publication Data

US 2009/0324092 A1 Dec. 31, 2009

(30) Foreign Application Priority Data

Jun. 27, 2008 (JP) ................. P2008-168055

(51) Int. Cl.
*G06K 9/48* (2006.01)
(52) U.S. Cl. ........................ 382/298; 382/199
(58) Field of Classification Search ............ 382/100, 382/199, 298; 345/660
See application file for complete search history.

(56) References Cited

U.S. PATENT DOCUMENTS

| | | | | |
|---|---|---|---|---|
| 6,456,745 | B1* | 9/2002 | Bruton et al. | 382/298 |
| 6,829,016 | B2* | 12/2004 | Hung | 348/581 |
| 7,421,152 | B2* | 9/2008 | Kang | 382/298 |
| 7,733,405 | B2* | 6/2010 | Van Dyke et al. | 348/333.11 |
| 8,068,685 | B2* | 11/2011 | Kim et al. | 382/250 |
| 2003/0016884 | A1 | 1/2003 | Altunbasak et al. | |
| 2007/0097261 | A1* | 5/2007 | Smith et al. | 348/445 |
| 2007/0223835 | A1 | 9/2007 | Yamada et al. | |
| 2010/0149216 | A1* | 6/2010 | Dutta et al. | 345/660 |

FOREIGN PATENT DOCUMENTS

| | | |
|---|---|---|
| JP | 2005-012641 | 1/2005 |
| JP | 2007-028460 | 2/2007 |
| JP | 2007-266684 | 10/2007 |
| JP | 2008-503134 A | 1/2008 |
| JP | 2008-124901 | 5/2008 |

OTHER PUBLICATIONS

European Search Report dated Nov. 2, 2009, in EP 09 25 1443.
Office Action issued in Japanese Patent Application No. 2008-168055 on Jan. 10, 2012 (5 pages).

* cited by examiner

*Primary Examiner* — Stephen R Koziol
(74) *Attorney, Agent, or Firm* — Finnegan, Henderson, Farabow, Garrett & Dunner, L.L.P.

(57) ABSTRACT

An image processing device includes: a rescaling unit configured to obtain an image subjected to scaling, and subject the image to rescaling with the scaling rate of the image; a block border information detecting unit configured to detect a block size and block border position from the image after rescaling; and a detected information correcting unit configured to correct the block size and the block border position detected by the block border information detecting unit based on the scaling rate.

6 Claims, 40 Drawing Sheets

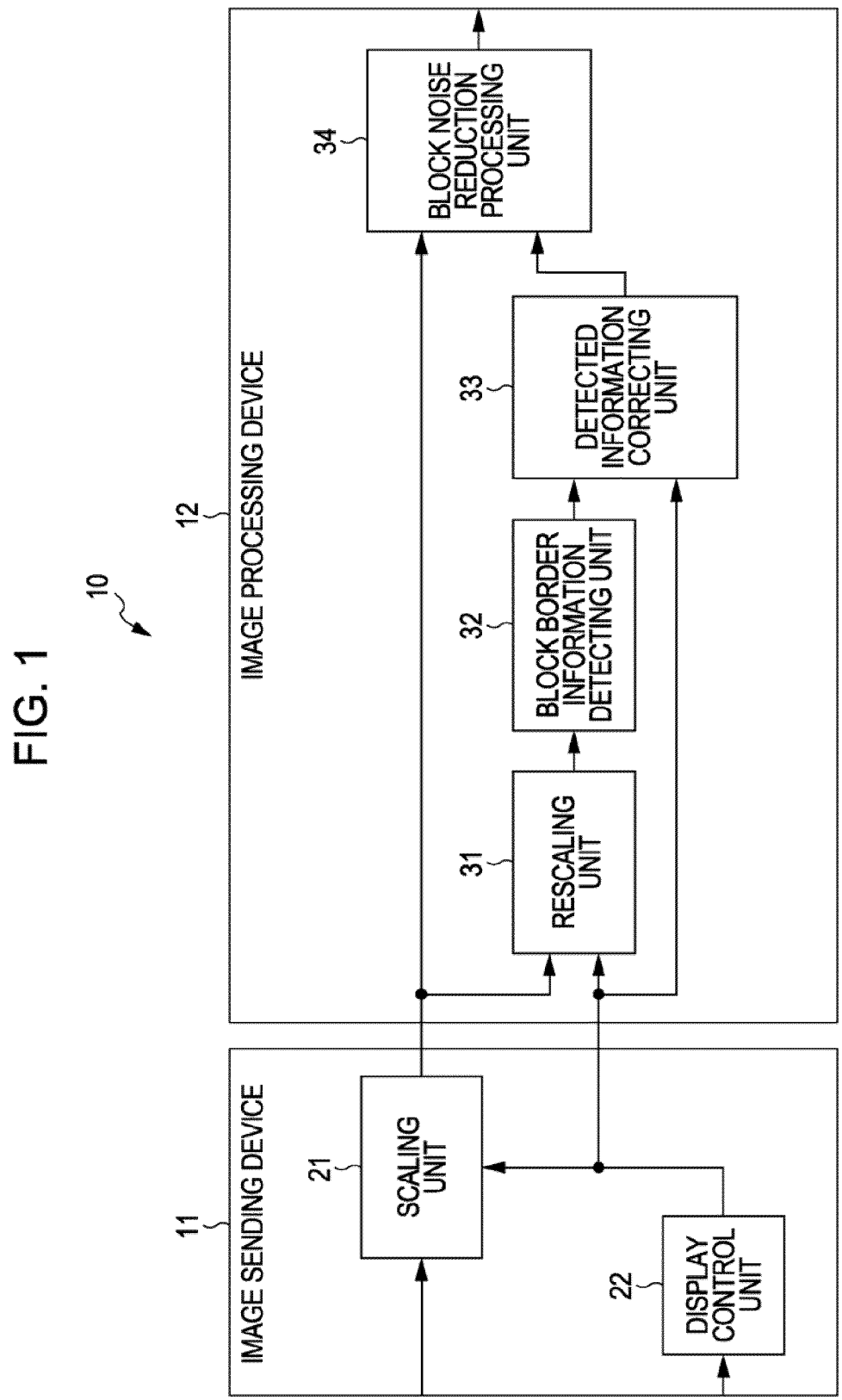

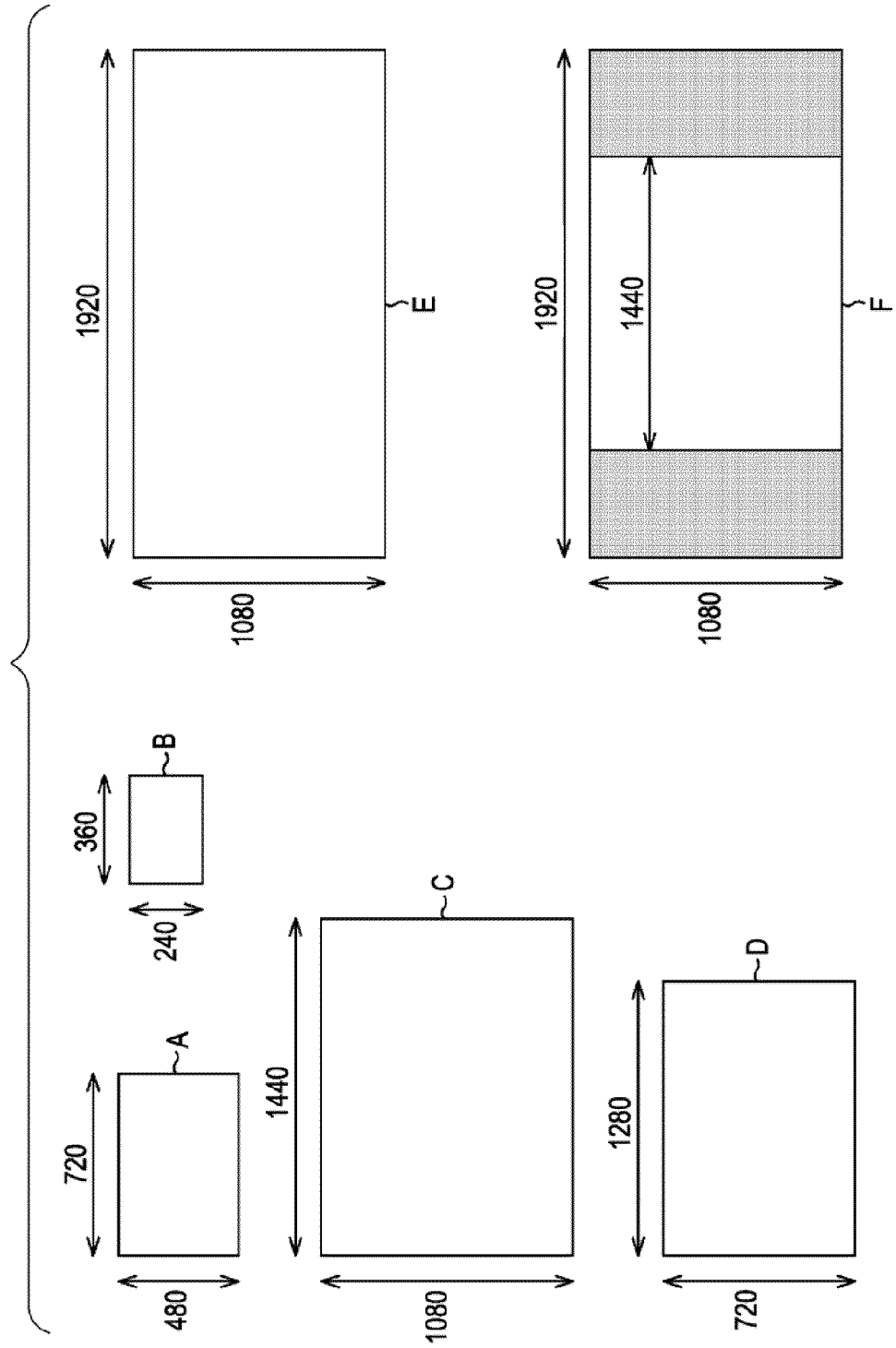

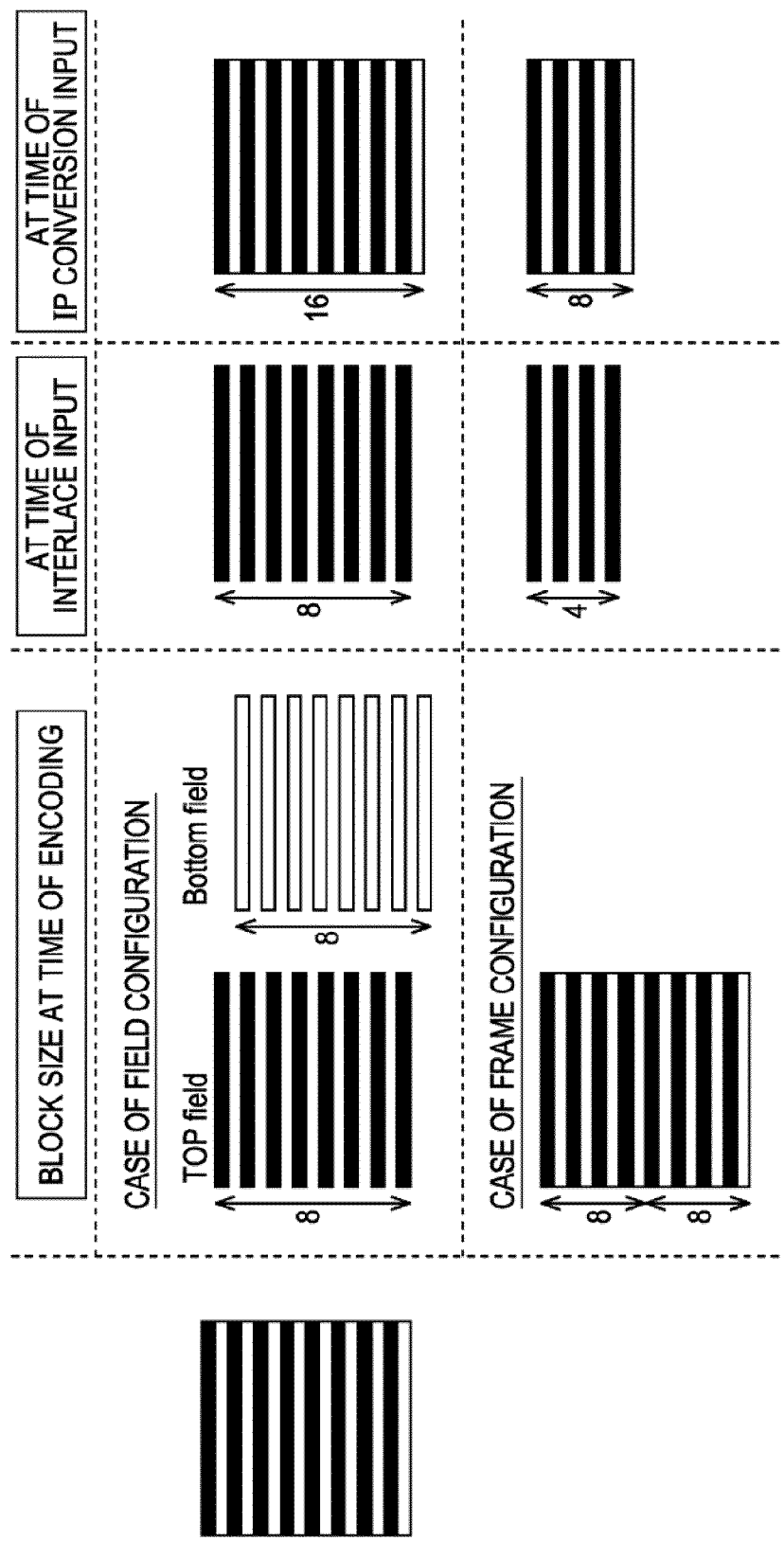

| ORIGINAL IMAGE | INPUT IMAGE | | |
|---|---|---|---|
| SIZE | EXISTENCE OF SIDE PANEL | HORIZONTAL SCALING RATE | HORIZONTAL BLOCK SIZE |
| 360 (352) × 240 | PROVIDED | 4.00 | 32.00 |
|  | NOT PROVIDED | 5.33 | 42.67 |
| 720 (704) × 480 | PROVIDED | 2.00 | 16.00 |
|  | NOT PROVIDED | 2.67 | 21.33 |
| 1280 × 720 | NOT PROVIDED | 1.50 | 12.00 |
| 1440 × 1080 | PROVIDED | 1.00 | 8.00 |
|  | NOT PROVIDED | 1.33 | 10.67 |
| 1920 × 1080 | NOT PROVIDED | 1.00 | 8.00 |

L2

| ORIGINAL IMAGE | INPUT IMAGE | | |
|---|---|---|---|
| SIZE | FIELD CONFIGURATION OR FRAME CONFIGURATION | VERTICAL SCALING RATE | VERTICAL BLOCK SIZE |
| 360 (352) × 240 | FRAME CONFIGURATION | 2.25 | 18.00 |
| 720 (704) × 480 | FIELD CONFIGURATION | 2.25 | 18.00 |
|  | FRAME CONFIGURATION | 1.13 | 9.00 |
| 1280 × 720 | FRAME CONFIGURATION | 0.75 | 6.00 |
| (1440 OR 1920) × 1080 | FIELD CONFIGURATION | 1.00 | 8.00 |
|  | FRAME CONFIGURATION | 0.50 | 4.00 |

L3

| ORIGINAL IMAGE | INPUT IMAGE | | |
|---|---|---|---|
| SIZE | FIELD CONFIGURATION OR FRAME CONFIGURATION | VERTICAL SCALING RATE | VERTICAL BLOCK SIZE |
| 360 (352) × 240 | FRAME CONFIGURATION | 4.50 | 36.00 |
| 720 (704) × 480 | FIELD CONFIGURATION | 4.50 | 36.00 |
|  | FRAME CONFIGURATION | 2.25 | 18.00 |
| 1280 × 720 | FRAME CONFIGURATION | 1.50 | 12.00 |
| (1440 OR 1920) × 1080 | FIELD CONFIGURATION | 2.00 | 16.00 |
|  | FRAME CONFIGURATION | 1.00 | 8.00 |

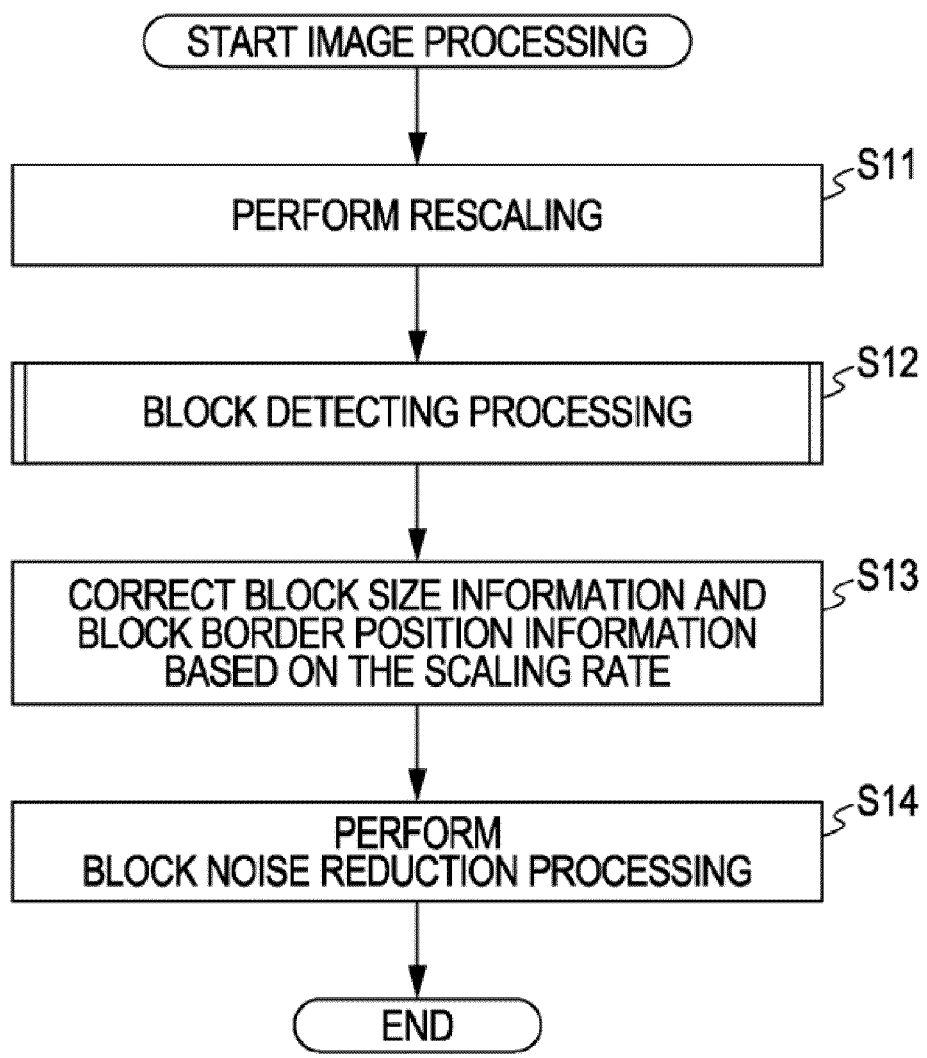

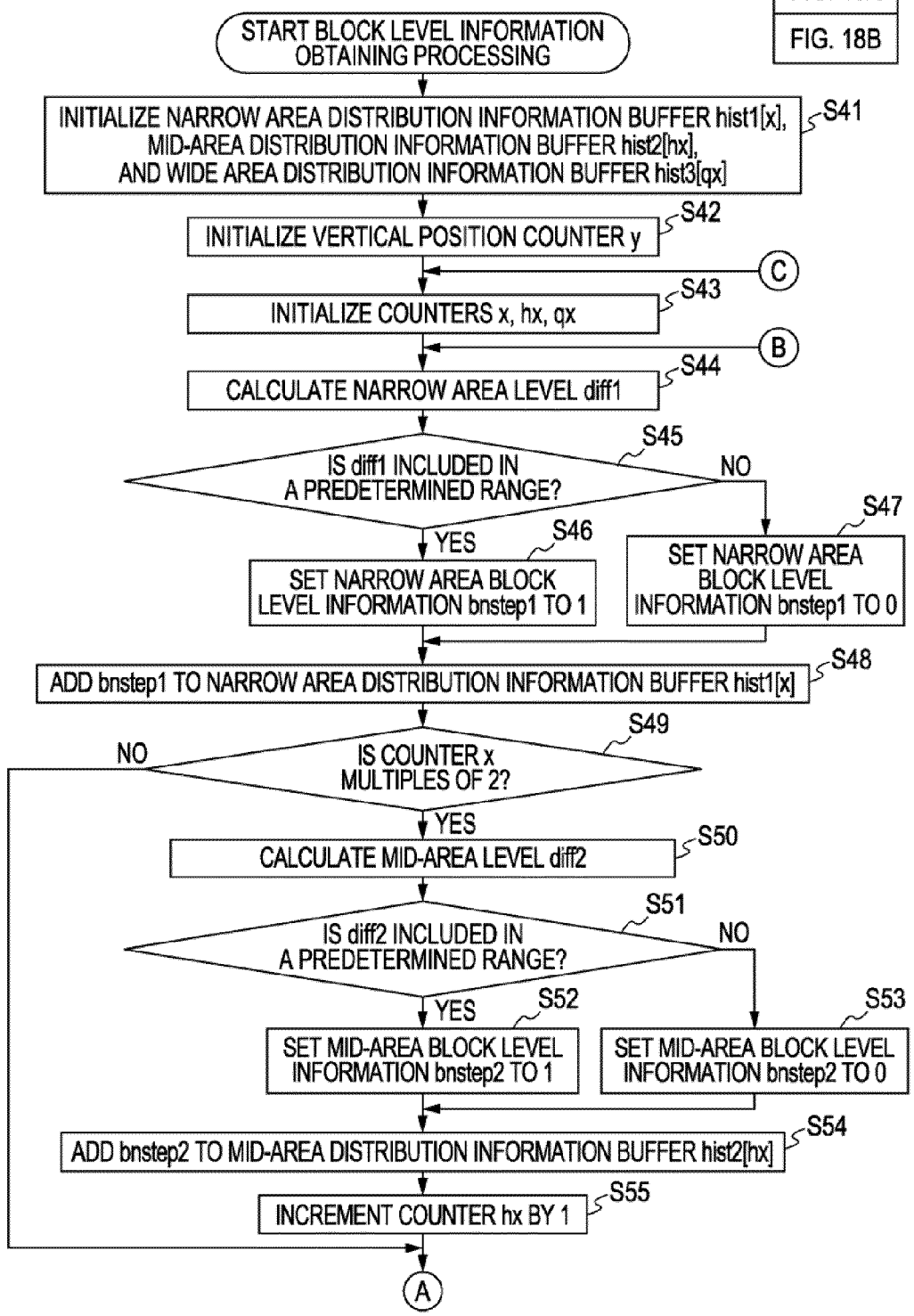

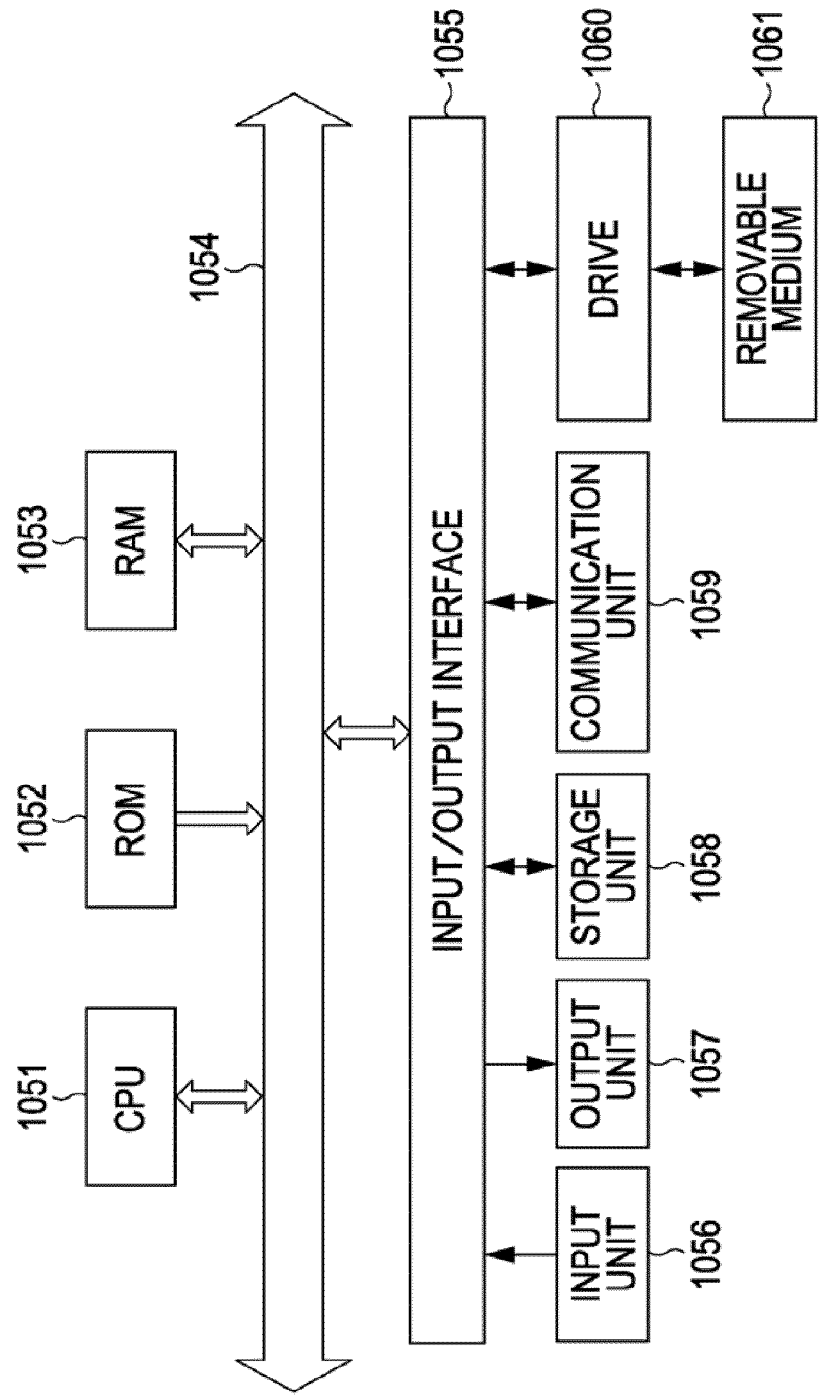

IMAGE PROCESSING DEVICE AND IMAGE PROCESSING METHOD, AND PROGRAM

BACKGROUND OF THE INVENTION

1. Field of the Invention

The present invention relates to an image processing device and image processing method, and program, and specifically, relates to an image processing device and image processing method, and program whereby a block size and block border position can be detected with high precision even in the case that scaling is performed with an arbitrary scaling factor.

2. Description of the Related Art

In the event of decoding encoded image data, noise may occur in the decoded image. For example, in the event of compressing image data with a compression method such as MPEG (Moving Picture Experts Group), an encoder divides the image data into square blocks made up of multiple pixels, and subjects each divided block to DCT (Discrete Cosine Transform) processing.

Therefore, when a decoder decodes the image data encoded with the MPEG method, in principle with the decoded image data, pixel value levels between pixels can may differ at border portions of each block, whereby block noise can readily occur.

A device to reduce or remove such block noise generally does so by applying an LPF (Low Pass Filter) over a known block size (e.g. 8 pixels×8 pixels if MPEG2) and at block border positions, and smoothing. However, for such smoothing, information of the input image data such as block size and block border position has to be available beforehand.

Accordingly, a technique has been proposed wherein cyclic nature is used in order to realize such processing to obtain the block sizes and block border positions in the input image (Japanese Unexamined Patent Application Publication No. 2007-028460).

Also, a method has been proposed wherein cyclic nature is not used, but block noise feature is used to perform determination of a block border, cumulatively process results obtained by subjecting the determination results thereof to weighting according to the level thereof, in a spatial direction, and detect a block border position according to the cumulative results thereof (Japanese Unexamined Patent Application Publication No. 2005-012641).

SUMMARY OF THE INVENTION

Incidentally, a player which reads out an image signal recorded in a storage medium such as DVD (Digital Versatile Disc), HDD (Hard Disc Drive), or the like from the storage medium, decodes this, and outputs this to a display device such as a television receiver or the like, has a scaler built in some cases.

In such a case, the player subjects a decoded image signal to scaling with an arbitrary scaling factor such as enlargement with a scaling factor of 1.05 times, enlargement with a scaling factor of 1.1 times, or the like, and outputs the image signal after scaling to the display device.

Accordingly, an image signal subjected to scaling with an arbitrary scaling factor is input to a device, which reduces or removes block noise, included in the display device, so it is difficult to perform detection of a block size and block border position with an integer cycle in a precise manner. As a result thereof, block noise remains as is, and accordingly, sufficient image quality is not obtained at the display device.

It has been found desirable to enable a block size and block border position to be detected with high precision even in the case that scaling is performed with an arbitrary scaling factor.

According to an embodiment of the present invention, an image processing device includes: a rescaling unit configured to obtain an image subjected to scaling, and subject the image to rescaling with the scaling rate of the image; a block border information detecting unit configured to detect a block size and block border position from the image after rescaling; and a detected information correcting unit configured to correct the block size and the block border position detected by the block border information detecting unit based on the scaling rate.

According to an embodiment of the present invention, an image processing method for an image processing device which processes an image subjected to scaling, includes the steps of: obtaining the image subjected to scaling to subject the image to rescaling with the scaling rate of the image; detecting a block size and block border position from the image after rescaling; and correcting the block size and the block border position detected by the processing in the detecting step based on the scaling rate.

According to an embodiment of the present invention, a program causing a computer to serve as an image processing device includes: a rescaling unit configured to obtain an image subjected to scaling, and subject the image to rescaling with the scaling rate of the image; a block border information detecting unit configured to detect a block size and block border position from the image after rescaling; and a detected information correcting unit configured to correct the block size and the block border position detected by the block border information detecting unit based on the scaling rate.

With an embodiment of the present invention, an image subjected to scaling is obtained, the image is subjected to rescaling with the scaling rate of the image, a block size and block border position are detected from the image after rescaling, and the detected block size and block border position are corrected based on the scaling rate.

As described above, according to an embodiment of the present invention, even in the case that scaling is performed with an arbitrary scaling factor, a block size and block border position can be detected with high precision.

BRIEF DESCRIPTION OF THE DRAWINGS

FIG. 1 is a block diagram illustrating a configuration example according to an embodiment of an image processing system to which the present invention is applied;

FIG. 2 is a diagram illustrating scaling;

FIG. 3 is a diagram illustrating block sizes;

FIG. 4 is a diagram illustrating the relation between a scaling rate and block size;

FIG. 6 is a flowchart describing image processing according to the image processing device in FIG. 1;

FIG. 40 is a diagram illustrating a configuration example of a general-use personal computer.

DESCRIPTION OF THE PREFERRED EMBODIMENTS

Figure 5A:
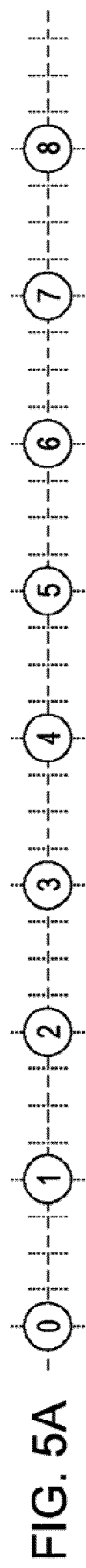
FIGS. 5A through 5E are diagrams illustrating scaling and rescaling.

FIG. 1 is a block diagram illustrating a configuration example according to an embodiment of an image processing system to which the present invention is applied. The image processing system 1 in FIG. 1 is configured of an image sending device 11 and image processing device 12 such as a DVD player or the like, and reduces the block noise of an input image sent from the image sending device 11, and outputs this as an output image.

The image sending device 11 is configured of a scaling unit 21 and display control unit 22. An image obtained by a compressed recording signal recorded in an unshown recording medium such as DVD, HDD, or the like being read out and decoded (hereafter, referred to as "original image") is input to the scaling unit 21. The scaling unit 21 subjects the original image to scaling with the scaling rate supplied from the display control unit 22, thereby performing resolution conversion or IP conversion (interlaced-to-progressive conversion).

Specifically, for example, as shown in FIG. 2, the scaling unit 21 converts an image A with an SD (Standard Definition) resolution of 720 pixels×480 pixels into an image D with a resolution of 1280 pixels×720 pixels, an image B with a resolution of 360 pixels×240 pixels, or an image E with an HD (High Definition) resolution of 1920 pixels×1080 pixels. Also, the scaling unit 21 converts the image C of 440 pixels× 1080 pixels that is one of HD resolutions into an image E of 1920 pixels×1080 pixels that is another HD resolution.

Further, the scaling unit 21 converts the image A with an SD resolution of 720 pixels×480 pixels into an image with a resolution of 1440 pixels×1080 pixels, and adds a frame with a width of 240 pixels to the left and right thereof, thereby converting the image A into an image F with an HD resolution of 1920 pixels×1080 pixels. Subsequently, the scaling unit 21 inputs the image after scaling to the image processing device 12 as an input image.

The screen mode of an output image output from the image processing device 12 is input to the display control unit 22. The display control unit 22 determines the scaling rate according to the screen mode. Subsequently, the display control unit 22 inputs the scaling rate thereof to the scaling unit 21 and image processing device 12.

The image processing device 12 is configured of a rescaling unit 31, block border information detecting unit 32, detected information correcting unit 33, and block noise reduction processing unit 34.

The rescaling unit 31 obtains an input image input from the scaling unit 21, and a scaling rate input from the display control unit 22. The rescaling unit 31 subjects the input image to rescaling with the scaling rate thereof to restore the size and configuration of the input image to the size and configuration of the original image before scaling. Subsequently, the rescaling unit 31 supplies the input image obtained by performing rescaling (hereafter, referred to as "rescaled image") to the block border information detecting unit 32.

More specifically, as described above, the input image is the original image subjected to resolution conversion or IP conversion by the scaling unit 21. Accordingly, the block size in the vertical direction of the input image (hereafter, referred to as "vertical block size") is changed according to the resolution of the original image, conditions at the time of encoding, and whether or not there is IP conversion.

For example, as shown in the leftmost portion in FIG. 3, in the case that the original image is an interlace image, when the vertical block size is eight pixels, as shown in the second upper portion from the left of FIG. 3, if the image has a field configuration, the vertical block size of the original image becomes eight pixels as is at the time of encoding, such as shown in the third upper portion from the left of FIG. 3. On the other hand, upon the original image being subjected to IP conversion, the vertical block size of the original image after IP conversion becomes 16 pixels such as shown in the fourth upper portion from the left of FIG. 3.

Also, as shown in the second lower portion from the left of FIG. 3, if the image has a frame configuration, the vertical block size of the original image becomes a vertical block size of four pixels at the time of encoding, such as shown in the third lower portion from the left of FIG. 3. On the other hand, upon the original image being subjected to IP conversion, the vertical block size of the original image after IP conversion is kept in eight pixels such as shown in the fourth lower portion from the left of FIG. 3.

Note that, the scaling rates and change in block sizes with the scaling unit 21 are summarized as relations such as shown in FIG. 4, and for example, in the case that the resolution of the input image is 1920 pixels×1080 pixels and the block size in the horizontal direction of the original image (hereafter, referred to as "horizontal block size") is eight pixels, the scaling rate in the horizontal direction, and the horizontal block size of the input image have a relation such as shown in the list L1 in FIG. 4. That is to say, when the resolution of the original image is 360 (352) pixels×240 pixels and there is a side panel, the horizontal scaling rate is 4.00 and the horizontal block size of the input image is 32.00 pixels, and when there is no side panel, the horizontal scaling rate is 5.33 and the horizontal block size of the input image is 42.67 pixels.

Also, when the resolution of the original image is 720 (704) pixels×480 pixels and there is a side panel, the horizontal scaling rate is 2.00 and the horizontal block size of the input image is 16.00 pixels, and when there is no side panel, the horizontal scaling rate is 2.67 and the horizontal block size of the input image is 21.33 pixels. Further, in the case that the resolution of the original image is 1280 pixels×720 pixels, there is no side panel, the horizontal scaling rate is 1.50, and the horizontal block size of the input image is 12.00 pixels. Also, when the resolution of the original image is 1440 pixels×1080 pixels and there is a side panel, the horizontal scaling rate is 1.00 and the horizontal block size of the input image is 8.00 pixels, and when no side panel, the horizontal scaling rate is 1.33 and the horizontal block size of the input image is 10.67 pixels. Further, in the case that the resolution of the original image is 1920 pixels×1080 pixels, there is no side panel, the horizontal scaling rate is 1.00, and the horizontal block size of the input image is 8.00 pixels.

Also, in the case that the resolution of the input image is an interlaced image of 1920 pixels×1080 pixels and the vertical block size of the original image is 8 pixels, the scaling rate in the vertical direction and the vertical block size of the input image have a relation such as shown in the list L2 in FIG. 4. That is to say, in the case that the resolution of the original image is 360 (352) pixels×240 pixels, the original image has a frame configuration, so the vertical scaling rate is 2.25 and the vertical block size of the input image is 18.00 pixels. Also, when the resolution of the original image is 720 (704) pixels× 480 pixels and the original image has a field configuration, the vertical scaling rate is 2.25 and the vertical block size of the input image is 18.00 pixels, and when in frame configuration, the vertical scaling rate is 1.13 and the vertical block size of the input image is 9.00 pixels.

Further, in the case that the resolution of the original image is 1280 pixels×720 pixels, the original image has a frame configuration so the vertical scaling rate is 0.75 and the vertical block size of the input image is 6.00 pixels. Also, when the resolution of the original image is 1440 pixels×1080 pixels or 1920 pixels×1080 pixels, and the original image has a field configuration, the vertical scaling rate is 1.00 and the vertical block size of the input image is 8.00 pixels, and when in frame configuration, the vertical scaling rate is 0.50 and the vertical block size of the input image is 4.00 pixels.

Further, in the case that the resolution of the input image is a progressive image of 1920 pixels×1080 pixels and the vertical block size of the original image is 8 pixels, the scaling in the vertical direction has a relation such as shown in list L3 in FIG. 4. That is to say, in the case that the resolution of the original image is 360 (352) pixels×240 pixels, the original image has a frame configuration, so the vertical scaling rate is 4.50 and the vertical block size of the input image is 36.00 pixels. Also, when the resolution of the original image is 720 (704) pixels×480 pixels and the original image has a field configuration, the vertical scaling rate is 4.50 and the vertical block size of the input image is 36.00 pixels, and when in frame configuration, the vertical scaling rate is 2.25 and the vertical block size of the input image is 18.00 pixels.

Further, in the case that the resolution of the original image is 1280 pixels×720 pixels, the original image has a frame configuration, so the vertical scaling rate is 1.50 and the vertical block size of the input image is 12.00 pixels. Also, when the resolution of the original image is 1440 pixels×1080 pixels or 1920 pixels×1080 pixels, and the original image is in field configuration, the vertical scaling rate is 2.00 and the vertical block size of the input image is 16.00 pixels, and when in frame configuration the vertical scaling rate is 1.00 and the vertical block size of the input image is 8.00 pixels.

As described above, the block size of the input image is changed from the block size of the original image according to the resolution of the original image, conditions at the time of encoding (e.g., configuration at the time of encoding), and whether or not there is IP conversion. Accordingly, the rescaling unit 31 performs rescaling based on the scaling rate with the scaling unit 21 to match the size and configuration of the input image and those of the original image, thereby restoring the block size.

The block border information detecting unit 32 detects a block size, block border position, and reliability that are increments to be subjected to DCT processing in an encoded state before decoding, from the rescaled image supplied from the rescaling unit 31. Subsequently, the block border information detecting unit 32 supplies the detected block size and reliability to the detected information correcting unit 33 as block size information, and also supplies the information of the block border position to the detected information correcting unit 33 as block border position information.

The detected information correcting unit 33 corrects the block size and block border position represented with the information from the block border information detecting unit 32 based on the scaling rate input from the display control unit 22 of the image sending device 11. Subsequently, the detected information correcting unit 33 supplies the block size information and block border position information after correction to the block noise reduction processing unit 34 as the block size information and block border position information of the input image.

The block noise reduction processing unit 34 changes the strength of block noise reduction processing as to an input image to be input from the scaling unit 21 in an adaptive manner based on the scaling rate supplied from the display control unit 22 of the image sending device 11 to reduce the block noise of the input image. Subsequently, the block noise reduction processing unit 34 outputs a block noise reduction processed image wherein block noise has been reduced, as an output image.

Next, scaling and rescaling will be described with reference to FIGS. 5A through 5E. Note that round marks within FIGS. 5A through 5E represent pixels, and a digit k (less than the second place of decimal point is truncated) within a round mark represents the position of the pixel thereof in pixel increments. Also, with the examples in FIGS. 5A through 5E, the number of phases N of the original image is 4, the initial phase P of the image after scaling is 7 (1.75'th pixel of the original image), the enlargement rate M representing the number of phases of the image after scaling is 3. That is to say, with the examples in FIGS. 5A through 5E, the scaling rate is N/M, i.e., 4/3 times (around 1.333 times).

Figure 5B:
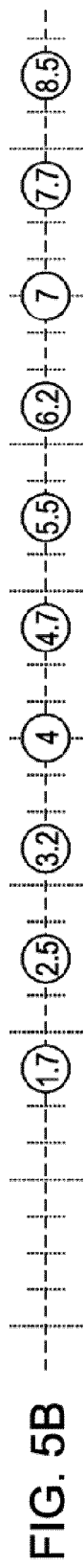

Accordingly, each pixel of the original image input to the scaling unit 21 is disposed such as shown in FIG. 5A. Upon the original image such as shown in FIG. 5A being subjected to scaling with a scaling rate of N/M by the scaling unit 21, the position on the original image of each pixel of the image after scaling is such as shown in FIG. 5B.

Specifically, the total number of phases sppos of the i'th pixel of the image after scaling is represented with the following Expression (1).

$$sppos = P + M \times i \quad (1)$$

The position on the original image of each pixel of the image after scaling is the sphase'th phase from the position of the spos'th pixel on the original image. Note that these spos and sphase are represented with the following Expressions (2) and (3) by employing sppos, respectively.

$$spos = int(sppos/N) \quad (2)$$

$$sphase = sppos \quad (3)$$

Note that, in Expression (2), int( ) represents the maximum integer not exceeding ( ), and in Expression (3), represents a remainder operator. These are true for later-described Expressions (5) and (6).

Figure 5C:
Figure 5D:
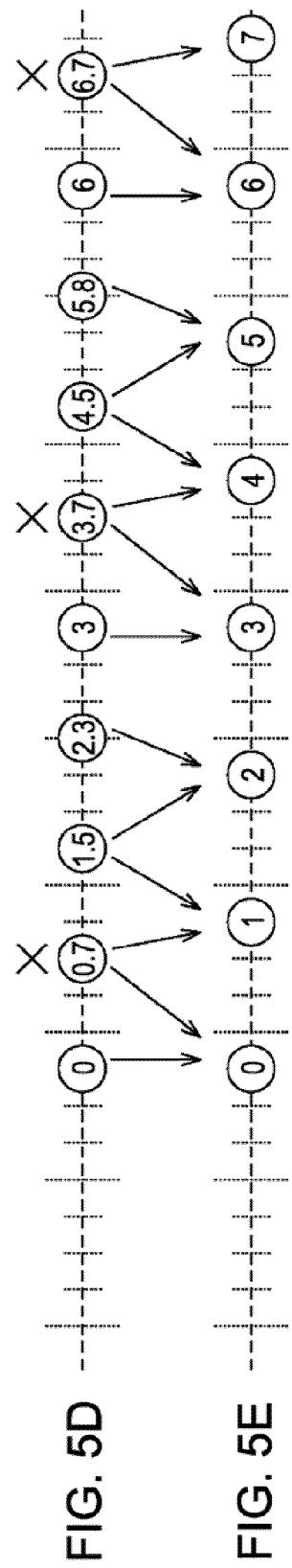

Next, the image after scaling where each pixel is disposed such as shown in FIG. 5B is input to the image processing device 12 as an input image. At this time, the position of each pixel recognized at the image processing device 12 side becomes a position on the input image such as shown in FIG. 5C. Subsequently, the rescaling unit 31 calculates the position on the original image of each pixel of the input image such as shown in FIG. 5D based on the position and scaling rats of each pixel on the input image.

Specifically, the rescaling unit 31 calculates the total number of phases oppos of the i'th pixel of the input image by the following Expression (4).

$$oppos = P + M \times i \quad (4)$$

Subsequently, with the positions on the original image of the respective pixels of the input image as from the positions of the opos'th pixel to the ophase'th phase on the input image, the rescaling unit 31 employs the oppos to perform the calculations of the following Expressions (5) and (6) to obtain the opos and ophase.

$$opos = int((oppos - P)/N) \quad (5)$$

$$ophase = (oppos - P) \quad (6)$$

According to Expressions (5) and (6), the position on the original image of each pixel of the input image is calculated with the position of the 0'th pixel of the input image as the position of the 0'th pixel of the original image. This is for facilitating correction at the detected information correcting unit 33.

Next, the rescaling unit 31 performs linear interpolation or the like, thereby restoring the position of each pixel of the input image to the position on the original image of each pixel of the input image calculated as above. Note that, at this time, in the case that the integer portion mpos representing the position in the pixel increments on the original image of a pixel of the input image is identical to the integer portion mpos of the previous (left adjacent) pixel, the rescaling unit 31 performs linear interpolation without considering the pixel value of the pixel thereof of the input image. For example, of FIGS. 5A through 5E, the position 0.7 in pixel increments on the original image shown in FIG. 5D has the same integer portion as the position 0 of the previous image, so the pixel value of the pixel of the position 0.7 is not considered with the linear interpolation.

Next, image processing according to the image processing device 12 in FIG. 1 will be described with reference to the flowchart in FIG. 6. This image processing is started, for example, when an input image is input from the image sending device 11.

Figure 5E:

In step S11, the rescaling unit 31 (FIG. 1) of the image processing device 12 subjects an input image to be input from the scaling unit 21 to rescaling based on the scaling rate supplied from the display control unit 22. Specifically, the rescaling unit 31 obtains the position on the original image of each pixel of the input image as shown in FIG. 5D, and restores the position of each pixel of the input image to the position on the original image as shown in FIG. 5E. Subsequently, the rescaling unit 31 supplies the rescaled image to the block border information detecting unit 32.

In step S12, the block border information detecting unit 32 performs block detecting processing for detecting a block size and block border position. The details of this block detecting processing will be described later.

In step S13, the detected information correcting unit 33 corrects the block size information and block border position information supplied from the block border information detecting unit 32 based on the scaling rate input from the display control unit 22. Specifically, the detected information correcting unit 33 employs the scaling rate N/M to calculate the following Expression (7), and thereby obtaining the block size bsize and block border position bpos after correction.

$$bsize = BS \times N/M$$

$$bpos = BP \times N/M \quad (7)$$

Note that, in Expression (7), BS represents the block size before correction, and BP represents the block border position before correction.

However, in the case that the block size is represented with not an integer but a block size rate brate (later described), the detected information correcting unit 33 employs the scaling rate N/M to calculate the following Expression (8), and obtains the block size rate brate serving as the block size after correction.

$$brate = BR \times M/N \quad (8)$$

Note that, in Expression (8), BR represents the block size rate before correction. This block size rate is, for example, the value of the numerator when representing the block size with a fraction of which the denominator is 64. For example, in the case that the block size is 10.67, the block size rate is 48.

In step S14, the block noise reduction processing unit 34 changes the strength of block noise reduction processing as to the input image in an adaptive manner based on the block size information and block border position information corrected by the detected information correcting unit 33 to reduce the block noise of the input image. Subsequently, the block noise reduction processing unit 34 outputs a block noise reduction processed image obtained as a result thereof as an output image.

Figure 7:
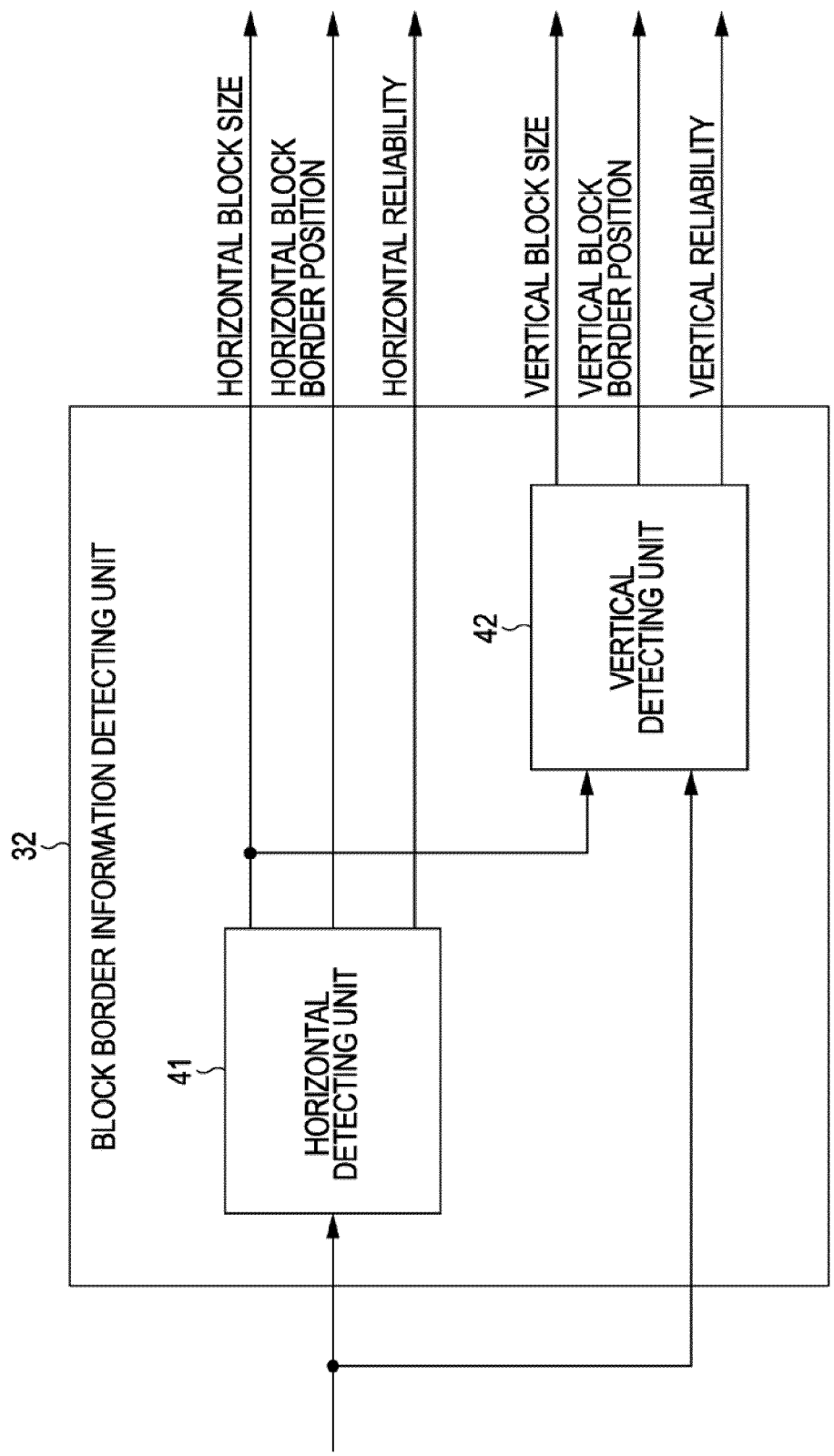
FIG. 7 is a diagram illustrating a configuration example of an embodiment of a block border information detecting unit.

Next, a configuration example of an embodiment of the block border information detecting unit 32 will be described with reference to the block diagram in FIG. 7.

The horizontal detecting unit 41 detects the horizontal block size, horizontal block border position, and horizontal reliability of the rescaled image to output the information of the horizontal block size and horizontal reliability thereof as block size information, and also outputs the information of the horizontal block border position as block border position information. Also, the horizontal detecting unit 41 supplies the horizontal block size to the vertical detecting unit 42.

The vertical detecting unit 42 detects the vertical block size, vertical block border position, and vertical reliability of the rescaled image based on the horizontal block size supplied from the horizontal detecting unit 41. Subsequently, the vertical detecting unit 42 outputs the information of the detected vertical block size and vertical reliability as block size information, and also outputs the information of the vertical block border position as block border position information.

Figure 8:
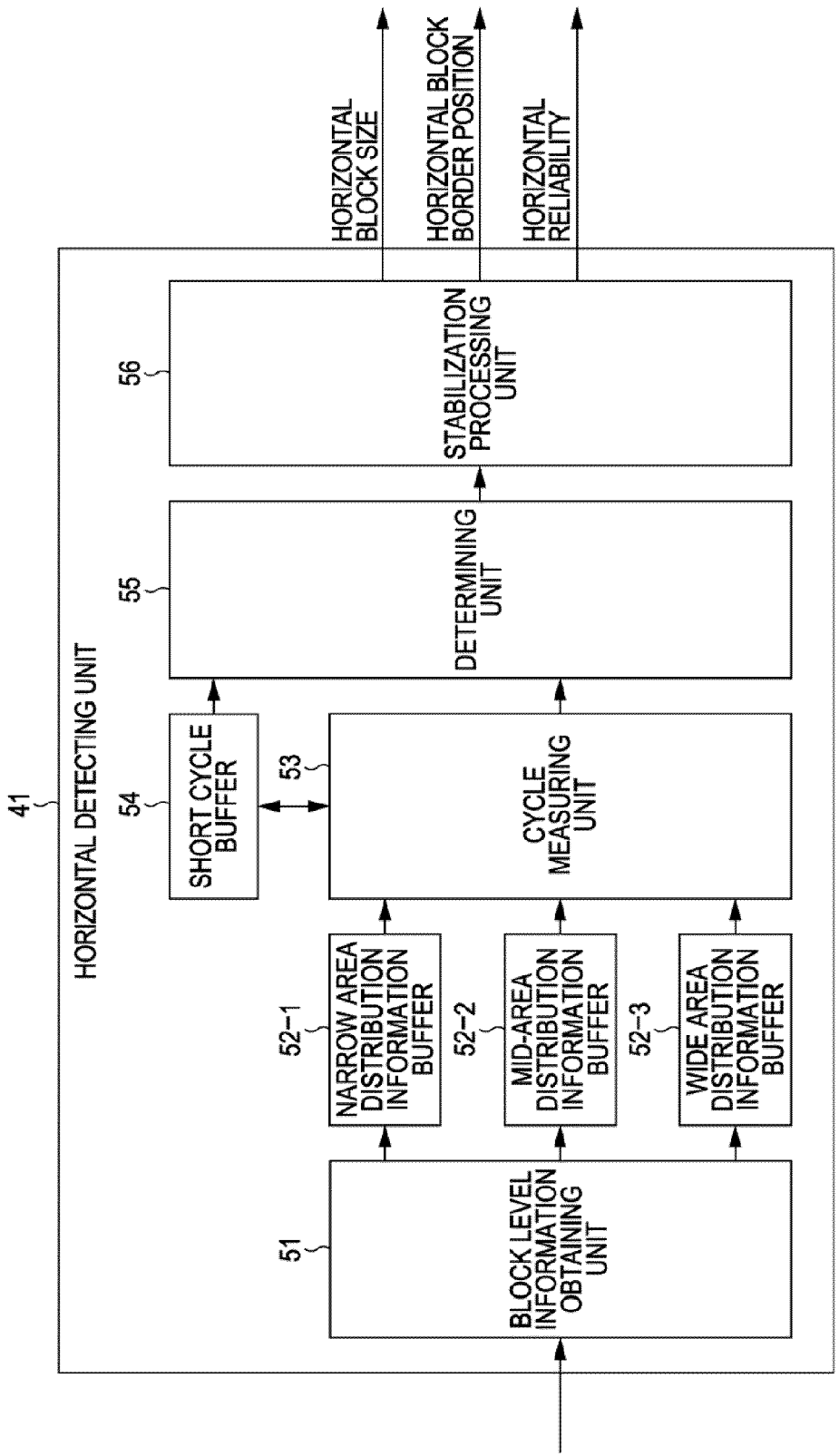
FIG. 8 is a diagram illustrating a configuration example of the horizontal detecting unit in FIG. 7.

Next, a configuration example of the horizontal detecting unit 41 will be described with reference to FIG. 8. A block level information obtaining unit 51 obtains block level information with three types of reference pixels which are narrow area, mid-area, and wide area as to a pixel of interest, in pixel increments of the rescaled image, and outputs this information to a narrow area distribution information buffer 52-1, mid-area distribution information buffer 52-2, and wide area distribution information buffer 52-3, respectively.

The narrow area distribution information buffer 52-1, mid-area distribution information buffer 52-2, and wide area distribution information buffer 52-3 store the pixel count wherein block levels are detected, in pixel position increments in the horizontal direction, as respective arrays expressed as a narrow area distribution information buffer hist1[x], mid-area distribution information buffer hist2[hx], and wide area distribution information buffer hist3[qx] based on the block level information, respectively. Note that x, hx, qx here are, respectively, a position counter x in the horizontal direction, position counter hx in a multiple of 2 of the position counter x, and position counter qx in a multiple of 4 of the position counter x. Also, in the case that the pixel positions do not have to be distinguished in particular, these may be simply called narrow area distribution information buffer hist1, mid-area distribution information buffer hist2, and wide area distribution information buffer hist3.

A cycle measuring unit 53 finds short cycle information based on array information of the narrow area distribution information buffer hist1[x], mid-area distribution information buffer hist2[hx], and wide area distribution information buffer hist3[qx] stored in the narrow area distribution information buffer 52-1, mid-area distribution information buffer 52-2, and wide area distribution information buffer 52-3, and stores this in a short cycle buffer 54. Short cycle information is obtained as arrays made up of short cycle buffers buf1$_{\_p}$, buf2$_{\_p}$, buf3$_{\_p}$, and stored in the short cycle buffer 54.

Now, a short cycle indicates a pixel count p expressed with block size p, and short cycle information is information indicating detection count for each phase indicating which number in order is the block size p making up the short cycle.

Note that the short cycle buffer buf1$_{\_p}$ stores the short cycle information of the horizontal block size p pixels obtained based on the narrow area distribution information buffer hist1, the short cycle buffer buf2$_{\_p}$ stores the short cycle information of the horizontal block size p pixels obtained based on the mid-area distribution information buffer hist2, and the short cycle buffer buf3$_{\_p}$ stores the short cycle information of the horizontal block size p pixels obtained based on the wide area distribution information buffer hist3.

Also, the cycle measuring unit 53 obtains the occurrence frequencies interval1[n], interval2[n], interval3[n] by cycles for the 3 types of narrow area, mid-area, and wide area, and supplies this to a determining unit 55. An occurrence frequency interval1[n] expresses the occurrence frequency of a pixel count n indicating the spatial size of the occurrence spacing of the peak values obtained based on the narrow area distribution information buffer hist1[x], an occurrence frequency interval2[n] expresses the occurrence frequency of a pixel count n indicating the spatial size of the occurrence spacing of the peak values obtained based on the mid-area distribution information buffer hist2[x], and an occurrence frequency interval3[n] expresses the occurrence frequency of a pixel count n indicating the spatial size of the occurrence spacing of the peak values obtained based on the wide area distribution information buffer hist3[x].

The determining unit 55 determines the block size information in the horizontal direction and block border position information of the currently input rescaled image, based on the short cycle buffers buf1$_{\_p}$, buf2$_{\_p}$, buf3$_{\_p}$ stored in the short cycle buffer 54 and the occurrence frequency interval1[n], interval2[n], interval3[n] measured with the cycle measuring unit 53, and supplies this to a stabilization processing unit 56.

The stabilization processing unit 56 stabilizes the horizontal block size and horizontal block border position to be output based on the block size information in the horizontal direction and block border position information of the currently input rescaled image supplied from the determining unit 55 and the block size in the horizontal direction and block border position information of the immediately previously input rescaled image. Subsequently, the stabilization processing unit 56 outputs the block size information of the stabilized horizontal block size, and the block border position information of the stabilized horizontal block border position.

Figure 9:
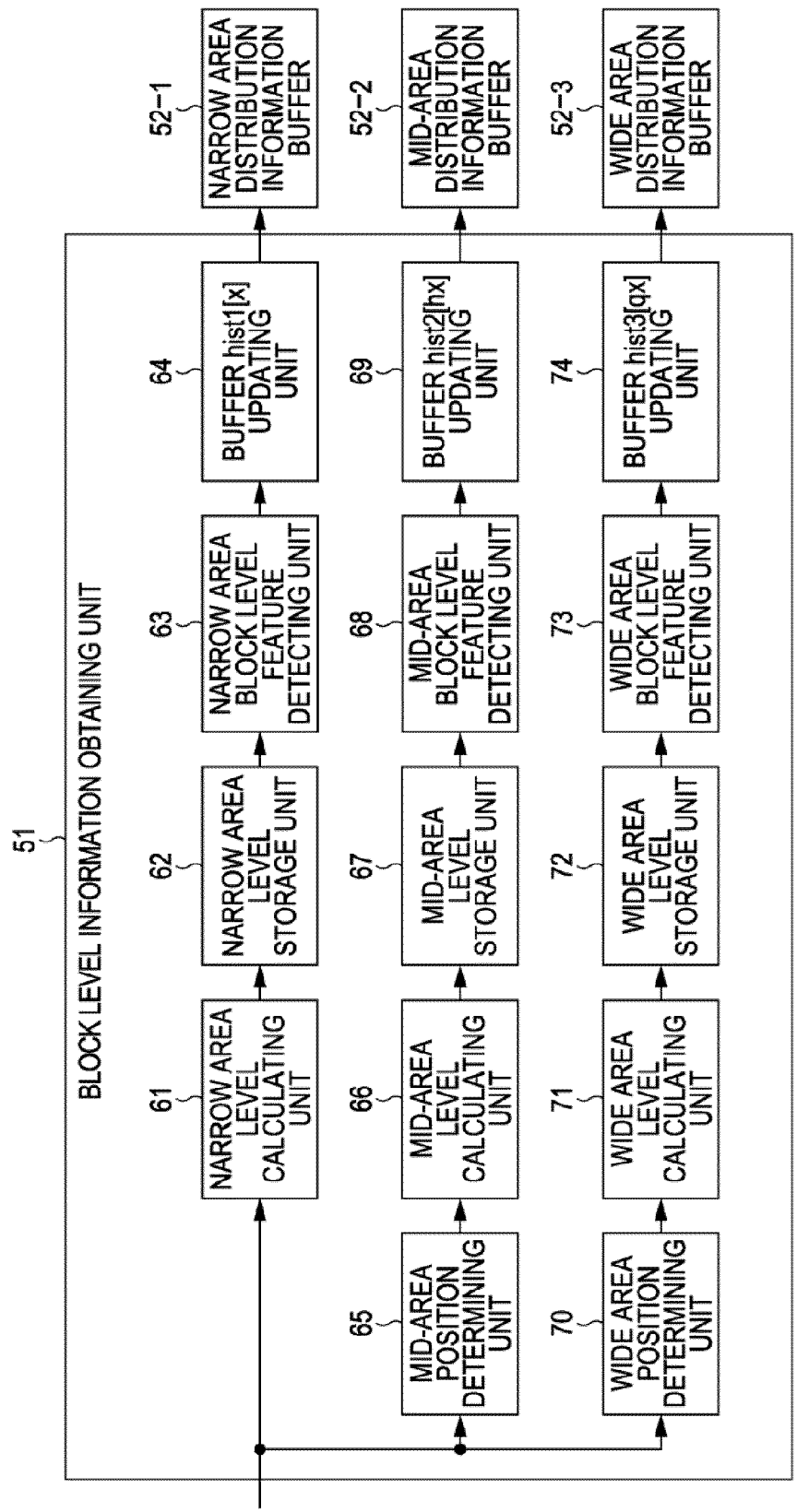
FIG. 9 is a diagram illustrating a configuration example of the block level information obtaining unit in FIG. 8.

Next, a configuration example of an embodiment of the block level information obtaining unit 51 will be described with reference to FIG. 9. A narrow area level calculating unit 61 calculates the narrow area levels of the pixel of interest, based on multiple pixels that are continuously adjacent as to the pixel of interest, and stores this in the narrow area level storage unit 62 made up of memory.

A narrow area block level feature detecting unit 63 reads the narrow area levels stored in the narrow area level storage unit 62, detects whether or not there are block level features therein, and supplies the detection results to a buffer hist1[x] updating unit 64.

The buffer hist1[x] updating unit 64 updates the narrow area distribution information buffer hist1[x] of the narrow area distribution information buffer 52-1, based on the detection results of the block level features supplied from the narrow area block level feature detecting unit 63.

A mid-area position determining unit 65 determines whether or not the current coordinate position of the pixel of interest is a multiple of 2, and in the case of being a multiple of 2, supplies the rescaled image to a mid-area level calculating unit 66.

The mid-area level calculating unit 66 calculates the mid-area levels of the pixel of interest, based on multiple pixels that are adjacent one pixel apart as to the pixel of interest, and stores this in a mid-area level storage unit 67 made up of memory.

A mid-area block level feature detecting unit 68 reads the mid-area levels stored in the mid-area level storage unit 67, detects whether or not there are any block level features, and supplies the detection results to a buffer hist2[hx] updating unit 69.

The buffer hist2[hx] updating unit 69 updates the narrow area distribution information buffer hist2[hx] of the mid-area distribution information buffer 52-2, based on the block level feature detection results supplied from the mid-area block level feature detecting unit 68.

A wide area position determining unit 70 determines whether or not the current coordinate position of the pixel of interest is a multiple of 4, and in the case of being a multiple of 4, supplies the rescaled image to a wide area level calculating unit 71.

The wide area level calculating unit 71 calculates the wide area levels of the pixel of interest, based on multiple pixels that are adjacent 2 pixels apart from the pixel of interest, and stores this in a wide area level storage unit 72 made up of memory.

A wide area block level feature detecting unit 73 reads the wide area levels stored in the wide area level storage unit 72, detects whether or not there are any block level features, and supplies the detection results to a buffer hist3[qx] updating unit 74.

The buffer hist3[qx] updating unit 74 updates the wide area distribution information buffer hist3[qx] of the wide area distribution information buffer 52-3, based on the detection results of the block level features supplied from the wide area block level feature detecting unit 73.

Figure 10:
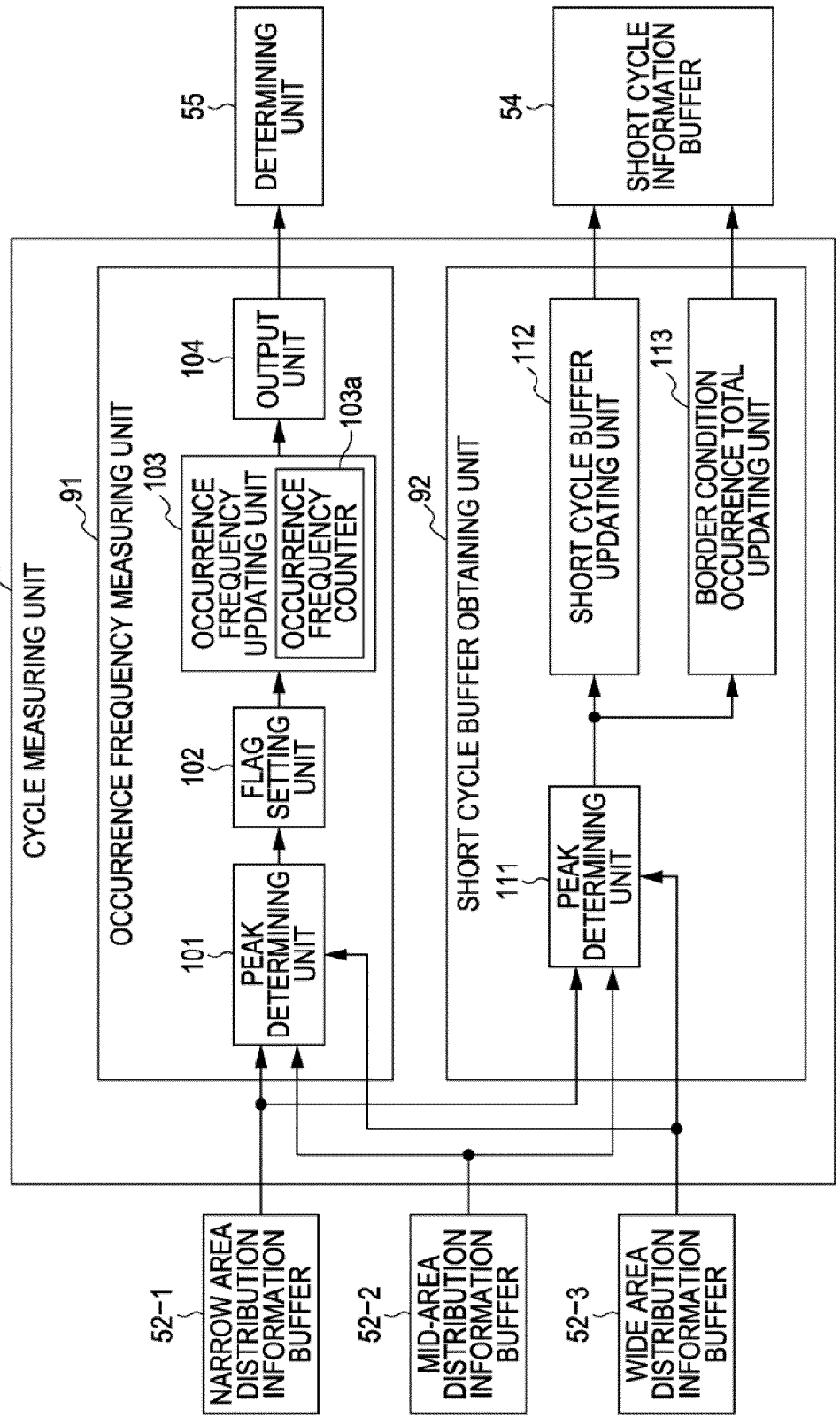
FIG. 10 is a diagram illustrating a configuration example of the cycle measuring unit in FIG. 8.

Next, a configuration example of an embodiment of the cycle measuring unit 53 will be described with reference to FIG. 10. A peak determining unit 101 of the occurrence frequency measuring unit 91 detects positions to be the peak for each of the narrow area distribution information buffer hist1 stored in the narrow area distribution information buffer 52-1, the mid-area distribution information buffer hist2 stored in the mid-area distribution information buffer 52-2, and the wide area distribution information buffer hist3 stored in the wide area distribution information buffer 52-3.

A flag setting unit 102 sets a state flag state to confirm the state until the peak is first detected by the peak determining unit 101, according to the detection result by the peak determining unit 101. For example, the flag setting unit 102 sets the state flag state to 0 in the case that a position to be the peak has not been detected by the peak determining unit 101, and sets the state flag state to 1 in the case that the position has been detected.

An occurrence frequency updating unit 103 updates the occurrence frequency counters interval1[n], interval2[n], and interval3[n] stored in an occurrence frequency counter 103a, in spacing of the number of pixels wherein the peak is detected, for each of the narrow area, mid-area, and wide area, according to the state flag state set by the flag setting unit 102, and outputs the results thereof from an output unit 104 to the determining unit 55.

A peak determining unit 111 of the short cycle buffer obtaining unit 92 is similar to that of the peak determining unit 101, and detects the positions to be the peak for each of the narrow area distribution information buffer hist1 stored in the narrow area distribution information buffer 52-1, the mid-area distribution information buffer hist2 stored in the mid-area distribution information buffer 52-2, and the wide area distribution information buffer hist3 stored in the wide area distribution information buffer 52-3.

A short cycle buffer updating unit 112 updates each of the short cycle buffers buf1[n], buf2[n], and buf3[n] which indicates occurrence frequency for each phase in a predetermined short cycle, for each of the narrow area, mid-area, and wide area, stored in the short cycle buffer 54, based on the detection results by the peak determining unit 111.

In the case that a peak is detected by the peak determining unit 111 for each of the narrow area, mid-area, and wide area, a border condition occurrence total updating unit 113 updates border condition occurrence total counters btotal1, btotal2, and btotal3, which are stored in the short cycle buffer 54, as if all border conditions have occurred.

Next, a configuration example of an embodiment of the determining unit 55 will be described with reference to FIG. 11. The determining unit 55 has a narrow area processing unit 141, mid-area processing unit 142, wide area processing unit 143, narrow area candidate selecting unit 144, mid-area candidate selecting unit 145, wide area candidate selecting unit 146, and integrated selecting unit 147.

The narrow area processing unit 141, mid-area processing unit 142, and wide area processing unit 143 obtain predetermined horizontal block size, horizontal block border position, and horizontal reliability based on the short cycle information stored in the narrow area distribution information buffer hist1, the mid-area distribution information buffer hist2, and the wide area distribution information buffer hist3 respectively, and supplies these to the narrow area candidate selecting unit 144, mid-area candidate selecting unit 145, and wide area candidate selecting unit 146 respectively.

Specifically, the narrow area processing unit 141 has an integer block size determining unit 161 and non-integer block size determining unit 162, which generate block size information in the horizontal direction and block border position information regarding the horizontal block sizes made up of integer pixels, and horizontal block sizes made up of non-integer pixels, respectively.

Specifically, a short cycle buffer reading unit 171 of the integer block size determining unit 161 reads the short cycle buffer buf1 obtained based on the narrow area distribution information buffer hist1 from the short cycle buffer 54 for each short cycle, based on a control counter i supplied by the control counter 172, and supplies this to a comparing unit 173.

The comparing unit 173 sequentially compares each value of the short cycle buffer buf1 and a maximum value counter max stored in maximum value counter 174 for each short cycle, and in the case that the value to be compared of the short cycle buffer buf1 is at or above the maximum value counter max, the comparing unit 173 controls a maximum value counter updating unit 175 to update the maximum value counter max with the short cycle buffer buf1 value. Also, at this time, the comparing unit 173 controls a maximum value phase counter updating unit 177 to update the phase of a maximum value phase counter max_pos stored in the maximum value phase counter 176 as a phase wherein the short cycle buffer buf1 takes the maximum value. That is to say, according to such processing, the comparing unit 173 stores the maximum value serving as the peak value when the short cycle buffer buf1 takes the peak as the maximum value counter max in the maximum value counter 174 for each short cycle, and also stores the phase within the short cycle in the maximum value phase counter max_pos.

A determination result output unit 178 generates the block size information and block border position information of each short cycle, based on the maximum value counter max stored in the maximum value counter 174 finally and the maximum value phase counter max_pos stored in the maximum value phase counter 176, and supplies these to the narrow areas candidate selecting unit 144.

The non-integer block size determining unit 162 has integer block size determining units 191-1 through 191-3 and comparison determining unit 192. The integer block size determining units 191-1 through 191-3 each have the same configuration as the integer block size determining unit 161. However, the integer block size determining units 191-1 through 191-3 generate block size information in the horizontal direction and block border position information for regions having different phases within the short cycle, and supply each of these to the comparison determining unit 192.

The comparison determining unit 192 generates block size information and block border position information of the non-integer horizontal block size, based on the block size information and block border position information from the integer block size determining units 191-1 through 191-3, and supplies these to the narrow candidate selecting unit 144.

Note that the mid-area processing unit 142 and wide area processing unit 143 are similar to the narrow area processing unit 141 except that the mid-area distribution information buffer hist2 and wide area distribution information buffer hist3 are subjected to processing instead of the narrow area distribution information buffer hist1, so description thereof will be omitted.

The narrow area candidate selecting unit 144, mid-area candidate selecting unit 145, wide area candidate selecting unit 146 select candidates for the horizontal block size, horizontal block border position, and horizontal reliability for each of the narrow area, mid-area, and wide area, based on the horizontal block size, horizontal block border position, and horizontal reliability supplied from each of the narrow area processing unit 141, mid-area processing unit 142, and wide area processing unit 143, and supplies these to the integrated selecting unit 147.

Specifically, the narrow area candidate selecting unit 144 is configured of a reliability comparing unit 144a and occurrence frequency comparing unit 144b. The reliability comparing unit 144a compares horizontal reliability included in the block size information supplied from the determination result output unit 178 of the narrow area processing unit 141. Also, the occurrence frequency comparing unit 144b compares the occurrence frequency interval1 stored in the cycle measuring unit 53. The narrow area candidate selecting unit 144 selects candidates of the horizontal block size, horizontal block border position, and horizontal reliability based on the narrow distribution information buffer hist1, based on the comparison result by the reliability comparing unit 144a, and the comparison result by the occurrence frequency comparing unit 144b, and supplies these to the integrated selecting unit 147.

Note that the mid-area candidate selecting unit 145 and wide area candidate selecting unit 146 are similar to the narrow area candidate selecting unit 144 except that instead of the horizontal reliability and occurrence frequency interval1 supplied from the narrow area processing unit 141, the horizontal reliability and occurrence frequency interval2 supplied from the mid-area processing unit 142, and the horizontal reliability and occurrence frequency interval3 supplied from the wide area processing unit 143 are taken as comparison targets, so description thereof will be omitted.

The integrated selecting unit 147 is configured of a reliability comparing unit 147a, occurrence frequency comparing unit 147b, and concentration comparing unit 147c. The integrated selecting unit 147 compares the candidates of the horizontal block size, horizontal block border position, and horizontal reliability supplied from the narrow area candidate selecting unit 144, mid-area candidate selecting unit 145, wide area candidate selecting unit 146, and determines the horizontal block size and horizontal block border position in the rescaled image. Subsequently, the integrated selecting unit 147 outputs the block size information of the determined horizontal block size, and the block border position information of the determined horizontal block border position to the stabilization processing unit 56.

Next, a configuration example of an embodiment of the stabilization processing unit 56 will be described with reference to FIG. 12. An obtaining unit 201 obtains the block size information in the horizontal direction supplied front the determining unit 55, and supplies this to a step calculating unit 202, immediately previous image information comparing unit 203, immediately previous image information storage unit 207, and selecting unit 211. Also, the obtaining unit 201 obtains the block border position information in the horizontal direction supplied from the determining unit 55, and supplies this to the immediately previous image information comparing unit 203, immediately previous image stabilization information comparing unit 204, and immediately previous image information storage unit 207.

The step calculating unit 202 calculates the control coefficient step based on the horizontal reliability included in the block size information in the horizontal direction, and supplies this to a determination value managing unit 205 and change likelihood flag managing unit 209.

The immediately previous image information comparing unit 203 compares the block size information in the horizontal direction and block border position information before stabilization of the rescaled image immediately previously stored in the immediately previous image information storage unit 207 and the block size information in the horizontal direction and block border position information of the current rescaled image supplied from the obtaining unit 201, and supplies the comparison results to the determination value managing unit 205 and change likelihood flag managing unit 209.

An immediately previous image stabilization information comparing unit 204 compares the block size information in the horizontal direction and block border position information after stabilization with the rescaled image immediately previously stored in an immediately previous image stabilization information storage unit 208 and the block size information in the horizontal direction and block border position information of the current rescaled image supplied from the obtaining unit 201, and supplies the comparison results to the determination value managing unit 205 and change likelihood flag managing unit 209.

The determination value managing unit 205 controls a waveform shaping unit 205a to manage the determination values, based on the determination results from the immediately previous image information comparing unit 203 and the immediately previous image stabilization information comparing unit 204, and the control coefficient step, and stores this in determination value memory 206.

The change likelihood flag managing unit 209 manages a change likelihood flag based on the determination results from the immediately previous image information comparing unit 203 and the immediately previous image stabilization information comparing unit 204, and the control coefficient step, and stores this in change likelihood flag memory 210.

Based on the change likelihood flag of the change likelihood flag memory 210 and the determination value of the determination value memory 206, the selecting unit 211 outputs the block size information in the horizontal direction and block border position information of the input rescaled image or the block size information in the horizontal direction and block border position information of the immediately previous rescaled image.

Figure 13:
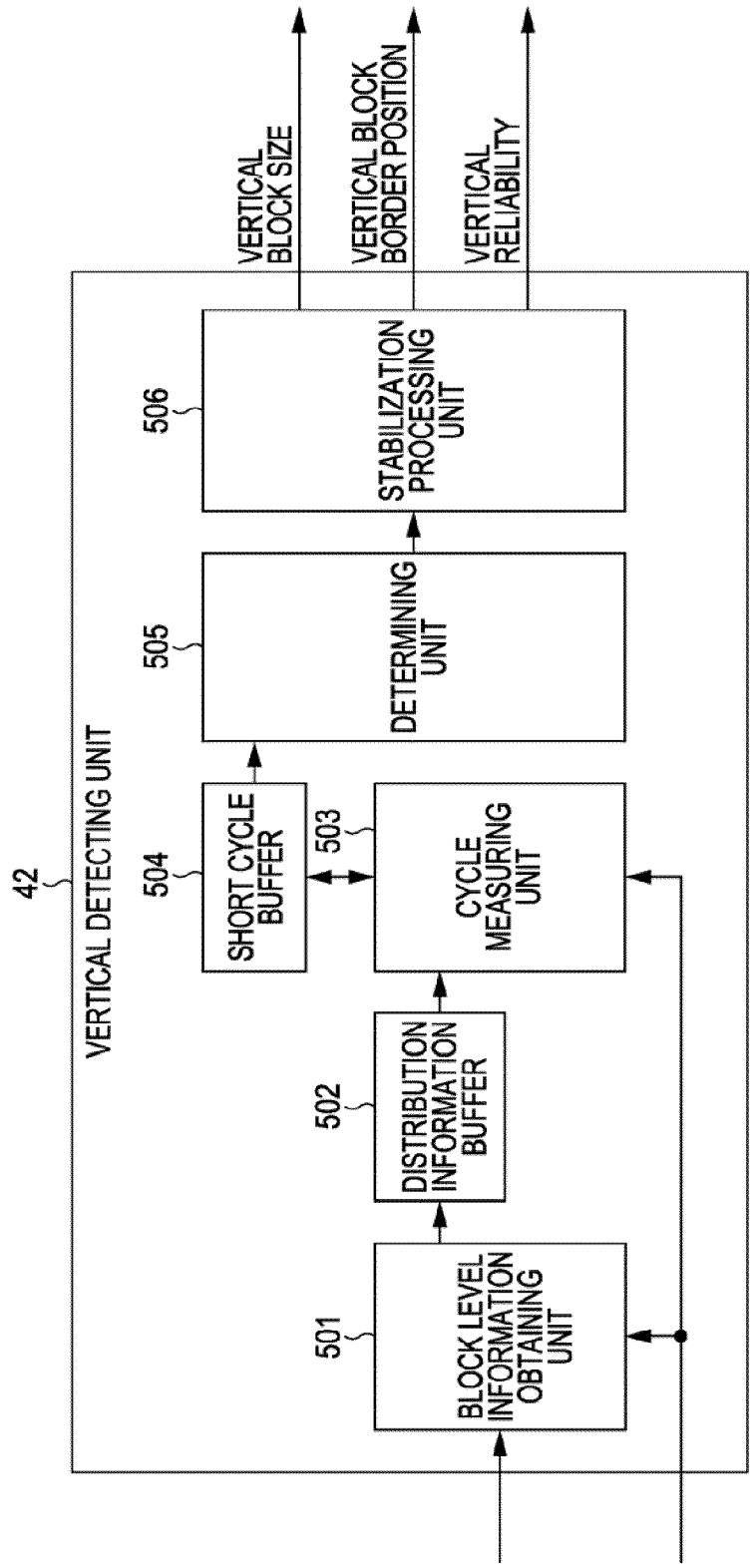
FIG. 13 is a diagram illustrating a configuration example of the vertical detecting unit in FIG. 7.

Next, a configuration example of an embodiment of the vertical detecting unit 42 will be described with reference to FIG. 13.

The block level information obtaining unit 501 obtains block level information from a reference pixel corresponding to the horizontal block size as to the pixel of interest, in pixel increments of the rescaled image, and outputs this to a distribution information buffer 502.

The cycle measuring unit 503 obtains short cycle information of the short cycle corresponding to the horizontal block size, based on distribution information buffer hist[x] array information stored in the distribution information buffer 502, and stores this as an array made up of a short cycle buffer buf_p in a short cycle buffer 504.

Figure 11:
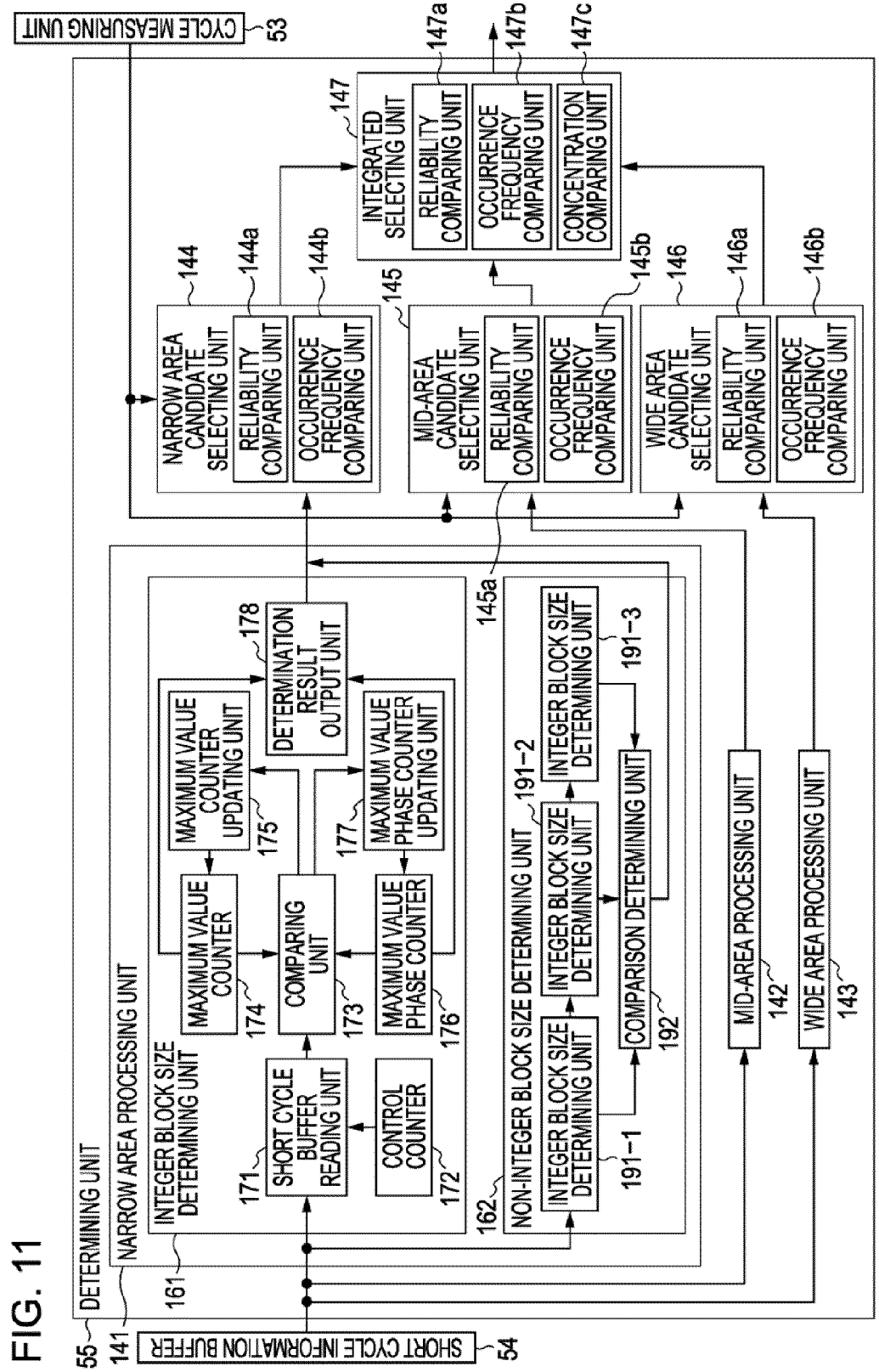
FIG. 11 is a diagram describing a configuration example of the determining unit in FIG. 8.

A determining unit 505 is configured in the same way as with the narrow area candidate selecting unit 144 having neither the narrow area processing unit 141 nor the occurrence frequency comparing unit 144b in FIG. 11, determines block size information in the vertical direction and vertical block border position information of the currently input rescaled image, based on the short cycle buffer buf_p stored in the short cycle buffer 504, and supplies these to the stabilization processing unit 506.

Figure 12:
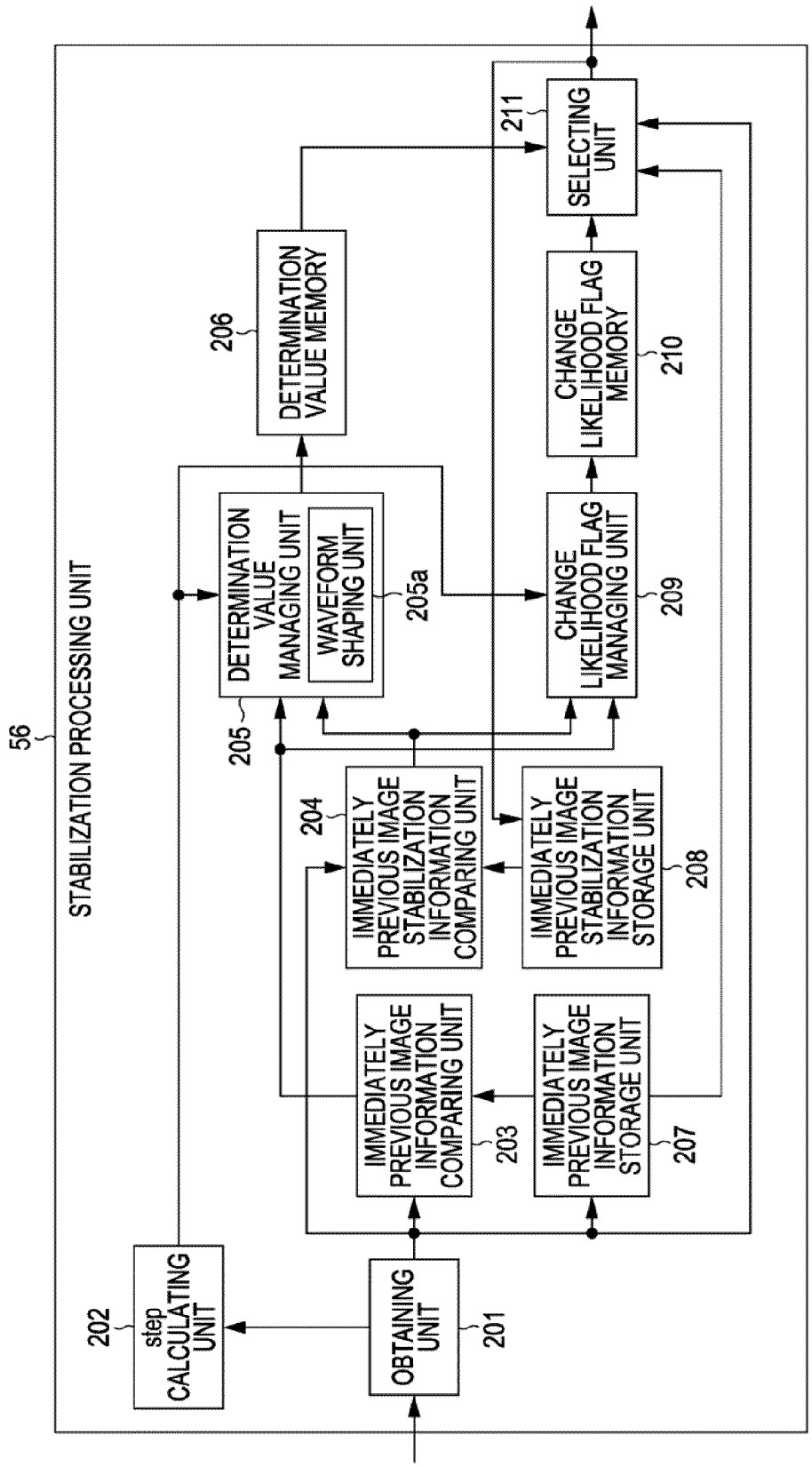
FIG. 12 is a diagram illustrating a configuration example of the stabilization processing unit in FIG. 8.

The stabilization processing unit 506 is configured in the same way as with the stabilization processing unit 56 in FIG. 12, stabilizes the vertical block size and vertical block border position to be output, based on the block size information in the vertical direction and block border position information of the currently input rescaled image supplied from the determining unit 505, and the block size information in the vertical direction and block border position information of the immediately previously input rescaled image. Subsequently, the stabilization processing unit 506 outputs the block size information of the stabilized vertical block size, and the block border position information of the stabilized vertical block border position.

Figure 14:
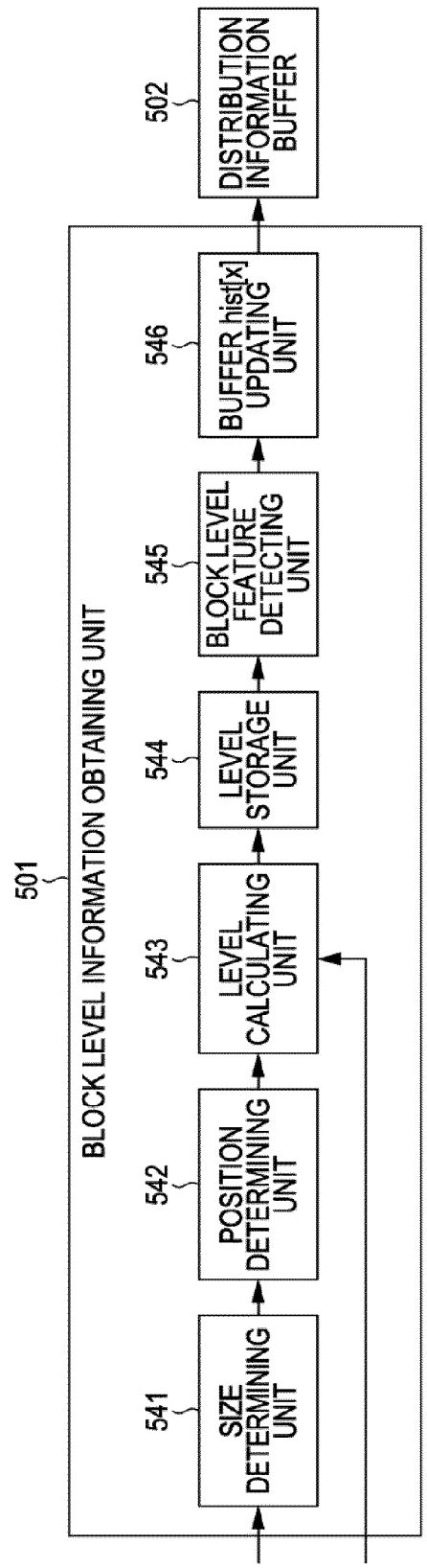
FIG. 14 is a diagram illustrating a configuration example of the block level information obtaining unit in FIG. 13.

Next, a configuration example of an embodiment of the block level information obtaining unit 501 will be described with reference to the block diagram in FIG. 14. A size determining unit 541 obtains the horizontal block size, determines the magnitude of the vertical block size, and supplies the determination results to a position determining unit 542.

The position determining unit 542 determines whether or not the level is calculated with the current position counter y in the vertical direction, and based on the determination results, causes a level calculating unit 543 to execute level calculations.

A level calculation unit 543 calculates the level difference from the pixel of interest, based on multiple pixels which are continuously adjacent to the pixel of interest of the rescaled image or are adjacent one pixel apart, based on the determination results of the position determining unit 542, and stores this in a level storage unit 544 made up of memory.

A block level feature detecting unit 545 reads the levels stored in the level storage unit 544, detects whether there are any block level features, and supplies the detection results in a buffer hist[x] updating unit 546.

The buffer hist1[x] updating unit 546 updates the distribution information buffer hist[x] of the distribution information buffer 502, based on detection results of the block level features supplied from the block level feature detecting unit 545.

Figure 15:
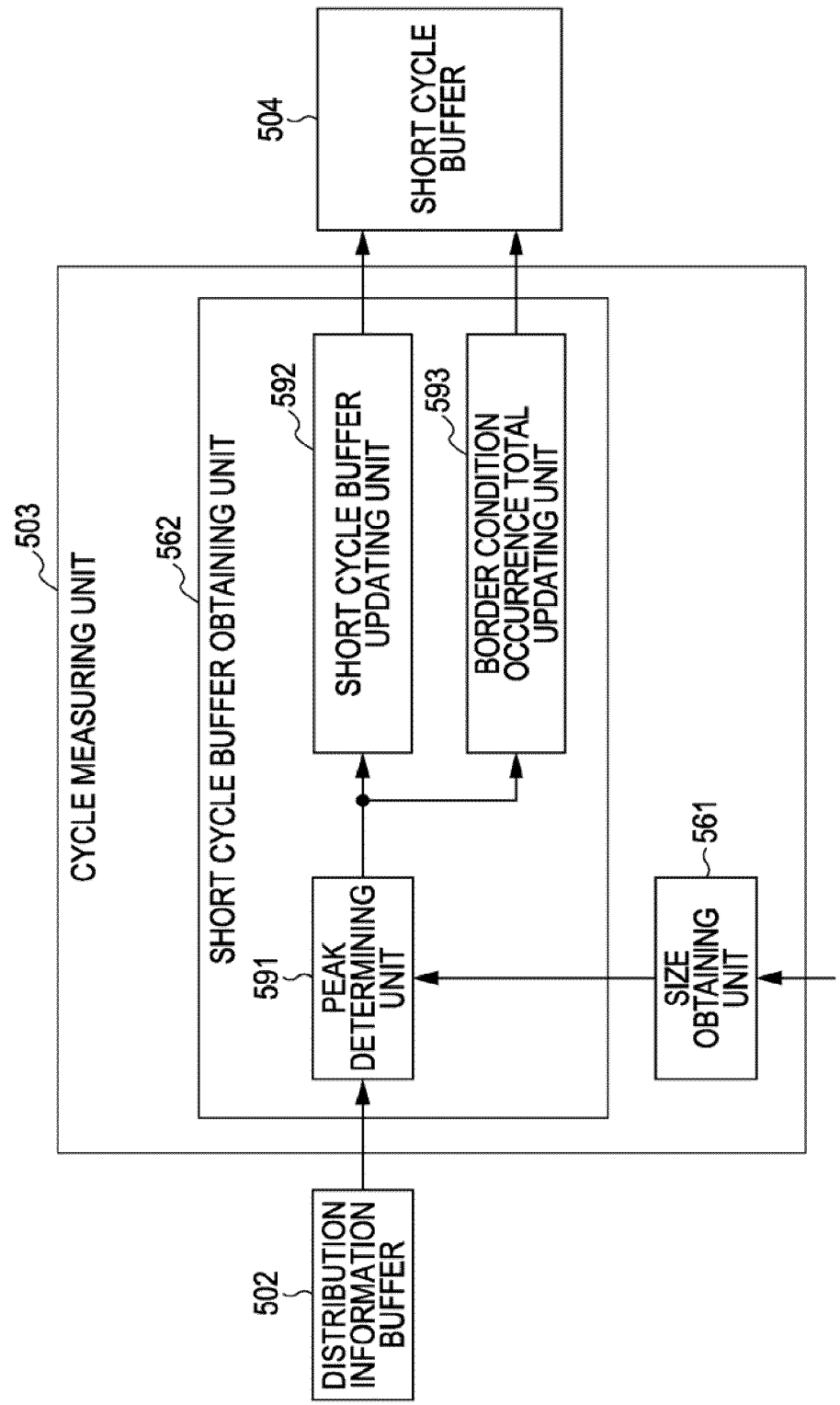
FIG. 15 is a diagram illustrating a configuration example of the cycle measuring unit in FIG. 13.

Next, a configuration example of an embodiment of the cycle measuring unit 503 will be described with reference to the block diagram in FIG. 15. A size obtaining unit 561 obtains a horizontal block size supplied from the horizontal detecting unit 41, and supplies the horizontal block size to a peak determining unit 591.

The peak determining unit 591 of a short cycle buffer 562 detects positions to be peaks for each short cycle corresponding to the horizontal block size supplied from the size obtaining unit 561, for the distribution information buffer hist stored in the distribution information buffer 502.

A short cycle buffer updating unit 592 updates the short cycle buffer buf[n] which expresses the occurrence frequency for each phase in a predetermined short cycle, stored in the short cycle buffer 504, based on the detection results by the peak determining unit 591.

A border condition occurrence total updating unit 593 updates a border condition occurrence total counter btotal which is stored in the short cycle buffer 504 as all border conditions having occurred, in the case that a peak is detected by the peak determining unit 591.

Next, block detection processing in step S12 in FIG. 6 with the block border information detecting unit 32 in FIG. 7 will be described with reference to the flowchart in FIG. 16. Note that hereafter, an example is described wherein the horizontal block sizes of 8 pixels, 10.67 pixels, and 12 pixels only are detected, but an arrangement may be made wherein other horizontal block sizes using a similar method are detected.

In step S21, the block border information detecting unit 32 sets a detection range for detecting the block border information in the rescaled image. The detection range can be freely set, but if to obtain the block noise strength in image increments, near the center where there is less distortion as to the edges has the greatest likelihood of an appropriate image being read, so in the case that the rescaled image size is hsize (pixels)×vsize (pixels) in the horizontal direction and vertical direction, a detection range made up of a range near the center pixel in the horizontal direction (coordinates near (hsize/2)) and a range near the center pixel in the vertical direction (coordinates near (hsize/2)) is set. Note that an arrangement may be made wherein multiple detection ranges are set, and the block border information is detected with each detection range.

In step S22, the immediately previous image information storage unit 207 and the immediately previous image stabilization information storage unit 208 in the stabilization processing unit 56 of the horizontal detecting unit 41 are reset. At this time, the vertical detecting unit 42 is also subjected to similar reset processing.

In step S23, the horizontal detecting unit 41 executes horizontal detecting processing, and detects the block size information in the horizontal direction, and block border position information.

Now, horizontal detection processing will be described with reference to the flowchart in FIG. 17. In step S31, the block level information obtaining unit 51 executes block level obtaining processing to obtain block level information.

Figure 18B:
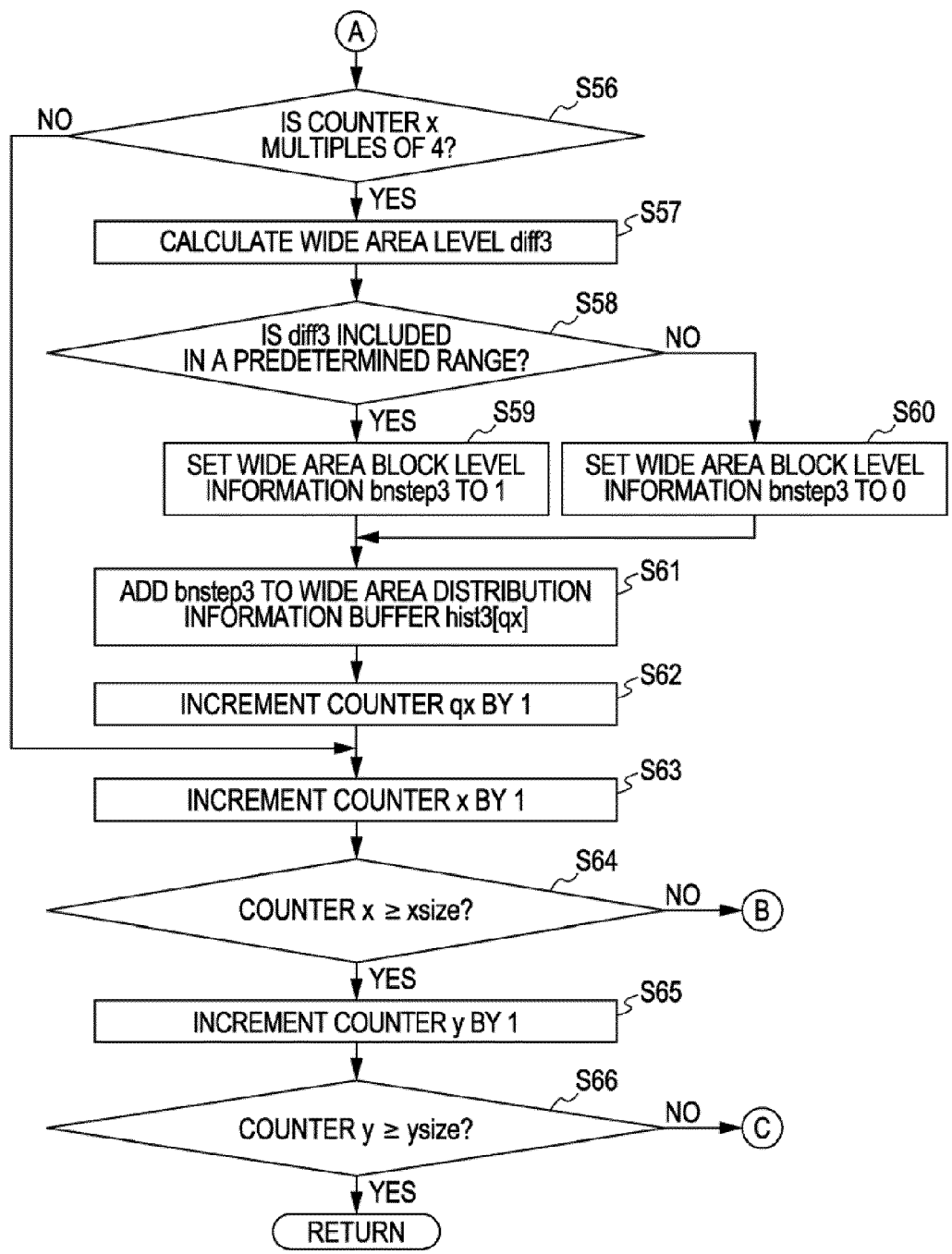
FIG. 18 is a flowchart describing the block level information obtaining processing FIG. 17.

Now, block level information obtaining processing will be described with reference to the flowchart in FIG. 18.

In step S41, the block level information obtaining unit 51 initializes to 0 the narrow area distribution information buffer hist1[x] that accumulates the distribution number of block levels in a narrow area range as to the pixel of interest, the mid-area distribution information buffer hist2[hx] that accumulates the distribution number of block levels in a mid-area range as to the pixel of interest, and the wide area distribution information buffer hist3[qx] that accumulates the distribution number of block levels in a wide area range as to the pixel of interest, which are stored in the narrow area distribution information buffer 52-1, mid-area distribution information buffer 52-2, and wide area distribution information buffer 52-3 respectively.

In step S42, the block level information obtaining unit 51 initializes the vertical position counter y indicating the vertical position of the rescaled image to 0.

In step S43, the block level information obtaining unit 51 initializes the horizontal position counters x, hx, qx showing a horizontal position regarding each of the narrow area, mid-area, and wide area of the rescaled image to 0.

In step S44, the narrow area level calculating unit 61 sets the pixels shown in the coordinates (x, y) of the pixels in the rescaled image as a pixel of interest, calculates the narrow area level diff1 with the pixel of interest and the nearby reference pixel in the narrow area set corresponding to the pixel of interest, and stores the calculation results in the narrow area level storage unit 62.

Figure 19:
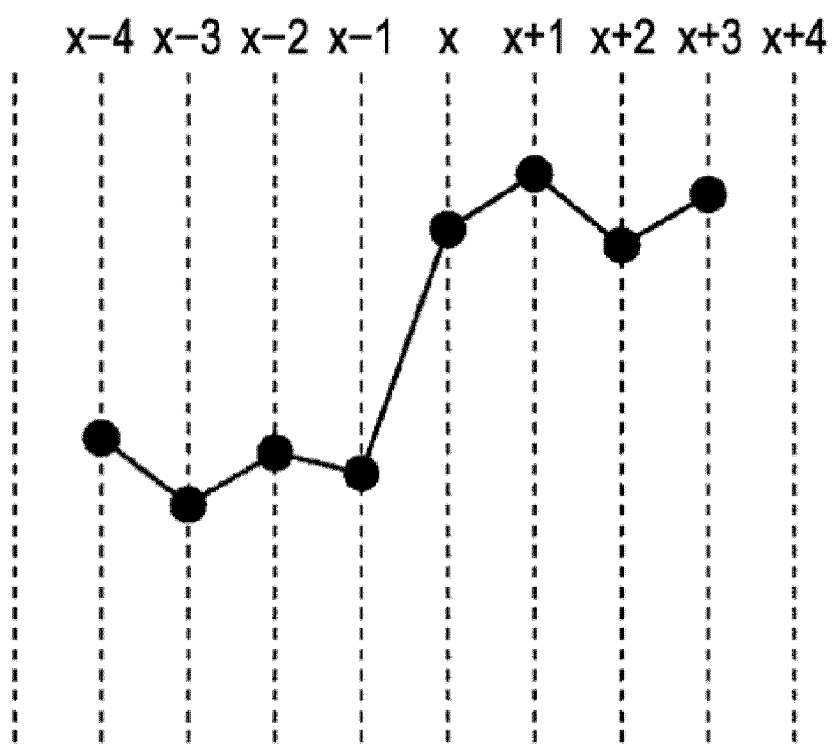
FIG. 19 is a diagram illustrating the block level information obtaining processing FIG. 17.

For example, with the nearby pixels in the narrow area, in the case that 8 pixels, made up of 3 pixels adjacent in the right direction and 4 pixels adjacent in the left direction, are used, with the pixel of interest as the center, if the pixel of interest is expressed as pixel P[x] wherein the coordinate position of the pixel of interest is x, as shown in FIG. 19, the 3 pixels adjacent in the right direction are expressed as pixels P[x+1], P[x+2], P[x+3] from the nearest pixel to the pixel of interest respectively, and the pixels adjacent in the left direction are expressed as pixels P[x−1], P[x−2], P[x−3], and P[x−4] respectively, from the pixels nearest the pixel of interest. At this time, the narrow area level calculating unit 61 calculates the Expression (9) below, thereby calculating the narrow area level diff1 of the pixel of interest. Note that in FIG. 19, the horizontal axis is the coordinate of the pixels in the horizontal direction, and the vertical axis shows the pixel value of the corresponding pixels. Also, processing as to the horizontal direction is described here, but it goes without saying that processing may be made as to the vertical direction.

$$\text{diff1}[x] = (|P[x]-P[x-1]| - (|P[x-3]-P[x-4]| + |P[x-2]-P[x-3]| + |P[x-1]-P[x-2]| + |P[x+1]-P[x]| + |P[x+2]-P[x+1]| + |P[x+3]-P[x+2]|)/6 \quad (9)$$

Here, diff1[x] indicates the narrow area level of the pixel of interest, and P[x], and P[x+1], P[x+2], P[x+3], P[x], P[x−1], P[x−2], P[x−3], P[x−4] each indicate a pixel value of pixels P[x+1], P[x+2], P[x+3], P[x], P[x−1], P[x−2], P[x−3], P[x−4].

That is to say, with the Expression (9), the narrow areas level diff1 is at value wherein the average value of the difference absolute value of the pixel values between pixels for each of between pixels F[x−4], P[x−3], between pixels P[x−3], F[x−2], between pixels P[x−2], P[x−1], between pixels P[x], P[x+1], between pixels P[x+1], P[x+2], and between pixels P[x+2], P[x+3], is subtracted from the difference absolute value of the pixel values between the pixel of interest P[x] and the pixel P[x−1] to the left side thereof.

In step S45, the narrow area block level feature detecting unit 63 determines whether or not the narrow area level diff1[x] stored in the narrow area level storage unit 62 is a value within a predetermined range. In step S45, for example, in the case that the narrow area level diff1[x] stored in the narrow area level storage unit 62 is a value within the predetermined range, in step S46 the narrow area block level feature detecting unit 63, having considered the narrow area level diff1[x] corresponding to the pixel of interest as having block level features, based on the determination results, sets narrow area block level feature information bnstep1 to 1, and supplies this to the buffer hist1[x] updating unit 64.

On the other hand, in step S45, for example in the case that the narrow area level diff1[x] stored in the narrow area level storage unit 62 is not a value within the predetermined range, in step S47 the narrow area block level feature detecting unit 63 sets the narrow area block level feature information bnstep1 to 0, based on the determination results that the narrow area level diff1[x] is not a value within the predetermined range, and supplies this to the buffer hist1[x] updating unit 64.

In step S48, the buffer hist1[x] updating unit 64 adds and stores the narrow area block level feature information bnstep1 to the buffer hist1[x] stored in the narrow area distribution information buffer 52-1.

In step S49, the mid-area position determining unit 65 determines whether or not the counter x is a multiple of 2. In step S49, in the case that the counter x is a multiple of 2, for example, in step S50 the mid-area level calculating unit 66 sets the pixel shown with the coordinates (x, y) of the rescaled image as the pixel of interest, calculates a mid-area level diff2 with the pixel of interest and a reference pixel in a nearby mid-area that is set corresponding to the pixel of interest, and stores the calculation results in the mid-area level storage unit 67.

Figure 20:
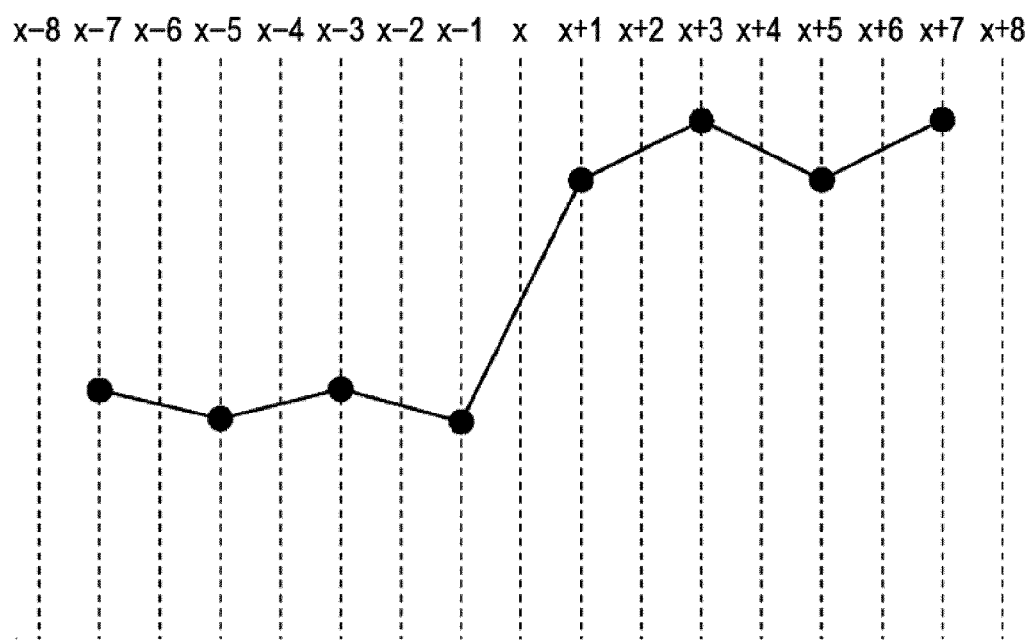
FIG. 20 is a diagram illustrating the block level information obtaining processing FIG. 17.

For example, in the case that eight pixels made up of one pixel adjacent to the left of the pixel of interest, one pixel adjacent to the right of the pixel of interest, three pixels adjacent with an interval of one pixel in the right direction from the pixel adjacent to the right of the pixel of interest, and three pixels adjacent with an interval of one pixel in the left direction from the pixel adjacent to the left of the pixel of interest, with the pixel of interest as the center are employed as reference pixels in a mid-area, if we say that the coordinate position of the pixel of interest is x and express the pixel of interest as pixel P[x], as shown in FIG. 20, the pixel positions are expressed wherein the one pixel adjacent to the left of the pixel of interest is pixel P[x−1], the one pixel adjacent to the right of the pixel of interest is pixel P[x+1], and the three pixels adjacent with an interval of one pixel in the right direction from the pixel adjacent to the right of the pixel of interest are pixels P[x+3], P[x+5], P[x+7] from the pixel nearest to the pixel of interest respectively, and the three pixels adjacent with an interval of one pixel in the left direction from the pixel adjacent to the left of the pixel of interest are pixels P[x−3], P[x−5], P[x−7] from the pixel nearest to the pixel of interest respectively. At this time, the mid-area level calculating unit 67 calculates the mid-area level diff2 of the pixel of interest by calculating the Expression (10) below. Note that in FIG. 20, the horizontal axis shows the pixel coordinate in the horizontal direction, and the vertical axis shows the pixel value of the corresponding pixel. Also, processing as to the horizontal direction is described here, but it goes without saying that an arrangement may be made wherein the processing as to the vertical direction may be made.

$$\text{diff2}[hx] = (|P[x+1]-P[x-1]| - (|P[x-7]-P[x-5]| + |P[x-5]-P[x-3]| + |P[x-3]-P[x-1]| + |P[x+1]-P[x+3]| + |P[x+3]-P[x+5]| + |P[x+5]-P[x+7]|)/6 \quad (10)$$

Here, diff2[hx] indicates the mid-area level of the pixel of interest P[x] when the counter x is a multiple of 2, and P[x+1], P[x+3], P[x+5], P[x+7], P[x−1], P[x−3], P[x−5], P[x−7] each indicate a pixel value of pixels P[x+1], P[x+3], P[x+5], P[x+7], P[x−1], P[x−3], P[x−5], P[x−7], respectively.

That is to say, with the Expression (10), the mid-area level diff2 is a value wherein the average value of the difference absolute value of the pixel values between pixels for each of between pixels P[x−7], P[x−5], between pixels P[x−5], P[x−3], between pixels P[x−3], P[x−1], between pixels P[x+1], P[x+3], between pixels P[x+3], P[x+5], and between pixels P[x+5], P[x+7], is subtracted from the difference absolute value of the pixel values of the pixels P[x+1] and P[x−1] adjacent horizontally with the pixel of interest P[x] as the center.

In step S51, the mid-area block level feature detecting unit 68 determines whether or not the mid-area level diff2[hx] stored in the mid-area level storage unit 67 is a value within a predetermined range. In step S51, for example, in the case that the mid-area level diff2[hx] stored in the mid-area level storage unit 67 is a value within the predetermined range, in step S52 the mid-area block level feature detecting unit 68, having considered the mid-area level diff2[hx] corresponding to the pixel of interest as having block level features, based on the determination results, sets a mid-area block level feature information bnstep2 to 1, and supplies this to the buffer hist2[hx] updating unit 69.

On the other hand, in step S51, for example in the case that the mid-area level diff2[hx] stored in the mid-area level storage unit 67 is not a value within the predetermined range, in step S53 the mid-area block level feature detecting unit 68 sets the mid-area block level feature information bnstep2 to 0, based on the determination results that the mid-area level diff2[hx] is not a value within the predetermined range, and supplies this to the buffer hist2[hx] updating unit 69.

In step S54, the buffer hist2[hx] updating unit 69 adds and stores the mid-area block level feature information bnstep2 to the buffer hist2[hx] stored in the mid-area distribution information buffer 52-2.

In step S55, the mid-area position determining unit 65 increments the counter hx by 1.

In step S56, the wide area position determining unit 70 determines whether or not the counter x is a multiple of 4. In step S56, in the case that the counter x is a multiple of 4, for example, in step S57 the wide area level calculating unit 71 sets the pixel shown with the coordinates (x, y) of the pixels in the rescaled image as the pixel of interest, calculates a wide area level diff3 with the pixel of interest and a reference pixel in a nearby wide area that is set corresponding to the pixel of interest, and stores the calculation results in the wide area level storage unit 72.

Figure 21:
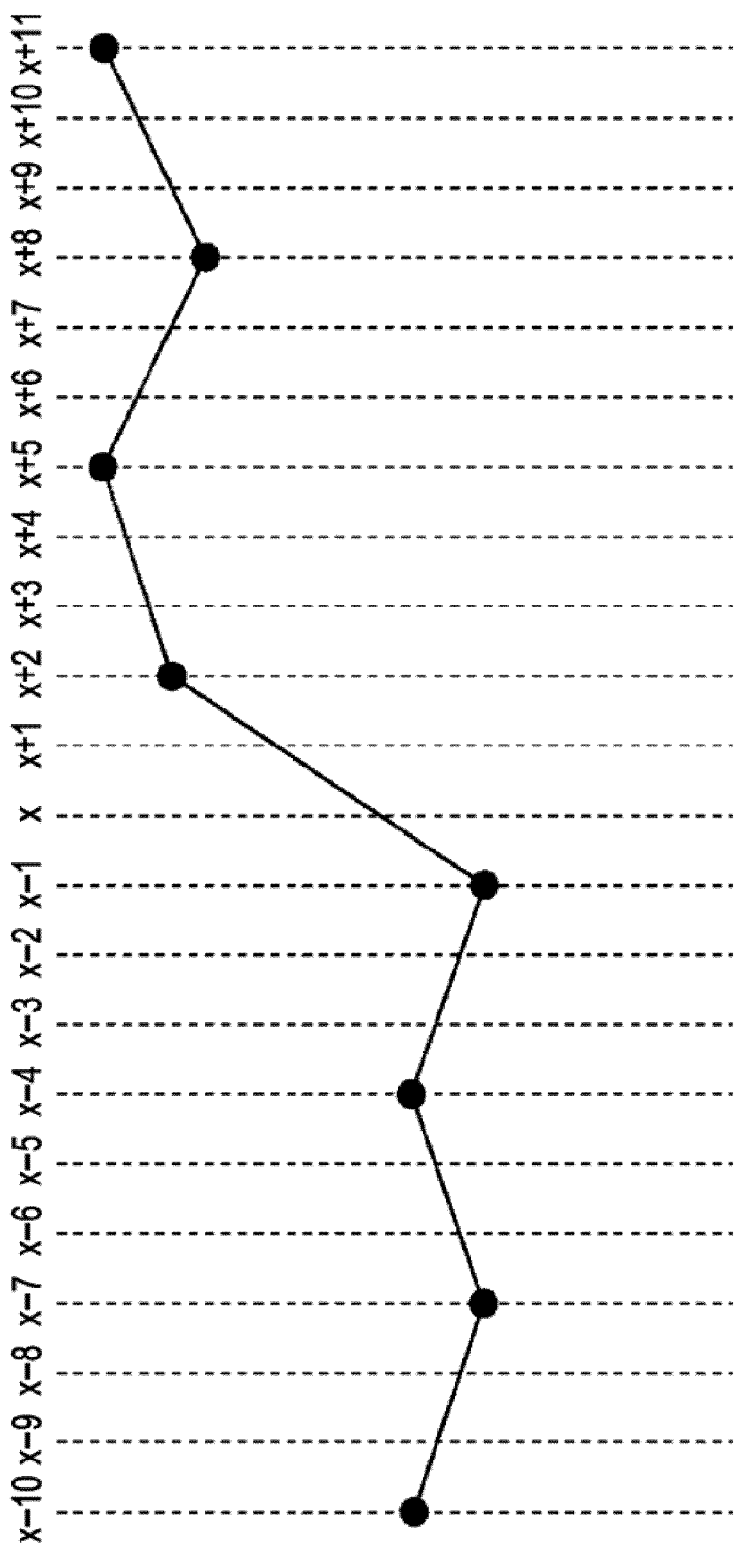
FIG. 21 is a diagram illustrating the block level information obtaining processing FIG. 17.

For example, in the case that eight pixels made up of one pixel adjacent one pixel apart to the right of the pixel of interest, three pixels adjacent with an interval of two pixels in the right direction from the pixel thereof, one pixel adjacent to the left of the pixel of interest, and three pixels adjacent with an interval of two pixels in the left direction from the pixel thereof, with the pixel of interest as the center are employed as reference pixels in a wide area, if we say that the coordinate position of the pixel of interest is x and express the pixel of interest as pixel P[x], as shown in FIG. 21, the pixel positions are expressed wherein the one pixel adjacent one pixel apart to the right of the pixel of interest is pixel P[x+2], the three pixels adjacent with an interval of two pixels in the right direction from the pixel adjacent to the right of the pixel of interest are pixels P[x+5], P[x+8], P[x+11] from the pixel nearest to the pixel of interest respectively, the one pixel adjacent to the left of the pixel of interest is pixel P[x−1], and the three pixels adjacent with an interval of two pixels in the left direction from the pixel adjacent to the left of the pixel of interest are pixels P[x−4], P[x−7], P[x−10] from the pixel nearest to the pixel of interest respectively. At this time, the wide area level calculating unit 71 calculates the wide area level diff3 of the pixel of interest by calculating the Expression (11) below. Note that in FIG. 21, the horizontal axis shows the pixel coordinate in the horizontal direction, and the vertical axis shows the pixel value of the corresponding pixel. Also, processing as to the horizontal direction is described here, but it goes without saying that an arrangement may be made wherein the processing as to the vertical direction may be made.

$$\text{diff3}[qx] = |P[x+2] - P[x-1]| - (|P[x-10] - P[x-7]| + |P[x-7] - P[x-4]| + |P[x-4] - P[x-1]| + |P[x+2] - P[x+5]| + |P[x+5] - P[x+8]| + |P[x+8] - P[x+11]|)/6 \quad (11)$$

Here, diff3[qx] indicates the wide area level of the pixel of interest P[x] when the counter x is a multiple of 4, and P[x+2], P[x+5], P[x+8], P[x+11], P[x−1], P[x−4], P[x−7], P[x−10] each indicate a pixel value of P[x+2], P[x+5], P[x+8], P[x+11], P[x−1], P[x−4], P[x−7], P[x−10].

That is to say, with the Expression (11), the wide area level diff3 is a value wherein the average value of the difference absolute value of the pixel values between pixels for each of between pixels P[x−10], P[x−7], between pixels P[x−7], P[x−4], between pixels P[x−4], P[x−1], between pixels P[x+2], P[x+5], between pixels P[x+5], P[x+8], and between pixels P[x+8], P[x+11], is subtracted from the difference absolute value of the pixel values of the pixel P[x+2] adjacent to the right one pixel apart and the pixel P[x−1] adjacent to the left with the pixel of interest P[x] as the center.

In step S58, the wide area block level feature detecting unit 73 determines whether or not the wide area level diff3[qx] stored in the wide area level storage unit 72 is a value within a predetermined range. In step S58, for example, in the case that the wide area level diff3[qx] stored in the wide area level storage unit 72 is a value within the predetermined range, in step S59 the wide area block level feature detecting unit 73, having considered the wide area level diff3[qx] corresponding to the pixel of interest as having block level features, based on the determination results, sets a wide area block level feature information bnstep3 to 1, and supplies this to the buffer hist3[qx] updating unit 74.

On the other hand, in step S58, for example in the case that the wide area level diff3[qx] stored in the wide area level storage unit 72 is not a value within the predetermined range, in step S60 the wide area block level feature detecting unit 73 sets the wide area block level feature information bnstep3 to 0, based on the determination results that the wide area level diff3[qx] is not a value within the predetermined range, and supplies this to the buffer hist3[qx] updating unit 74.

In step S61, the buffer hist1[qx] updating unit 74 adds and stores the wide area block level feature information bnstep3 to the buffer hist3[qx] stored in the wide area distribution information buffer 52-3.

In step S62, the wide area position determining unit 70 increments the counter qx by 1.

In step S63, the block level information obtaining unit 51 increments the counter x by 1.

In step S64, the block level information obtaining unit 51 determines whether or not the counter x is at or above the detection range xsize in the horizontal direction, and in the case that the counter x is neither at nor above, the processing is returned to step S44. That is to say, the processing in steps S44 through S64 is repeated. In step S64, in the case that the counter x is at or above the detection range xsize, in step S65 the block level information obtaining unit 51 increments the counter y by 1.

In step S66, the block level information obtaining unit 51 determines whether or not the counter y is at or above the detection range ysize in the vertical direction, and in the case that the counter y is neither at nor above, the processing is returned to step S43. That is to say, the processing in steps S43 through S66 is repeated. In step S66, in the case that the counter y is at or above the detection range ysize, the processing is ended.

Also, in the case that determination is made in step S49 that the counter x is not a multiple of 2, the processing in steps S50 through S55 is skipped. Further, in the case that determination is made in step S56 that the counter x is not a multiple of 4, the processing in steps S57 through S62 is skipped.

With the above-described processing, the pixel count in the horizontal direction considered to be block levels by the nearby pixels adjacent to each pixel of interest are stored as block level information in the narrow area distribution information buffer hist1[x], mid-area distribution information buffer hist2[hx], and wide area distribution information buffer hist3[qx] respectively in the narrow area distribution information buffer 52-1, mid-area distribution information buffer 52-2, and wide area distribution information buffer 52-3. At this time, the mid-area distribution information buffer hist2[hx] is used only when the counter x is a multiple of 2, so the number of times of detection is half of the narrow area distribution information buffer hist1[x]. Also, the wide area distribution information buffer hist3[qx] is used only when the counter x is a multiple of 4, so the number of times of detection is ¼ of the narrow area distribution information buffer hist1[x].

Note that the distribution information buffer should be in accordance with the block size, whereby a narrow area distribution information buffer hist1 corresponding to a relatively small block size, a mid-area distribution information buffer hist2 corresponding to a medium block size, and a wide area distribution information buffer hist3 corresponding to a relatively large block size, are used. On the other hand, with the later-described vertical detection processing, the distribution information buffer to be used can be identified from the horizontal block size obtained from the horizontal detection processing to a certain extent, whereby only the narrow area distribution information buffer, mid-area distribution information buffer, or wide area distribution information buffer have to be obtained.

Figure 17:
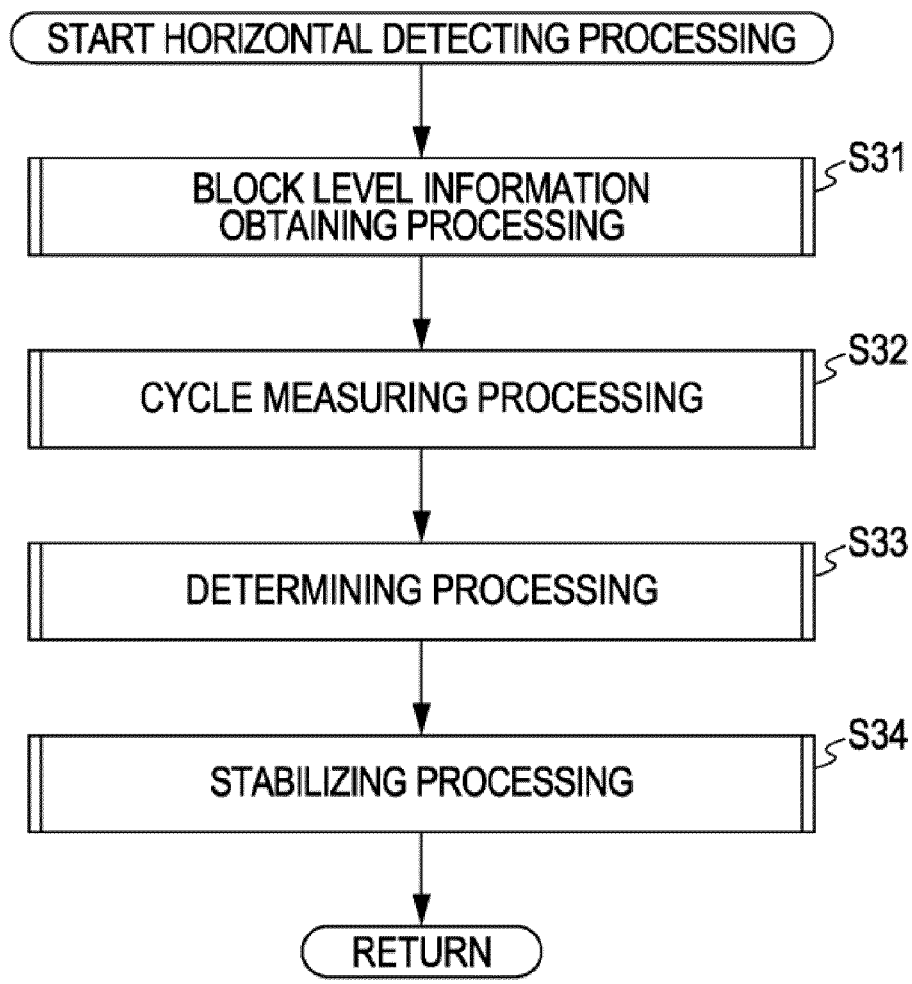
FIG. 17 is a flowchart describing the horizontal detecting processing in FIG. 16.

Let us now return to the flowchart in FIG. 17. Upon the block level information being obtained in step S31, the cycle measuring unit 53 executes cycle measuring processing in step S32 to measure occurrence frequency and short cycle information. Cycle measuring processing with the cycle measuring unit 53 will be described now with reference to the flowchart in FIG. 22.

In step S71, the cycle measuring unit 53 sets the distribution information buffer hist for measurement to be processed to the narrow area distribution information buffer hist1[x] stored in the narrow area distribution information buffer 52-1.

In step S72, the occurrence frequency measuring unit 91 executes occurrence frequency calculating processing as to the narrow area distribution information buffer hist1[x] to measure the occurrence frequency interval1[n].

Figure 23:
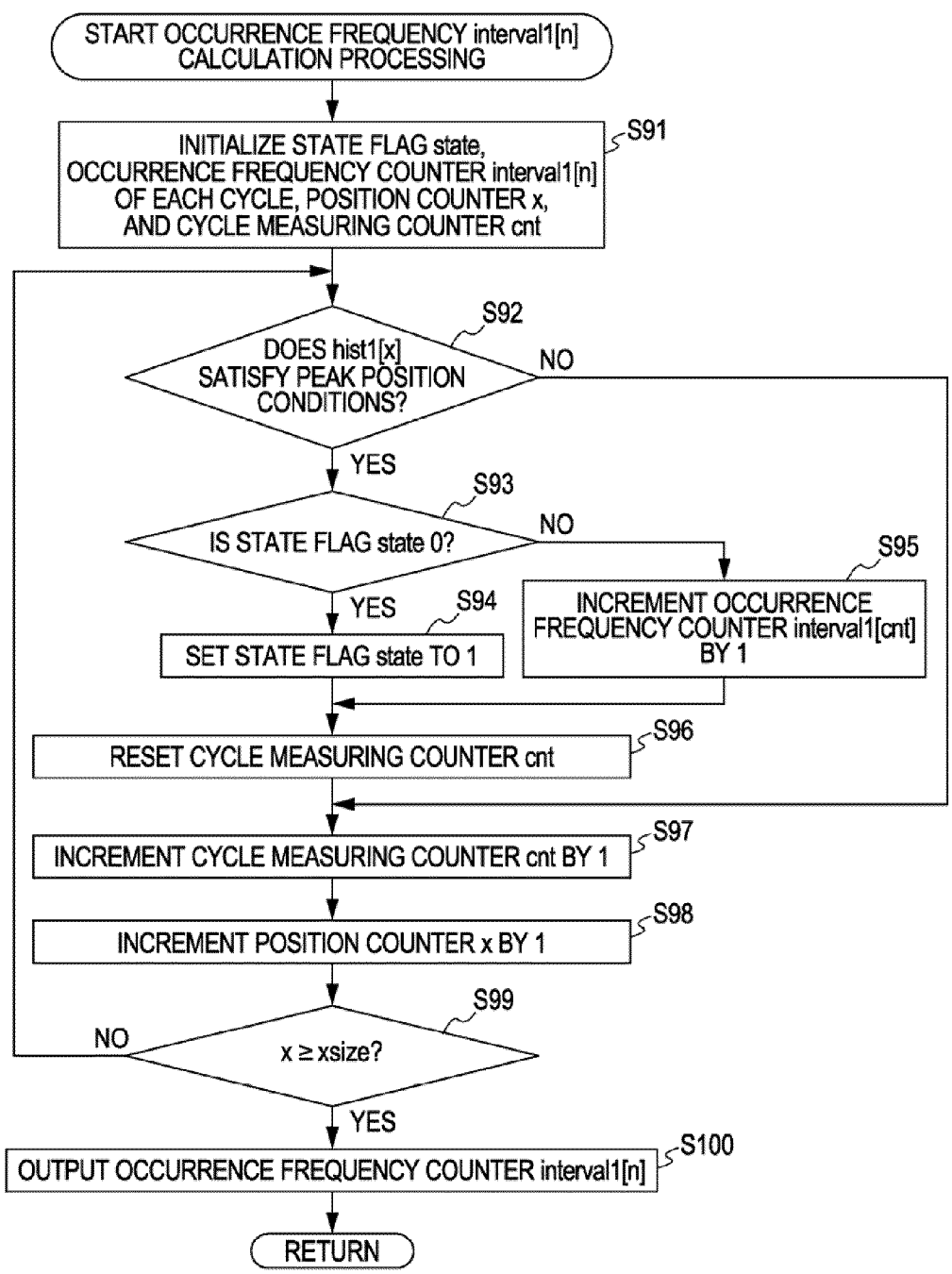
FIG. 23 is a flowchart describing the occurrence frequency interval1[n] calculation processing in FIG. 22.

The occurrence frequency calculating processing will be described now with reference to the flowchart in FIG. 23.

In step S91, the occurrence frequency measuring unit 91 initializes each of the state flag state, occurrence frequency counter interval1[n] that shows occurrence frequency of each cycle, position counter x, and cycle measuring counter cnt to 0.

In step S92, the peak determining unit 101 reads the narrow area distribution information buffer hist1[x] from the narrow area distribution information buffer 52-1 and the nearby values, and determines whether or not the value of the narrow area distribution information buffer hist1[x] satisfies the peak conditions. More specifically, for example, the peak determining unit 101 reads the narrow area distribution information buffer hist1[x] from the narrow area distribution information buffer 52-1 and the narrow area distribution information buffers hist1[x−n] through hist1[x+m] as nearby values thereto, and determines whether or not the narrow area distribution information buffer hist1[x] takes the maximum value of the narrow area distribution information buffers hist1 [x−n] through hist1[x+m] (where n and m are arbitrary integers), and whether or not this value is greater than the predetermined threshold value peak_th, thereby determining whether or not the peak conditions are satisfied.

In the case that determination is made in step S92 that the peak conditions are satisfied, for example, in step S93 the flag setting unit 102 determines whether or not the state flag state is 0. In the case that the peak conditions are satisfied for the first time in step S93 for example, the state flag state is 0, so the processing is advanced to step S94.

In step S94, the flag setting unit 102 sets the state flag state to 1.

In the case that the state, such as satisfying the peak conditions, is the second time or thereafter, the state flag state is set to 1 by the processing in step S94, and accordingly, determination is made in step S93 that the state flag state is 1, and the processing is advanced to step S95.

In step S95, the occurrence frequency updating unit 103 increments the occurrence frequency counter interval1[cnt] of the occurrence frequency counter 103a by 1.

In step S96, the occurrence frequency measuring unit 91 resets the cycle measuring counter cnt to 0.

In step S97, the occurrence frequency measuring unit 91 increments the cycle measuring counter cnt by 1.

In step S98, the occurrence frequency measuring unit 91 increments the position counter x by 1.

In step S99, the occurrence frequency measuring unit 91 determines whether or not the position counter x is at or above the xsize which is the horizontal size of the detection range. In the case that determination is made in step S99 that the position counter x is neither at nor above the xsize which is the horizontal size of the detection range, the processing is returned to step S92.

In the case that determination is made in step S99 that the position counter x is at or above the xsize which is the horizontal size of the detection range, in step S100 the output unit 104 reads out the occurrence frequency counter interval1[n] from the occurrence frequency counter 103a of the occurrence frequency updating unit 103, and outputs this to the determining unit 55.

On the other hand, in the case that the peak position conditions are not satisfied in step S92, the processing in steps S93 through S96 is skipped.

Each time a peak of the narrow area distribution information buffer hist1[x] detected as a peak with the above processing is detected, the occurrence frequency counter interval[n] is counted in intervals of peak occurrences, the number of detections in intervals of peak occurrences is measured as the occurrence frequency, and this is output to the determining unit 55.

Accordingly, in a case wherein an image having a horizontal block size of 8 pixels or 12 pixels is input and noise occurs in block increments, the likelihood is high for the interval1[8] or interval1[12] to be sequentially counted every 8 pixels or every 12 pixels from the position first detected as a peak. Also, when an image having a horizontal block size of 10.67 pixels is input, the likelihood is high for the interval1[10] or interval1[11] to be sequentially counted at a predetermined ratio after a peak was detected for the first time.

Figure 22:
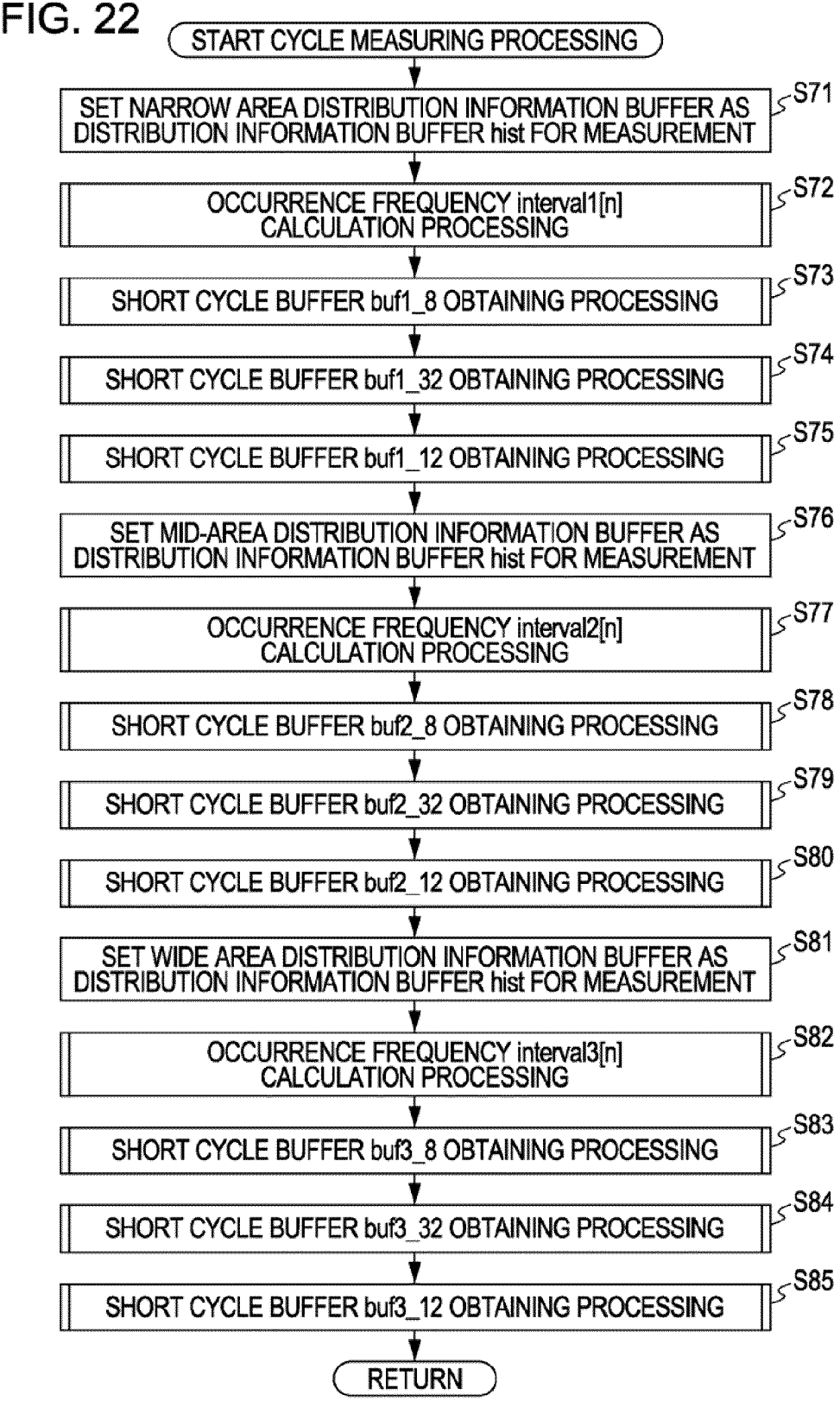
FIG. 22 is a flowchart describing the cycle measuring processing in FIG. 17.

Let us now return to the flowchart in FIG. 22. Upon the occurrence frequency calculating processing in step S72 ending, in step S73 the short cycle buffer obtaining unit 92 executes short cycle buffer buf1_8 obtaining processing to obtain a short cycle buffer.

The short cycle buffer buf1_8 obtaining processing will be described with reference to the flowchart in FIG. 24.

In step S111, the short cycle buffer obtaining unit 92 initializes the short cycle buffer buf1_8[phase] stored in the short cycle buffer 54 and the border condition occurrence total counter btotal1_8 to 0, and initializes the position counter x and phase counter phase together as 0.

In step S112, the peak determining unit 111 reads the narrow area distribution information buffer hist1[x] and the nearby values thereof from the narrow area distribution information buffer 52-1, and determines whether or not the value of the narrow area distribution information buffer hist1[x] satisfies the peak conditions. Note that the determining processing with the peak determining unit 111 is the same as the processing with the above-described peak determining unit 101, so description thereof will be omitted.

In the case that determination is made in step S112 that the peak conditions are satisfied, for example, the peak determining unit 111 supplies information indicating that the peak conditions are satisfied to the short cycle buffer updating unit 112 and the border condition occurrence total updating unit 113. Subsequently, in step S113, the short cycle buffer updating unit 112 increments the short cycle buffer buf1_8[phase] stored in the short cycle buffer 54 by 1.

On the other hand, in the case that determination is made in step S112 that the peak conditions are not satisfied, for example, the processing in step S113 is skipped.

In step S114, the border condition occurrence total updating unit 113 increments the border condition occurrence total counter btotal1_8 stored in the short cycle buffer 54 by 1.

In step S115, the short cycle buffer obtaining unit 92 increments the phase counter phase by 1.

In step S116, the short cycle buffer obtaining unit 92 determines whether or not the phase counter phase is at or above a measuring cycle P, i.e. whether or not the phase counter phase is at or above 8 which is the horizontal block size. In the case that the phase counter phase is at or above the measuring cycle P in step S116, for example, in step S117 the short cycle buffer obtaining unit 92 initializes the phase counter phase to 0.

Also, in the case that the phase counter phase is neither at nor above the measuring cycle P in step S116, for example, the processing in step S117 is skipped.

In step S118, the short cycle buffer obtaining unit 92 increments the position counter x by 1.

In step S119, the short cycle buffer obtaining unit 92 determines whether or not the position counter x is at or above the xsize which is the horizontal size in the detection range. In the case that the position counter x is neither at nor above the xsize which is the horizontal size in the detection range in step S119, the processing is returned to step S112.

In the case that the position counter x is at or above the xsize which is the horizontal size in the detection range in step S119, the processing is ended.

That is to say, with the above-described processing, the coordinates in the horizontal direction have a cycle of 0 through 8 with the phase counter phase, and the short cycle information which is the number of times that a peak is detected for each phase counter phase is counted as a short cycle buffer buf1_8[phase] in the short cycle buffer 54. Also, each time a peak is detected, the border condition occurrence total counter btotal1_8 is incremented by 1, regardless of the phase counter phase.

Let us now return to the flowchart in FIG. 22. Upon the short cycle buffer buf1_8 obtaining processing of the horizontal block size 8 pixels in the narrow area distribution information buffer hist1 in step S73 ending, in step S74 the short cycle buffer obtaining unit 92 executes short cycle buffer buf1_32 obtaining processing having a horizontal block size of 10.67 pixels in the narrow area distribution information buffer hist1, and obtains the border condition occurrence total counter btotal1_32 along with the short cycle buffer buf1_32. Note that the processing in step S74 is similar to the processing in step S73 other than the phase counter phase having a cycle of 0 through 32 instead of 0 through 8, so description thereof will be omitted. Also, in the case that the horizontal block size is 10.67 pixels, the reason that the number of cycles becomes 32 is that this is the least common multiple for 10.67 to become an integer.

Also, in step S75, the short cycle buffer obtaining unit 92 executes short cycle buffer buf1_12 obtaining processing wherein the horizontal block size in the narrow area distribution information buffer hist1 is 12 pixels, and obtains the border condition occurrence total counter btotal1_12 along with the short cycle buffer buf1_12. Note that the processing in step S75 is similar to the processing in step S73 other than the phase counter phase having a cycle of 0 through 12, so description thereof will be omitted.

With the processing in steps S71 through S75, the occurrence frequency counter interval1[n] for the narrow area distribution information buffer hist1 is obtained from the occurrence frequency measuring unit 91 and output to the determining unit 55, and the short cycle buffers buf1_8, buf1_32, and buf1_12 and the border condition occurrence total counters btotal1_8, btotal1_32, and btotal1_12 for the narrow area distribution information buffer hist1, are stored in the short cycle buffer 54.

Also, the processing in steps S76 through S80 are similar to the processing in steps S71 through S75, other than the mid-area distribution information buffer hist2 becoming the distribution information buffer hist for measurement, so with the processing in steps S76 through S80, the occurrence frequency counter interval2[n] for the mid-area distribution information buffer hist2 is obtained from the occurrence frequency measuring unit 91 and output to the determining unit 55, and the short cycle buffers buf2_8, buf2_32, and buf2_12 and the border condition occurrence total counters btotal2_8, btotal2_32, and btotal2_12 for the mid-area distribution information buffer hist2, are stored in the short cycle buffer 54.

Further, the processing in steps S81 through S85 are similar to the processing in steps S71 through S75, other than the narrow area distribution information buffer hist3 becoming the distribution information buffer hist for measurement, whereby with the processing in step S81 through S85, the occurrence frequency counter interval3[n] for the wide area distribution information buffer hist3 is obtained with the occurrence frequency measuring unit 91 and output to the determining unit 55, the short cycle buffer buf3_8, buf3_32, and buf3_12 and the border condition occurrence total counters btotal3_8, btotal3_32, and btotal3_12 of the wide area distribution information buffer hist3 is stored in the short cycle buffer 54.

With the above processing, with regard to each of the narrow area distribution information buffer hist1, mid-area distribution information buffer hist2, and wide area distribution information buffer hist3, the occurrence frequency for each interval that peak values occur is obtained as the occurrence frequency counters interval 1[n] through 3[n], and supplied to the determining unit 55, and the short cycle information for each of the horizontal block sizes 8, 10.67, and 12 based on each of the narrow area distribution information buffer hist1, mid-area distribution information buffer hist2, and wide area distribution information buffer hist3 are obtained as short cycle buffers buf1_8, buf1_32, buf1_12, buf2_8, buf2_32, buf2_12, buf3_8, buf3_32, and buf3_12, and further the border condition occurrence total counters btotal1_8, btotal1_32, btotal1_12, btotal2_8, btotal2_32, btotal2_12, btotal3_8, btotal3_32, and btotal3_12 indicating the number of times that peak values are detected are obtained, and stored in the short cycle buffer 54.

Figure 24:
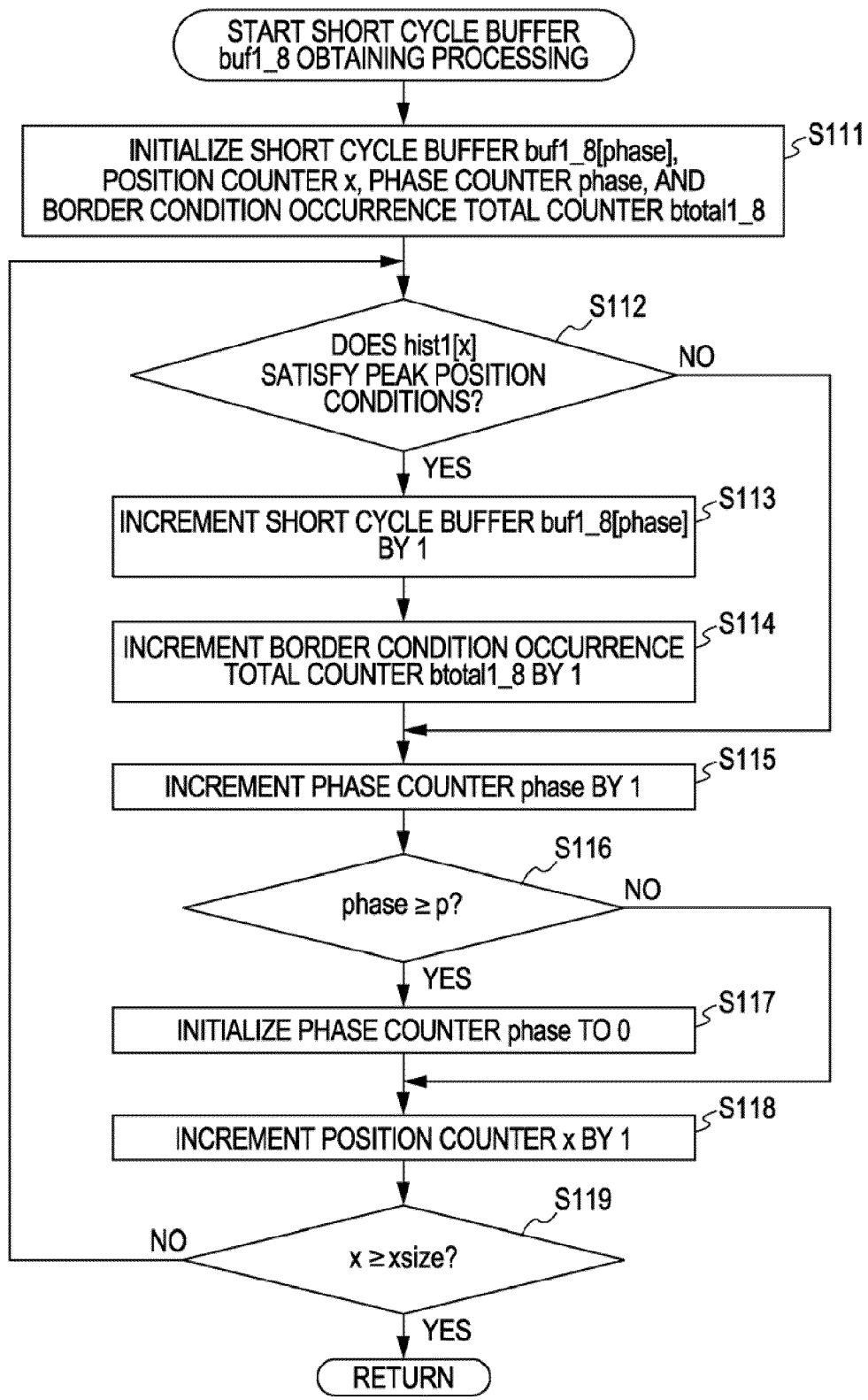
FIG. 24 is a flowchart describing the short cycle buffer buf1_8 obtaining processing in FIG. 22.

Note that with the present embodiment, as shown in the list L1 in FIG. 4, 24 and 48 pixels in the horizontal block size do not exist, whereby the short cycle buffer buf2_12 and border condition occurrence total counter btotal2_12 for the mid-area distribution information buffer hist2 and the short cycle buffer buf3_12 and border condition occurrence total counter btotal3_12 for the wide area distribution information buffer hist3 are not indispensable. Therefore, the processing in steps S80 and S85 in the flowchart in FIG. 22 may be omitted.

Let us now return to the flowchart in FIG. 17. Upon the cycle measuring processing being performed in step S32, the determining unit 55 executes determining processing in step S33, whereby the block size information in the horizontal direction and block border position information is determined, based on the occurrence frequency counters interval1[n] through 3[n] showing occurrence frequency obtained with the cycle measuring processing and the short cycle buffers buf1_8, buf1_32, buf1_12, buf2_8, buf2_32, buf2_12, buf3_8, buf3_32, and buf 3_12 and the border condition occurrence total counters btotal1_8, btotal1_32, btotal1_12, btotal2_8, btotal2_32, btotal2_12, btotal3_8, btotal3_32, and btotal 3_12, which show short cycle information.

Determining processing with the determining unit 55 will be described with reference to the flowchart in FIG. 25.

In step S141, the integer block size determining unit 161 executes narrow area block size 8 information obtaining processing based on the narrow area distribution information buffer hist1, and obtains the horizontal narrow area block size 8 information indicating the block size information and block border position information in the case that the horizontal block size becomes 8 pixels.

Figure 26:
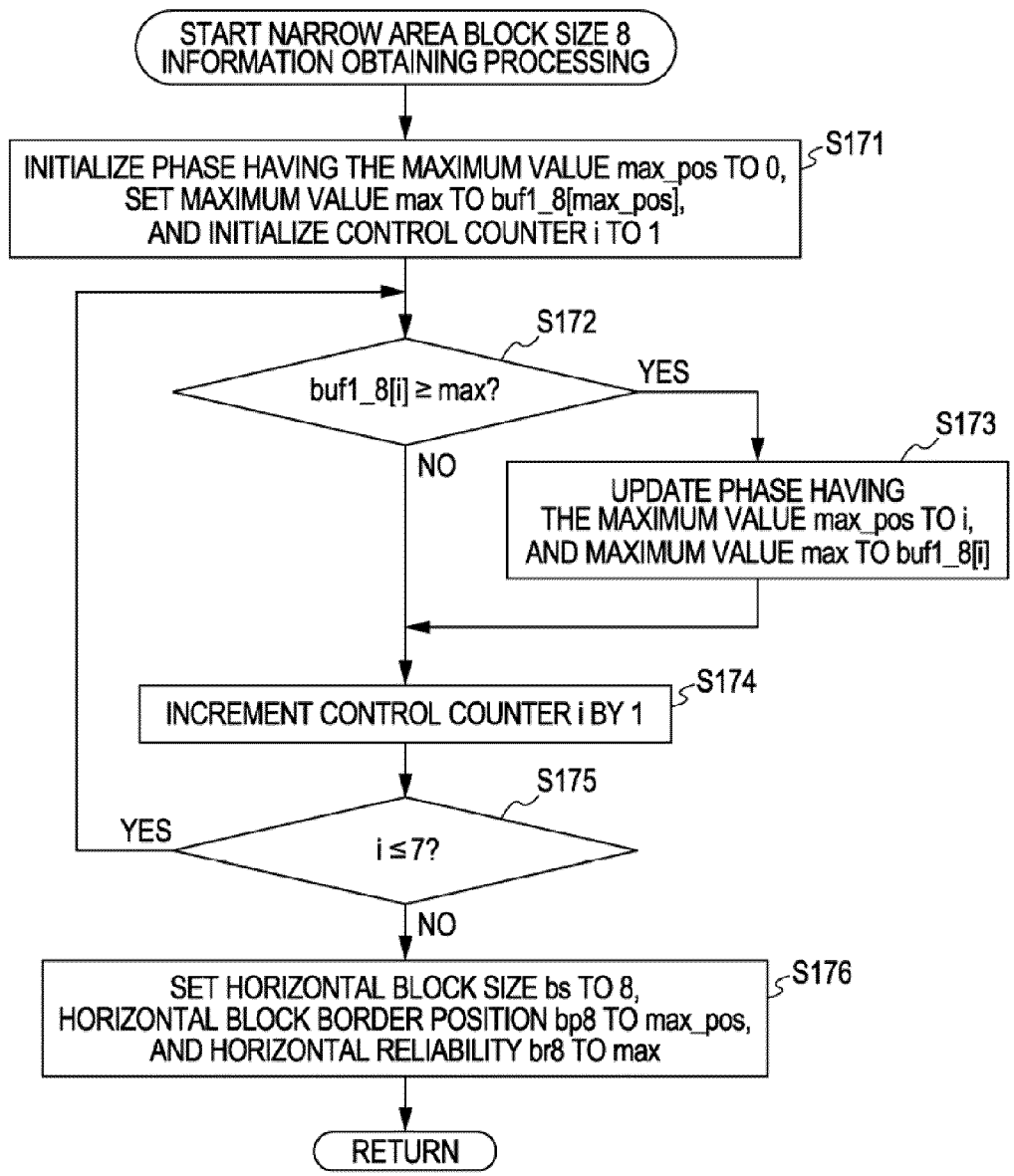
FIG. 26 is a flowchart describing the narrow area block size 8 information obtaining processing in FIG. 25.

Now, the narrow area block size 8 information obtaining processing based on the narrow area distribution information buffer hist1 will be described with reference to the flowchart in FIG. 26.

In step S171, the integer block size determining unit 161 of the narrow area processing unit 141 initializes the maximum value phase counter max_pos stored in the maximum value phase counter 176, and sets the maximum value counter max stored in the maximum value counter 174 to the short cycle buffer buf1_8[max_pos]. Also, the integer block size determining unit 161 initializes the control counter i which is controlled by the control counter 172 to 1.

In step S172, the short cycle buffer reading unit 171 reads the short cycle buffer buf1_8[i] specified with the control counter i from the short cycle buffer 54, and supplies this to the comparing unit 173. The comparing unit 173 determines whether or not the short cycle buffer buf1_8[i] is at or above the maximum value counter max.

In step S172, for example in the case that the short cycle buffer buf1_8[i] is at or above the maximum value counter max, the comparing unit 173 supplies the comparison results to the maximum value counter updating unit 175 and the maximum value phase counter updating unit 177. Subsequently, in step S173, the maximum value counter updating unit 175 updates the maximum value counter max of the maximum value counter 174 with the short cycle buffer buf1_8[i], based on the comparison results. Also, the maximum value phase counter updating unit 177 updates the maximum value phase counter max_pos of the maximum value phase counter 176 with the control counter i.

In step S174, the control counter 172 increments the control counter i by 1.

In step S175, the short cycle buffer reading unit 171 determines whether or not the control counter i is at or below 7 which is the final end of the number of cycles of the block size 8, and if at or below 7, the processing is returned to step S172, and the processing in steps S172 through S175 is repeated.

In the case that the control counter i is greater than 7 in step S175, in step S176 the determination result output unit 178 reads the maximum value counter max stored in the maximum value counter 174 and the maximum value phase counter max_pos stored in the maximum value phase counter 176. Subsequently, the determination result output unit 178 supplies information with 8 as the horizontal block size bs, the maximum value phase counter max_pos as the horizontal block border position bp8, and the value of the maximum value counter max as the horizontal reliability br8 as to the horizontal block size 8 to the narrow area candidate selecting unit 144 as the horizontal block size 8 information.

Note that hereafter, in order to distinguish the narrow area block size 8 information, mid-area block size 8 information, and wide area block size 8 information, as appropriate, regarding the narrow area block size 8 information, the horizontal block size bs will be referred to as a horizontal block size bs1, the horizontal block border position bp8 will be referred to as a horizontal block border position bp1_8, and the horizontal reliability br8 will be referred to as horizontal reliability br1_8; regarding the mid-area block size 8 information, the horizontal block size bs will be referred to as a horizontal block size bs2, the horizontal block border position bp8 will be referred to as a horizontal block border position bp2_8, and the horizontal reliability br8 will be referred to as horizontal reliability br2_8; and regarding the wide area block size 8 information, the horizontal block size bs will be referred to as a horizontal block size bs3, the horizontal block border position bp8 will be referred to as a horizontal block border position bp3_8, and the horizontal reliability br8 will be referred to as horizontal reliability br3_8, but in the case that distinguishing does not have to be made in particular, these are simply called a horizontal block size bs8, horizontal block border position bp8, and horizontal reliability br8, and other block sizes are also given similar references.

With the above-described processing, based on the short cycle information indicated with the short cycle buffer buf1_8 wherein the horizontal block size based on the narrow area distribution information buffer hist1 is 8 pixels, the horizontal block size 8 information including the horizontal block border position bp8 within the number of cycles in the case that the horizontal block size is 8 pixels, and the horizontal reliability br8 indicating the number of times of detection of a phase serving as the horizontal block border position bp8 are obtained as the horizontal narrow area block size 8 information.

Figure 25:
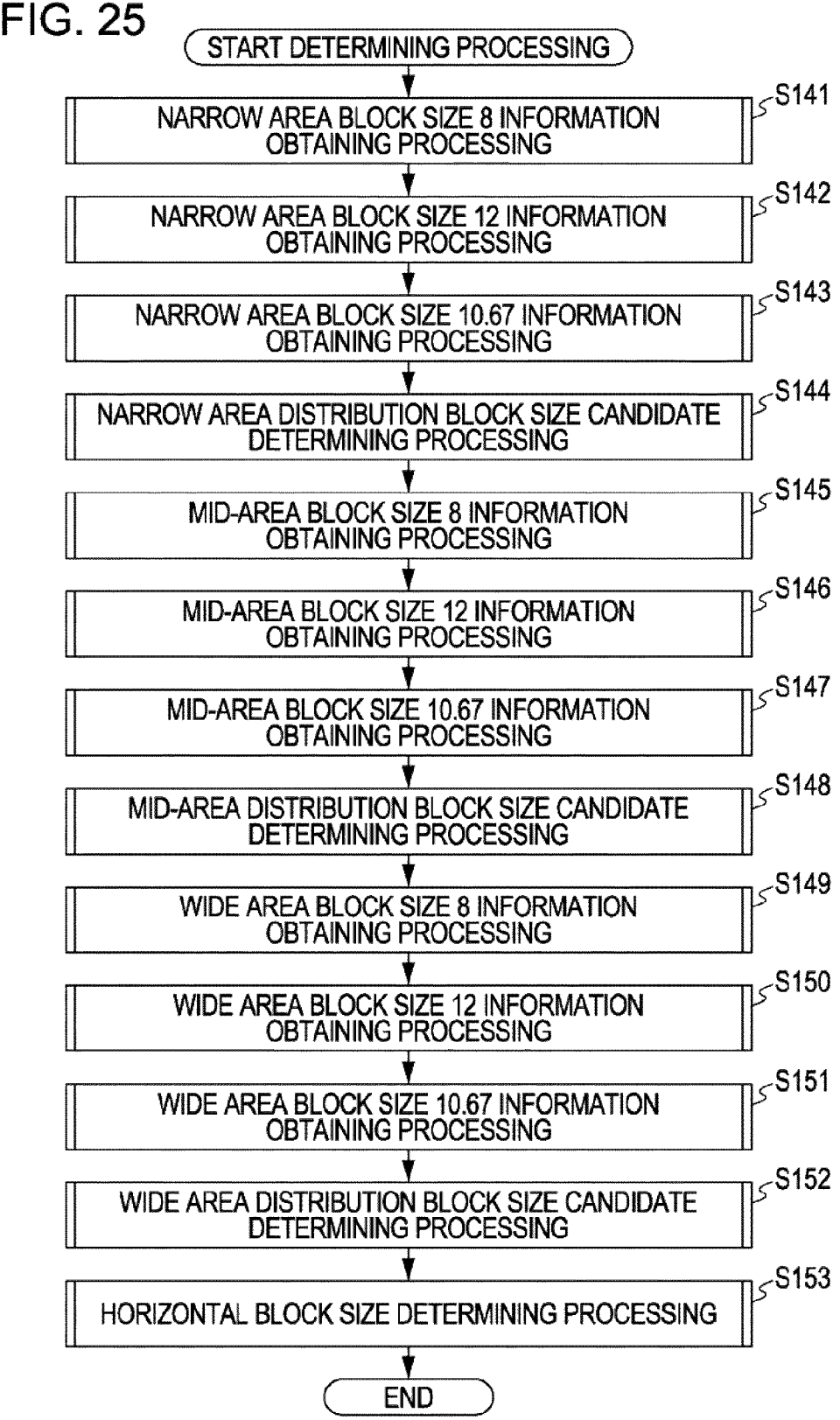
FIG. 25 is a flowchart describing the determining processing in FIG. 17.

Let us now return to the flowchart in FIG. 25. In step S142, the integer block size determining unit 161 executes the narrow area block size 12 information obtaining processing based on the narrow area distribution information buffer hist1, and obtains the horizontal narrow area block size 12 information indicating conditions for the horizontal block size to be 12 pixels. Note that the narrow area block size 12 information obtaining processing is processing similar to the narrow area block size 8 information obtaining processing, other than the short cycle buffer buf1_12 to be processed, and the threshold value in step S175 in FIG. 26 being changed from 7 to 12, so description thereof will be omitted.

In step S143, the integer block size determining unit 161 executes narrow area block size 10.67 information obtaining processing based on the narrow area distribution information buffer hist1, and obtains the horizontal narrow area block size 10.67 information indicating the block size information and block border position information in the case that the horizontal block size is 10.67 pixels.

Figure 27:
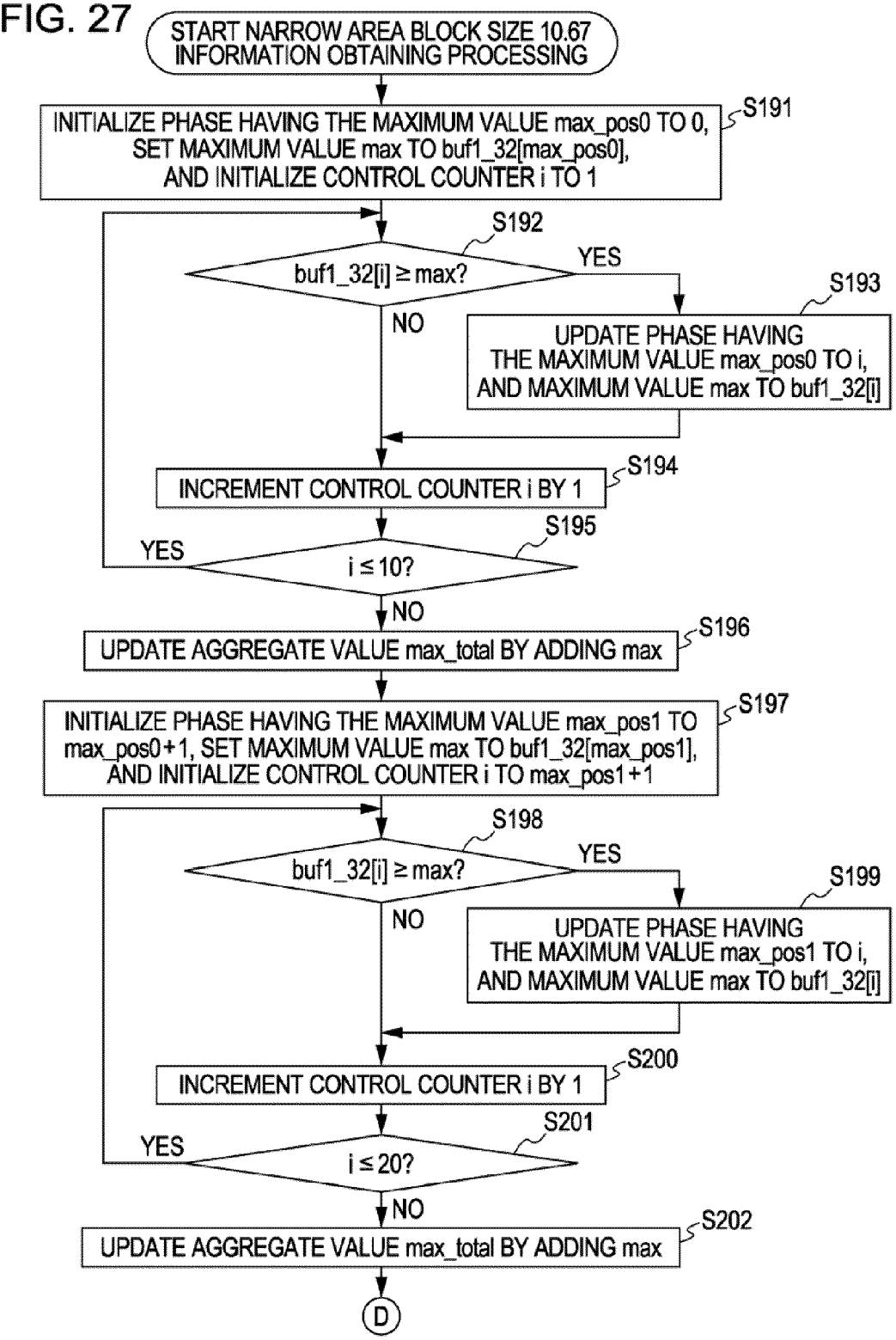
FIG. 27 is a flowchart describing the narrow area block size 10.67 information obtaining processing in FIG. 25.
Figure 28:
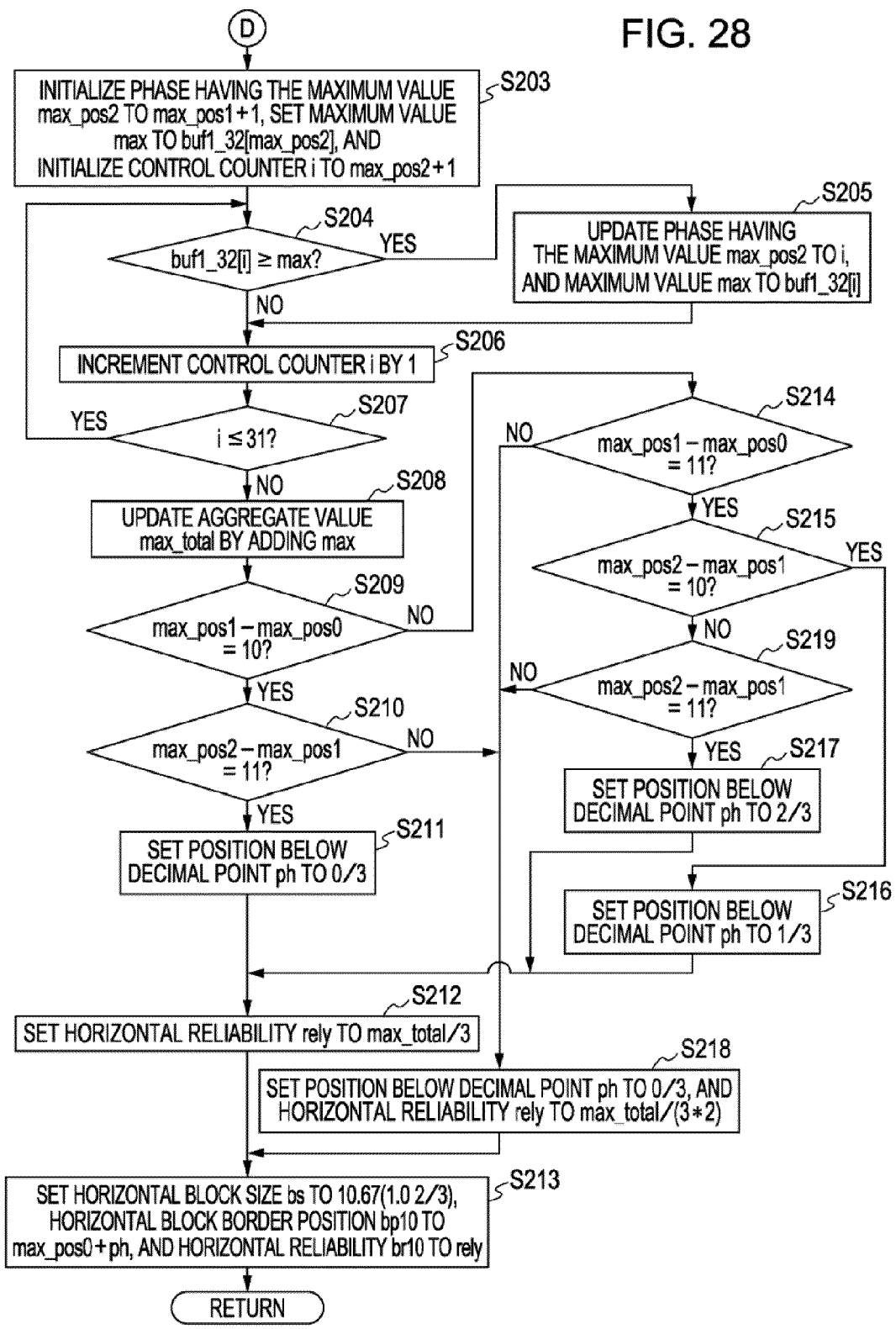
FIG. 28 is a flowchart describing the narrow area block size 10.67 information obtaining processing in FIG. 25.

Now, the narrow area block size 10.67 information obtaining processing based on the narrow area distribution information buffer hist1 will be described with reference to the flowchart in FIGS. 27 and 28. Note that the integer block size determining units 191-1 through 191-3 are each similar to the configuration with the integer block size determining unit 161, but the conditions for initializing and so forth are different. Thus, hereafter, the configuration for the integer block size determining units 191-1 through 191-3 will be described with "–1", "–2", "–3" as to each configuration with the integer block size determining unit 161.

In step S191, the integer block size determining unit 191-1 of the narrow area processing unit 141 initializes the maximum value phase counter max_pos0 stored in the maximum value phase counter 176-1 to 0, and sets the maximum value counter max stored in the maximum value counter 174-1 to the short cycle buffer buf1_32[max_pos0], while initializing the control counter i controlled by the control counter 172-1 to 1.

In step S192, the short cycle buffer reading unit 171-1 reads the short cycle buffer buf1_32[i] specified with the control counter i from the short cycle buffer 54, and supplies this to the comparing unit 173-1. The comparing unit 173-1 determines whether or not the short cycle buffer buf1_32[i] is at or above the maximum value counter max.

In the case that the short cycle buffer buf1_32[i] is at or above the maximum value counter max in step S192, for example, the comparing unit 173-1 supplies the comparison results to the maximum value counter updating unit 175-1 and the maximum value phase counter updating unit 177-1. Subsequently, in step S193, the maximum value counter updating unit 175-1 updates the maximum value counter max of the maximum value counter 174-1 with the short cycle buffer buf1_32[i], based on the comparison results. Also, the maximum value phase counter updating unit 177-1 updates the maximum value phase counter max_pos0 of the maximum value phase counter 176-1 with the control counter i.

In step S194, the control counter 172-1 increments the control counter i by 1.

In step S195, the short cycle buffer reading unit 171-1 determines whether or not the control counter i, of the 32 cycles (0 through 31) of the block size 10.67, is at or below 10, and in the case of being at or below 10, the processing is returned to step S192, and the processing in steps S192 through S195 is repeated.

In the case that the control counter i is greater than 10 in step S195, the determination results output unit 178-1 reads the maximum value counter max stored in the maximum value counter 174-1, and the maximum value phase counter max_pos0 stored in the maximum value phase counter 176, and supplies these to the comparison determining unit 192. Subsequently, in step S196, the comparison determining unit 192 adds the maximum value counter max to the aggregate value max_total, thereby updating the aggregate value max_total.

In step S197, the integer block size determining unit 191-2 of the narrow area processing unit 141 initializes the maximum value phase counter max_pos1 stored in the maximum value phase counter 176-2 to (max_pos0+1), and sets the maximum value counter max stored in the maximum value counter 174-2 to the short cycle buffer buf1_32[max_pos1], while initializing the control counter i controlled by the control counter 172-2 to max_pos1+1.

In step S198, the short cycle buffer reading unit 171-2 reads the short cycle buffer buf1_32[i] specified with the control counter i from the short cycle buffer 54, and supplies this to the comparing unit 173-2. The comparing unit 173-2 determines whether or not the short cycle buffer buf1_32[i] is at or above the maximum value counter max.

In the case that the short cycle buffer buf1_32[i] is at or above the maximum value counter max in step S198, for example, the comparing unit 173-2 supplies the comparison results to the maximum value counter updating unit 175-2 and the maximum value phase counter updating unit 177-2. Subsequently, in step S199, the maximum value counter updating unit 175-2 updates the maximum value counter max of the maximum value counters 174-2 with the short cycle buffer buf1_32[i] based on the comparison results. Also, the maximum value phase counter updating unit 177-2 updates the maximum value phase counter max_pos1 of the maximum value phase counter 176-2 with the control counter i.

In step S200, the control counter 172-2 increments the control counter i by 1.

In step S201, the short cycle buffer reading unit 171-2 determines whether or not the control counter i, of the 32 cycles (0 through 31) of the horizontal block size 10.67, is at or below 20, and in the case of being at or below 20, the processing is returned to step S198, and the processing in steps S198 through S201 is repeated.

In the case that the control counter i is greater than 20 in step S201, the determination result output unit 178-2 reads the maximum value counter max stored in the maximum value counter 174-2 and the maximum value phase counter max_pos1 stored in the maximum value phase counter 176-2, and supplies these to the comparison determining unit 192. Subsequently, in step S202, the comparison determining unit 192 adds the maximum value counter max to the aggregate value max_total, thereby updating the aggregate value max_total.

In step S203 (FIG. 28), the integer block size determining unit 191-3 of the narrow area processing unit 141 initializes the maximum value phase counter max_pos2 stored in the maximum value phase counter 176-3 to (max_pos1+1), and sets the maximum value counter max stored in the maximum value counter 174-3 to the short cycle buffer buf1_32[max_pos2], while initializing the control counter i controlled by the control counter 172-3 to max_pos2+1.

In step S204, the short cycle buffer reading unit 171-3 reads the short cycle buffer buf1_32[i] specified with the control counter i from the short cycle buffer 54, and supplies this to the comparing unit 173-3. The comparing unit 173-3 determines whether or not the short cycle buffer buf1_32[i] is at or above the maximum value counter max.

In the case that the short cycle buffer buf1_32[i] is at or above the maximum value counter max in step S204, for example, the comparing unit 173-3 supplies the comparison results to the maximum value counter updating unit 175-3 and the maximum value phase counter updating unit 177-3. Subsequently, in step S205, the maximum value counter updating unit 175-3 updates the maximum value counter max of the maximum value counter 174-3 with the short cycle buffer buf1_32[i] based on the comparison results. Also, the maximum value phase counter updating unit 177-3 updates the maximum value phase counter max_pos2 of the maximum value phase counter 176-3 with the control counter i.

In step S206, the control counter 172-3 increments the control counter i by 1.

In step S207, the short cycle buffer reading unit 171-2 determines whether or not the control counter i is at or below 31 which is the maximum value of the 32 cycles (0 through 31) of the horizontal block size 10.67, and in the case of being at or below 31, the processing is returned to step S204, and the processing in steps S204 through S207 is repeated.

In the case that the control counter i is greater than 31 in step S207, the determination results output unit 178-3 reads the maximum value counter max stored in the maximum value counter 174-3, and the maximum value phase counter max_pos2 stored in the maximum value phase counter 176-3, and supplies these to the comparison determining unit 192. Subsequently, in step S208, the comparison determining unit 192 adds the maximum value counter max to the aggregate value max_total, thereby updating the aggregate value max_total.

In step S209, the comparison determining unit 192 determines whether or not the value subtracting the maximum phase counter max_pos0 from the maximum phase counter max_pos1 becomes 10. In step S209, for example, in the case that the value subtracting the maximum phase counter max_pos0 from the maximum phase counter max_pos1 becomes 10, the processing is advanced to step S210.

In step S210, the comparison determining unit 192 determines whether or not the value subtracting the maximum phase counter max_pos1 from the maximum phase counter max_pos2 becomes 11. In step S210, for example, in the case that the value subtracting the maximum phase counter max_pos1 from the maximum phase counter max_pos2 becomes 11, in step S211, the comparison determining unit 192 determines the position ph below the decimal to be 0/3.

In step S212, the comparison determining unit 192 obtains the horizontal reliability "rely" by dividing the max_total by 3, and in step S213 supplies information with 10.67 as the horizontal block size bs, the value obtained by adding the position ph below the decimal to the value of the maximum value phase counter max_pos0 as the horizontal block border position bp10, and the value of the horizontal reliability rely as the horizontal reliability br10 as to the horizontal block size 10.67 to the narrow area candidate selecting unit 144 as the narrow area horizontal block size 10.67 information.

Also, in the case the that value subtracting the maximum phase counter max_pos0 from the maximum phase counter max_pos1 does not become 10 in step S209 for example, the processing is advanced to step S214.

In step S214, the comparison determining unit 192 determines whether or not the value subtracting the maximum phase counter max_pos0 from the maximum phase counter max_pos1 becomes 11. In the case that the value subtracting the maximum phase counter max_pos0 from the maximum phase counter max_pos1 becomes 11 in step S214, for example, the processing is advanced to step S215.

In step S215, the comparison determining unit 192 determines whether or not the value subtracting the maximum phase counter max_pos1 from the maximum phase counter max_pos2 becomes 10. In step S215, for example, in the case that the value subtracting the maximum phase counter max_pos1 from the maximum phase counter max_pos2 becomes 10, in step S216, the comparison determining unit 192 determines the position ph below the decimal to be 1/3.

Also, in step S215, for example if the value subtracting the maximum phase counter max_pos1 from the maximum phase counter max_pos2 does not become 10, in step S219 the comparison determining unit 192 determines whether or not the value subtracting the maximum phase counter max_pos1 from the maximum phase counter max_pos2 becomes 11. In step S219, in the case that the value subtracting the maximum phase counter max_pos1 from the maximum phase counter max_pos2 becomes 11 for example, in step S217 the comparison determining unit 192 determines the position ph below the decimal to be 2/3.

In the case that the value subtracting the maximum phase counter max_pos1 from the maximum phase counter max_pos2 does not become 11 in step S210 for example, in the case that the value subtracting the maximum phase counter max_pos0 from the maximum phase counter max_pos1 does not become 11 in step S214 for example, or in the case that the value subtracting the maximum phase counter max_pos1 from the maximum phase counter max_pos2 does not become 11 in step S219 for example, in step S218 the comparison determining unit 192 considers this not to be the correct value, and determines the position ph below the decimal to be 0/3, but by dividing the max_total by a value which is greater than 3 (shown in FIG. 28 as 3×2 but a value greater than this may be used), the value thereof is taken as the horizontal reliability rely, thereby reducing the horizontal reliability rely.

That is to say, as described above, setting the number of cycles to 32 to correspond with the horizontal block size of 10.67 pixels is because 32 is the least common multiple for 10.67 to become an integer, and to divide the cycle segments into 3 segments to obtain the position below the decimal from a mutual relation with the horizontal block border position in each segment.

With the above-described processing, horizontal block size 10.67 information including the horizontal block border position bp10 within the number of cycles in the case that the horizontal block size is 10.67 pixels (bs=10.67), and the horizontal reliability br10 which indicates the number of detection times of a phase reaching the horizontal block border position bp10, are obtained as horizontal narrow area block size 10.67 information based on the short cycle buffer buf1_32 wherein the horizontal block size is 10.67 pixels based on the narrow area distribution information buffer hist1.

Let us now return to the flowchart in FIG. 25. Upon the narrow area block size 10.67 information obtaining processing being executed in step S143, in step S144 the narrow area candidate selecting unit 144 executes narrow areas distribution block size candidate determining processing, and selects a candidate for the horizontal block size and horizontal block border position based on the narrow area distribution information buffer hist1.

Figure 29:
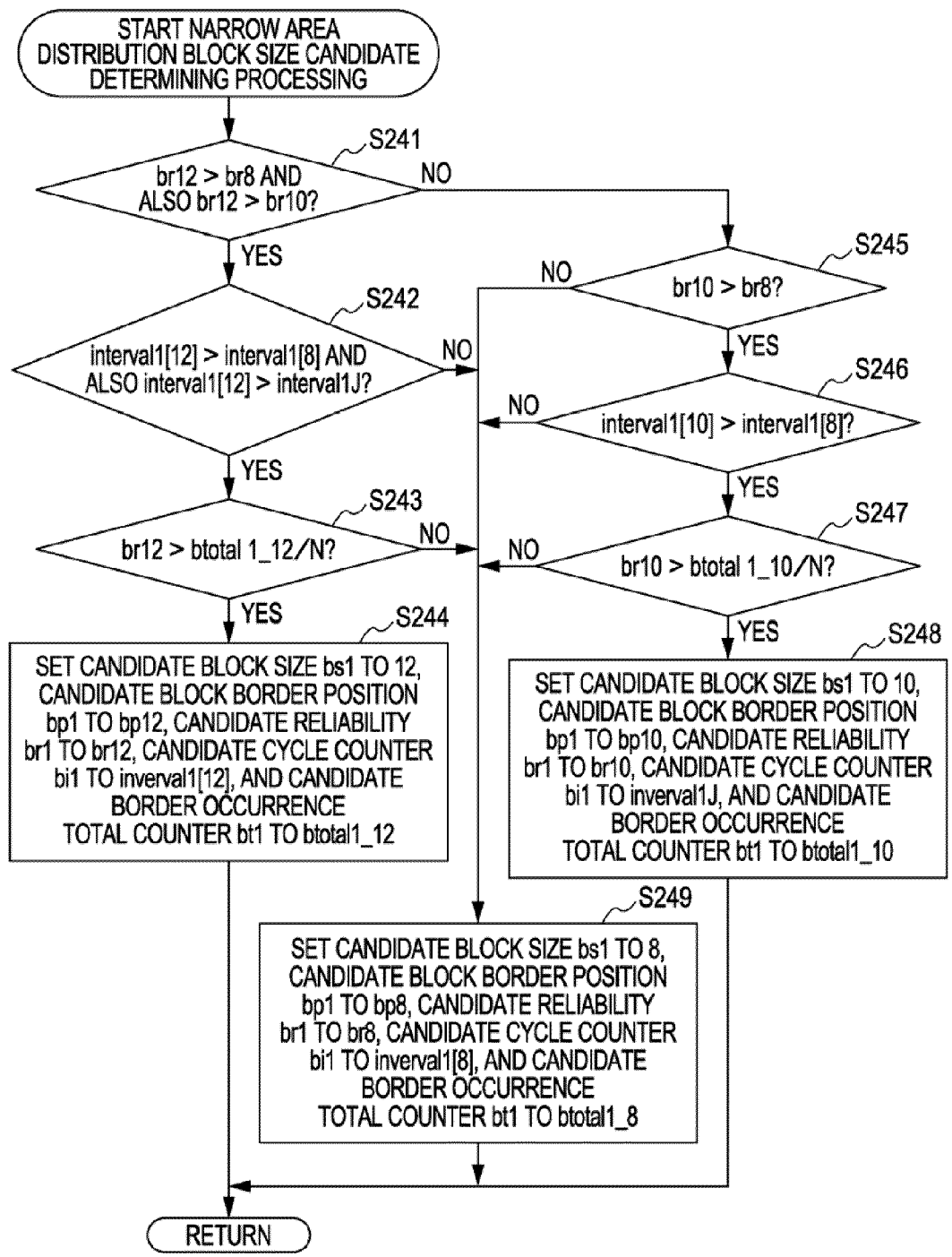
FIG. 29 is a flowchart describing the narrow area distribution block size candidate determining processing in FIG. 25.

The narrow area distribution block size candidate selecting processing will be described with reference to the flowchart in FIG. 29.

In step S241, the narrow area candidate selecting unit 144 controls the reliability comparing unit 144a, and determines whether or not the horizontal reliability br12 is greater than the horizontal reliability br10 and whether or not the horizontal reliability br12 is greater than the horizontal reliability br8. That is to say, determination is made as to whether or not the horizontal reliability is the highest with the horizontal block size 12. In the case that, in step S241, for example the horizontal reliability br12 is greater than the horizontal reliability br10 and the horizontal reliability br12 is greater than the horizontal reliability br8, the processing is advanced to step S242.

In step S242, the narrow area candidate selecting unit 144 controls the occurrence frequency comparing unit 144b, and determines whether or not the occurrence frequency interval1[12] is greater than the occurrence frequency interval1[8], and whether or not the occurrence frequency interval1[12] is greater than the occurrence frequency interval1J. Note that the occurrence frequency interval1J is the sum of the occurrence frequencies interval1[10] and interval1[11], and indicate the occurrence frequency with the horizontal block size of 10.67 pixels. Accordingly, determination is made in step S242 as to whether or not the occurrence frequency with the horizontal block size 12 is the highest. In the case that the occurrence frequency interval1[12] is greater than the occurrence frequency interval1[8] and the occurrence frequency interval1[12] is greater than the occurrence frequency interval1J in step S242, the processing is advanced to step S243.

In step S243, the narrow area candidate selecting unit 144 determines whether or not the horizontal reliability br12 is greater than the border condition occurrence total counter btotal1_12/N. N is a predetermined constant. That is to say, in step S243, determination is made as to whether or not the horizontal reliability br12 exists with a predetermined ratio as to the border condition occurrence total counter btotal1_12. In the case that determination is made in step S243 that for example the horizontal reliability br12 is greater than the border condition occurrence total counter btotal1_12/N, in step S244 the narrow area candidate selecting unit 144 selects the horizontal block size 12 as the candidate block size bs1 of the narrow area distribution information hist1, while setting bp12, br12, interval1[12], and btotal1_12 as the candidate block border position bp1, candidate reliability br1, candidate cycle counter bi1, and candidate border condition occurrence total counter bt1 respectively, to correspond thereto, and supplies these to the integrated selecting unit 147.

On the other hand, in the case that for example the horizontal reliability br12 is greater than the horizontal reliability br10 and the horizontal reliability br12 is not greater than the horizontal reliability br8 in step S241, the processing is advanced to step S245.

In step S245, the narrow area candidate selecting unit 144 controls the reliability comparing unit 144a to determine whether or not the horizontal reliability br10 is greater than the horizontal reliability br8. That is to say, determination is made as to whether or not the horizontal reliability is the highest with the horizontal block size 10. In the case that for example the horizontal reliability br10 is greater than the horizontal reliability br8 in step S245, the processing is advanced to step S246.

In step S246, the narrow area candidate selecting unit 144 controls the occurrence frequency comparing unit 144b to determine whether or not the occurrence frequency interval1[10] is greater than the occurrence frequency interval1[8]. In the case that the occurrence frequency interval1[10] is greater than the occurrence frequency interval1[8] in step S246, the processing is advanced to step S247.

In step S247, the narrow area candidate selecting unit 144 determines whether or not the horizontal reliability br10 is greater than the border condition occurrence total counter btotal1_10/N. That is to say, in step S247, determination is made as to whether or not the horizontal reliability br10 exists at or above a predetermined ratio as to the border condition occurrence total counter btotal1_10/N. In the case that determination is made in step S247 that, for example the horizontal reliability br10 is greater than the border condition occurrence total counter btotal1_10/N, in step S248 the narrow area candidate selecting unit 144 selects the horizontal block size 10 as the candidate block size bs1 of the narrow area distribution information buffer hist1, while setting bp10, br10, interval1[10], and btotal1_10 as the candidate block border position bp1, candidate reliability br1, candidate cycle counter bi1, and candidate border condition occurrence total counter bt1 respectively, to correspond thereto, and supplies these to the integrated selecting unit 147.

In the case that, in step S242, the occurrence frequency interval1[12] is not greater than the occurrence frequency interval1[8] or the occurrence frequency interval1[12] is not greater than the occurrence frequency interval1J, in the case that for example the horizontal reliability br12 is not greater than the border condition occurrence total counter btotal1_12/N in step S243, in the case that for example the horizontal reliability br10 is not greater than the horizontal reliability br8 in step S245, in the case that the occurrence frequency interval1[10] is not greater than the occurrence frequency interval1[8] in step S246, or in the case that for example the horizontal reliability br10 is not greater than the border condition occurrence total counter btotal1_10/N in step S247, in step S249 the narrow area candidate selecting unit 144 selects the horizontal block size 8 as the candidate block size bs1 of the narrow area distribution information buffer hist1, while setting bp8, br8, interval1[8], and btotal1_8 as the candidate block border position bp1, candidate reliability br1, candidate cycle counter bi1, and candidate border condition occurrence total counter bt1 respectively, to correspond thereto, and supplies these to the integrated selecting unit 147.

That is to say, a horizontal block size wherein the reliability information is the highest, the occurrence frequency is the highest, and the block size being at or above a predetermined ratio as to the border condition occurrence total counter, is selected as a candidate based on the narrow area distribution information buffer hist1. Note that hereafter, the candidate block size bs1, candidate block border position bp1, candidate reliability br1, candidate cycle counter bi1, and candidate border condition occurrence total counter bt1 are summarized and called the candidate block information which is obtained based on the narrow area distribution information buffer hist1.

Based on the narrow area distribution information buffer hist1 from the above-described processing, a horizontal block size wherein the reliability information is the highest, the occurrence frequency is the highest, and the block size being at or above a predetermined ratio as to the border condition occurrence total counter, can be selected as a candidate for the horizontal block size of the narrow area distribution information buffer hist1.

Let as now return to the flowchart in FIG. 25. That is to say, the horizontal narrow area block size 8, 12, and 10.67 information is obtained with the processing in steps S141 through S144, and based on these the candidate block size bs1, candidate block border position bp1, candidate reliability br1, candidate cycle counter bi1, and candidate border condition occurrence total counter bt1 are obtained as the candidate block information of the narrow area distribution information buffer hist1.

Similarly, in steps S145 through S148, the horizontal mid-areas block size 8, 12, and 10.67 information is obtained from the mid-area processing unit 142 with the processing in steps S145 through S147 respectively. In step S148, the mid-area candidate selecting unit 145 controls the reliability comparing unit 145a and occurrence frequency comparing unit 145b, thereby executing mid-area block size candidate determining processing. With this processing, the candidate block size bs2, candidate block border position bp2, candidate reliability br2, candidate cycle counter bi2, and candidate border condition occurrence total counter bt2 are obtained as the candidate block information of the mid-area distribution information buffer hist2, and supplied to the integrated selecting unit 147.

Further, in steps S149 through S152, the horizontal wide area block size 8, 12, and 10.67 information is obtained from the wide area processing unit 143 with the processing in steps S149 through S151 respectively. In step S152, the wide area candidate selecting unit 146 controls the reliability comparing unit 146a and occurrence frequency comparing unit 146b, thereby executing wide area distribution block size candidate determining processing. With this processing, the candidate block size bs3, candidate block border position bp3, candidate reliability br3, candidate cycle counter bi3, and candidate border condition occurrence total counter bt3 are obtained as the candidate block information of the wide area distribution information buffer hist3, and supplied to the integrated selecting unit 147.

In step S153, the integrated selecting unit 147 executes horizontal block size determining processing to determine the horizontal block size and horizontal block border position.

Figure 30:
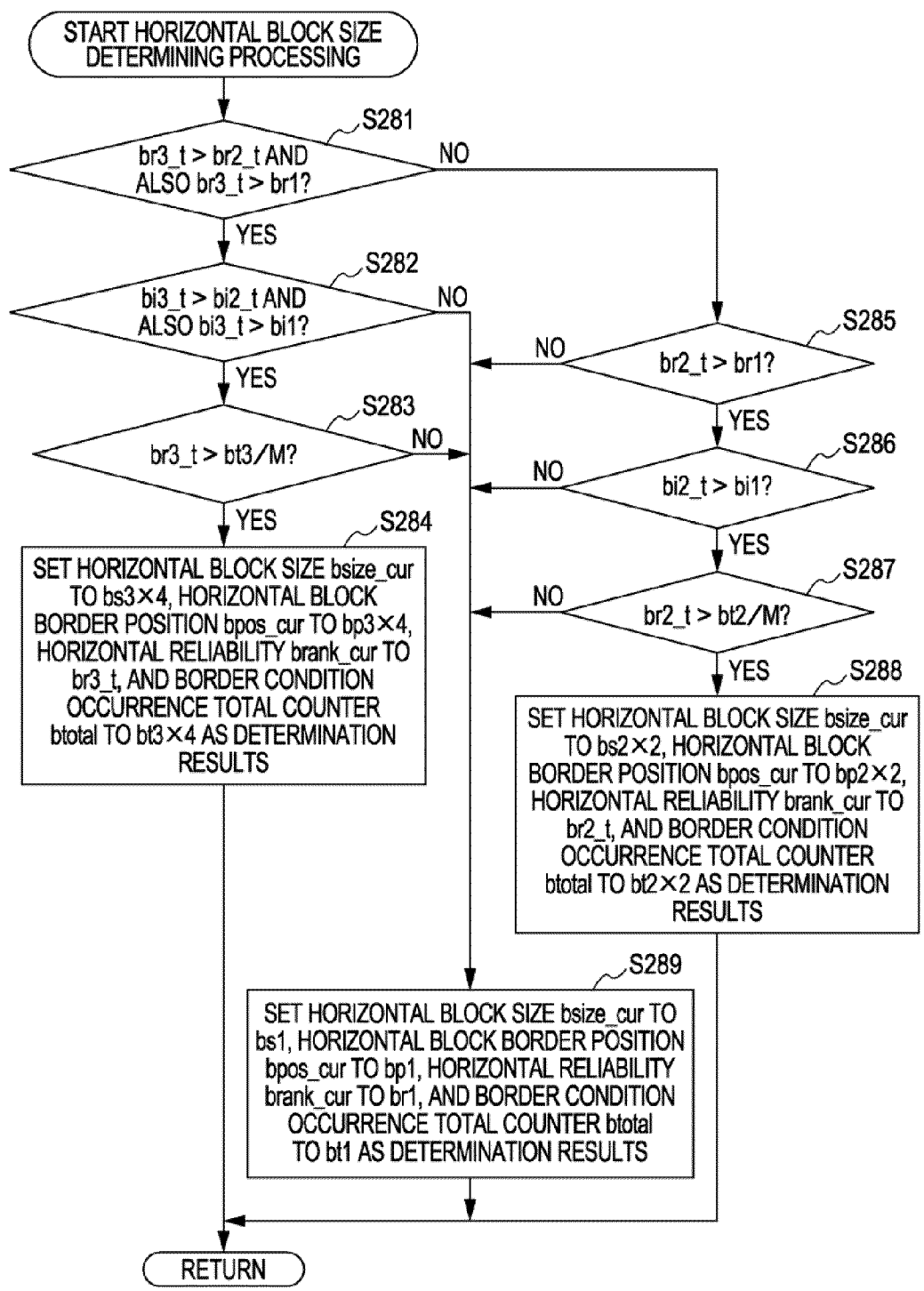
FIG. 30 is a flowchart describing the horizontal block size determining processing in FIG. 25.

Description will be given now regarding the horizontal block size determining processing, with reference to the flowchart in FIG. 30.

In step S281, the integrated selecting unit 147 controls the reliability comparing unit 147a to determine whether or not the candidate reliability $br3\_{}_t$ is greater than the candidate reliability $br2\_{}_t$ and the candidate reliability $br3\_{}_t$ is greater than the candidate reliability br1. That is to say, determination is made as to whether or not the candidate reliability $br3\_{}_t$ is at the maximum value.

Note that the mid-area distribution information buffer hist2 is data only in the case that the position counter x in the horizontal direction is an even number. Thus, the candidate reliability $br2\_{}_t$ doubles the candidate reliability br2, thereby showing a normalized value for the purpose of comparison with the candidate reliability br1. Also, the wide area distribution information buffer hist3 is data only in the case that the position counter x in the horizontal direction is a multiple of 4. Thus, the candidate reliability $br3\_{}_t$ multiplies the candidate reliability br3 by 4, thereby showing a normalized value for the purpose of comparison with the candidate reliability br1.

In the case that the candidate reliability $br3\_{}_t$ is greater than the candidate reliability $br2\_{}_t$ and the candidate reliability $br3\_{}_t$ is greater than the candidate reliability br1 in step S281, the processing is advanced to step S282.

In step S282, the integrated selecting unit 147 controls the occurrence frequency comparing unit 147b to determine whether or not the candidate cycle counter $bi3\_{}_t$ is greater than the candidate cycle counter $bi2\_{}_t$ and the candidate cycle counter $bi3\_{}_t$ is greater than the candidate cycle counter bi1.

Note that the candidate cycle counters $bi2\_{}_t$ and $bi3\_{}_t$ are also similar to the candidate reliability $br2\_{}_t$ and $br3\_{}_t$, and are each normalized value wherein the candidate cycle counter bi2 is doubled and bi3 is multiplied by 4, respectively.

In the case that for example the candidate cycle counter $bi3\_{}_t$ is greater than the candidate cycle counter $bi2\_{}_t$ and the candidate cycle counter $bi3\_{}_t$ is greater than the candidate cycle counter bi1 in step S282, in step S283 the integrated selecting unit 147 controls the concentration comparing unit 147c to determine whether or not the candidate reliability $br3\_{}_t$ is greater than a predetermined ratio 1/M of the candidate border condition occurrence total counter bt3, and determines the concentration of the candidate reliability $br3\_{}_t$ obtained from the wide area distribution information buffer hist3.

In the case that the candidate reliability $br3\_{}_t$ is determined to be greater than the predetermined ratio 1/M of the candidate border condition occurrence total counter bt3 in step S283, the processing is advanced to step S284.

In step S284, the integrated selecting unit 147 selects the candidate block size bs3 and candidate border position bp3 of the wide area distribution information buffer hist3 as the determination results, and outputs the horizontal block size bsize_cur as 4 times the candidate block size bs3, the horizontal block border position bpos_cur as 4 times the candidate block border position bp3, the horizontal reliability brank_cur as the candidate reliability $br3\_{}_t$, and the border condition occurrence total counter btotal as 4 times the candidate border condition occurrence total counter bt3.

Also, in the case that the candidate reliability $br3\_{}_t$ is not greater than the candidate reliability $br2\_{}_t$ or the candidate reliability $br3\_{}_t$ is not greater than the candidate reliability br1 in step S281, the processing is advanced to step S285.

In the case that the candidate reliability $br2\_{}_t$ is greater than the candidate reliability br1 in step S285, the processing is advanced to step S286.

In step S286, the integrated selecting unit 147 controls the occurrence frequency comparing unit 147b to determine whether or not the candidate cycle counter $bi2\_{}_t$ is greater than the candidate cycle counter bi1.

In the case that the candidate cycle counter $bi2\_{}_t$ is greater than the candidate cycle counter bi1 in step S286 for example, in step S287 the integrated selecting unit 147 controls the concentration comparing unit 147c to determine whether or not the candidate reliability $br2\_{}_t$ is greater than the predetermined ratio 1/M of the candidate border condition occurrence total counter bt2, and determines the concentration of the candidate reliability $br2\_{}_t$ obtained from the mid-area distribution information buffer hist2.

In the case that the candidate reliability $br2\_{}_t$ is determined to be greater than the predetermined ratio 1/M of the candidate border condition occurrence total counter bt2 in step S287, the processing is advanced to step S288.

In step S288, the integrated selecting unit 147 selects the candidate block size bs2 and candidate border position bp2 of the mid-area distribution information buffer hist2 as the determination result, and outputs the horizontal block size bsize_cur as double the candidate block size bs2, the horizontal block border position bpos_cur as double the candidate block border position bp2, the horizontal reliability brank_cur as candidate reliability $br2\_{}_t$, and the border condition occurrence total counter btotal as double the candidate border condition occurrence total counter bt2.

Further, in the case that, in step S282, for example the candidate cycle counter $bi3\_{}_t$ is not greater than the candidate cycle counter $bi2\_{}_t$ or the candidate cycle counter $bi3\_{}_t$ is not greater than the candidate cycle counter bi1, in the case that determination is made in step S283 that the candidate reliability $br3\_{}_t$ is not greater than the predetermined ratio M of the candidate border condition occurrence total counter bt3, in the case that the candidate reliability $br2\_{}_t$ is not greater than the candidate reliability br1 in step S285, in the case that for example the candidate cycle counter $bi2\_{}_t$ is not greater than the candidate cycle counter bi1 in step S286, or in the case that the candidate reliability $br2\_{}_t$ is not greater than the predetermined ratio 1/M of the candidate border condition occurrence total counter bt2 in step S287, in step S289 the integrated selecting unit 147 selects the candidate block size bs1 and candidate border position bp1 of the narrow area distribution information buffer hist1 as determination results, and outputs the horizontal block size bsize_cur which is the candidate block size bs1, the horizontal block border position bpos_cur which is the candidate block border position bp1, the horizontal reliability brank_cur which is the candidate reliability br1, and the border condition occurrence total counter btotal which is the candidate border condition occurrence total counter bt1.

With the above-described processing, a candidate block wherein the candidate reliability is greatest and the candidate cycle counter is greatest and the candidate reliability is greater than the predetermined ratio as to the candidate border condition occurrence total counter, candidate block border position, candidate reliability, and candidate border condition occurrence total counter can be output as the horizontal block information measured with the current rescaled image.

Let us now return to the flowchart in FIG. 17.

With the determining processing in step S33, the horizontal block information measured for the current rescaled image is obtained.

In step S34, the stabilization processing unit 56 executes stabilizing processing, and using the horizontal block information with the current rescaled image and the horizontal block information with a past rescaled image, stabilizes and outputs the horizontal block size information and block border position information.

Figure 31:
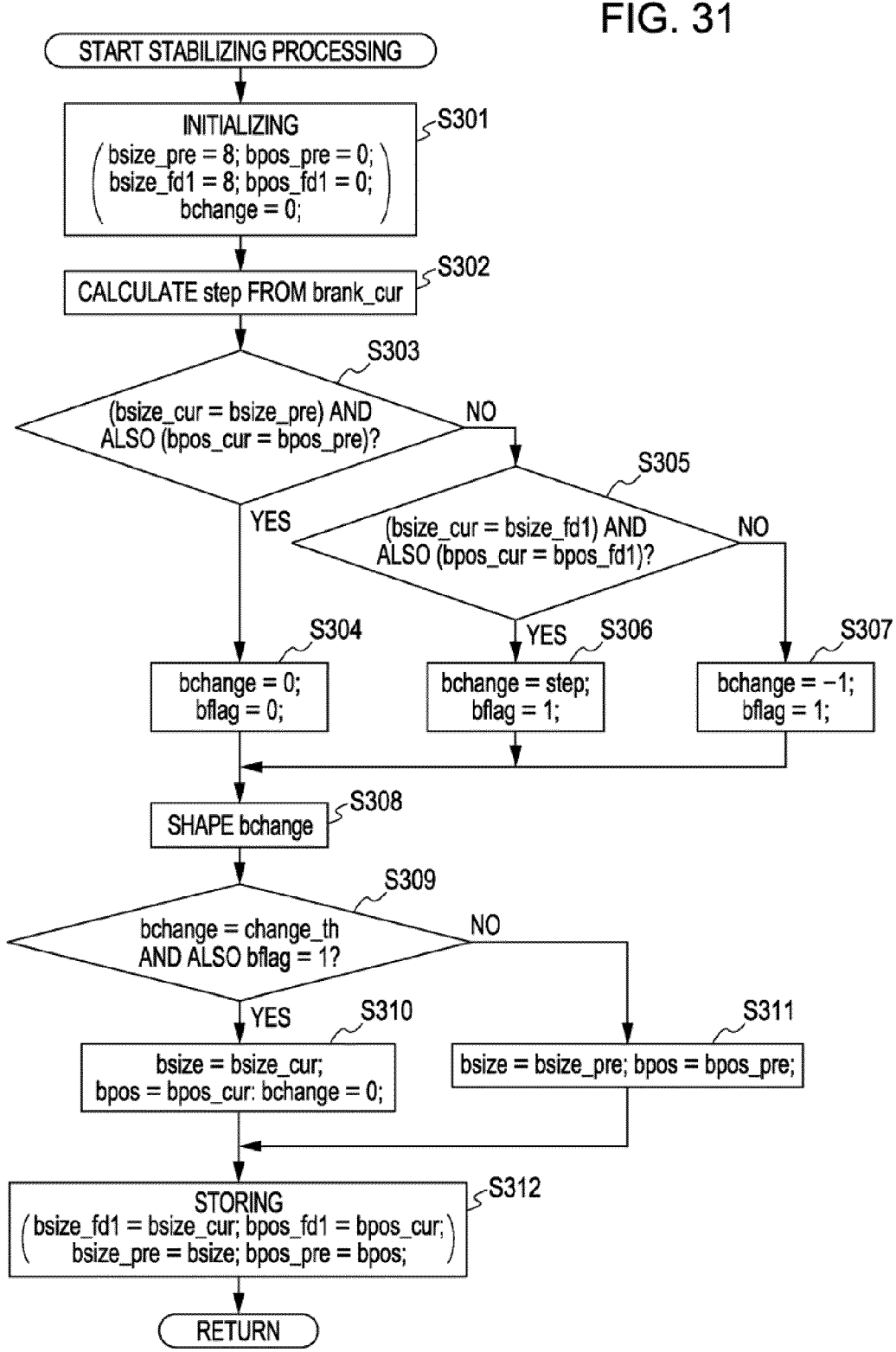
FIG. 31 is a flowchart describing the stabilization processing in FIG. 17.

The stabilizing processing with the stabilization processing unit 56 will be described now with reference to the flowchart in FIG. 31.

In step S301 the stabilization processing unit 56 initializes the horizontal block size bsize_pre subjected to stabilizing processing with the immediately previous rescaled image to 8, the horizontal block border position bpos_pre subjected to stabilizing processing with the immediately previous rescaled image to 0, the horizontal block size bsize_fd1 of the detection results before stabilization processing is performed with the immediately previous rescaled image to 8, the horizontal block border position bpos_fd1 of the detection results before stabilization processing is performed with the immediately previous rescaled image to 0, and the determination value bchange showing whether there are any changes to the determination results to 0, respectively. Note that the processing in step S301 is skipped for the second rescaled image and thereafter.

In step S302, the obtaining unit 201 obtains the horizontal block size bsize_cur, horizontal block border position bpos_cur, horizontal reliability brank_cur, and border condition occurrence total counter btotal as the determination results with the current rescaled image supplied from the determining unit 55, and supplies the horizontal reliability brank_cur to the step calculating unit 202, and the horizontal block size bsize_cur, horizontal block border position bpos_cur, horizontal reliability brank_cur, and border condition occurrence total counter btotal to the immediately previous image information comparing unit 203, immediately previous image information storage unit 207, and selecting unit 211.

At this time, the step calculating unit 202 calculates the control coefficient "step" from the horizontal reliability brank_cur. More specifically, for example the step calculating unit 202 performs calculations such that the control coefficient step=−1 when the horizontal reliability brank_cur is smaller than the predetermined minimum value, such that the control coefficient step=0 when greater than the predetermined minimum value and smaller than the predetermined maximum value, and such that the control coefficient step=1 when greater than the predetermined maximum value.

In step S303, the immediately previous image stabilization information comparing unit 204 reads the horizontal block size bsize_pre and horizontal block border position bpos_pre following stabilizing processing stored in the immediately previous image stabilization information storage unit 208, and determines whether or not the horizontal block size bsize_cur and horizontal block size bsize_pre before the current stabilizing processing are the same and the horizontal block border position bpos_cur and horizontal block border position bpos_pre are the same. That is to say, with the comparison with the immediately previous rescaled image following the stabilizing processing, determination is made as to whether or not the horizontal block size and horizontal block border position are the same.

In the case that in step S303 the horizontal block size bsize_cur and horizontal block size bsize_pre are the same and the horizontal block border position bpos_cur and horizontal block border position bpos_pre are the same for example, in step S304 the immediately previous image stabilization information comparing unit 204 supplies the determination results to the determination value managing unit 205 and change likelihood flag managing unit 209. The determination value managing unit 205 sets the determination value bchange to 0 and stores this in the determination value memory 206. Also, the change likelihood flag managing unit 209 sets the change likelihood flag bflag which indicates whether there is any likelihood of change to 0 which indicates no likelihood, and stores this in the change likelihood flag memory 210.

On the other hand, for example in the case that in step S303 the horizontal block size bsize_cur and horizontal block size bsize_pre are not the same, or that the horizontal block border position bpos_cur and horizontal block border position bpos_pre are not the same, the processing is advanced to step S305.

In step S305, the immediately previous image information comparing unit 203 reads the horizontal block size bsize_fd1 and horizontal block border position bpos_fd1 before stabilizing processing which is stored in the immediately previous image information storage unit 207, and determines whether or not the current horizontal block size bsize_cur before the stabilizing processing and the horizontal block size bsize_fd1 before stabilizing processing of the immediately previous image are the same and the horizontal block border position bpos_cur and horizontal block border position bpos_fd1 are the same. That is to say, with the comparison with the immediately previous rescaled image, determination is made as to whether or not the horizontal block size and horizontal block border position are the same.

In step S305, in the case that determination is made that the current horizontal block size bsize_cur before the stabilizing processing and the horizontal block size bsize_fd1 of the immediately previous rescaled image before stabilizing processing are the same and the horizontal block border position bpos_cur and horizontal block border position bpos_fd1 are the same, in step S306, the immediately previous image information comparing unit 203 supplies the determination results to the determination value managing unit 205 and the change likelihood flag managing unit 209. The determination value managing unit 205 sets the determination value bchange to the control coefficient "step", and stores this in the determination value memory 206. The change likelihood flag managing unit 209 sets the change likelihood flag bflag to 1 which indicates there is a likelihood of change, and stores this in the change likelihood flag memory 210.

On the other hand, in the case that determination is made that the current horizontal block size bsize_cur before the stabilizing processing and the horizontal block size bsize_fd1 of the immediately previous rescaled image before stabilizing processing are not the same or the horizontal block border position bpos_cur and horizontal block border position bpos_fd1 are not the same, in step S307, the immediately previous image information comparing unit 203 supplies the determination results to the determination value managing unit 205 and the change likelihood flag managing unit 209. The determination value managing unit 205 sets the determination value bchange to the control coefficient −1, and stores this in the determination value memory 206. The change likelihood flag managing unit 209 sets the change likelihood flag bflag to 1 which indicates there is a likelihood of change, and stores this in the change likelihood flag memory 210.

In step S308, the determination value managing unit 205 controls the waveform shaping unit 205a to perform waveform shaping of the determination value bchange of the determination value memory 206, and stores this in the determination value memory 206. Specifically, in the case that the determination value bchange is smaller than 0, the determination value managing unit 205 sets the determination value bchange to 0, and in the case that the determination value bchange is greater than the maximum value bchange_th, the determination value managing unit 205 sets the determination value bchange to the maximum value bchange_th, and in other cases, sets the value as it is, thereby subjecting the determination value to waveform shaping.

In step S309, the selecting unit 211 reads the determination value bchange of the determination value memory 206 and the change likelihood flag bflag from the change likelihood flag memory 210, and determines whether or not the determination value bchange is the same as the maximum value bchange_th and the change likelihood flag bflag is 1 which indicates there is a change.

In the case that in step S309 the determination value bchange is the same as the maximum value bchange_th and the change likelihood flag bflag is 1 which indicates there is a change, in step S310 the selecting unit 211 changes the horizontal block size bsize subjected to stabilizing processing to the horizontal block size bsize_cur before stabilizing processing of the current rescaled image, and further, the horizontal block border position bpos subjected to stabilizing processing is changed to the horizontal block border position bpos_cur before stabilizing processing of the current rescaled image, and output. Note that at this time, the selecting unit 211 outputs the horizontal reliability brank_cur of the current rescaled image as the horizontal reliability brank additionally.

On the other hand, in the case that in step S309 the determination value bchange is not the same as the maximum value bchange_th or the change likelihood flag bflag is not 1 which indicates there is a change, in step S311 the selecting unit 211 leaves the horizontal block size bsize subjected to stabilizing processing as the horizontal block size bsize_pre after stabilizing processing of the immediately previous rescaled image, and further outputs the horizontal block border position bpos subjected to stabilizing processing as is as the horizontal block border position bpos_pre of the immediately previous rescaled image after stabilizing processing. Note that at this time, the selecting unit 211 also outputs the horizontal reliability brank_pre of the immediately previous rescaled image as the horizontal reliability brank.

In step S312, the immediately previous image information storage unit 207 updates the horizontal block size bsize_fd1 before stabilizing processing with the stored immediately previous rescaled image to the current horizontal block size bsize_cur before stabilizing processing, and updates the horizontal block border position bpos_fd1 before stabilizing processing to the current horizontal block border position bpos_cur before stabilizing processing, respectively. Also, the immediately previous image stabilization information storage unit 208 updates the horizontal block size bsize_pre after stabilizing processing with the stored immediately previous rescaled image to the current horizontal block size bsize after stabilizing processing, and updates the horizontal block border position bpos_pre after stabilizing processing to the current horizontal block border position bpos after stabilizing processing, respectively. Note that the horizontal reliability brank output at this time is also stored in unshown memory as horizontal reliability brank_pre.

With a comparison between the horizontal block information in the immediately previous rescaled image with the above-described processing, the block size information and block border position information in the horizontal direction can be stabilized and output, and for example, fluttering, wherein the horizontal block size is changed for every image, can be reduced.

Let us now return to the flowchart in FIG. 17.

Upon the stabilizing processing in step S34 ending, the horizontal detecting processing is ended. That is to say, the block size information and block border position information in the horizontal direction is obtained with the horizontal detecting processing.

Figure 16:
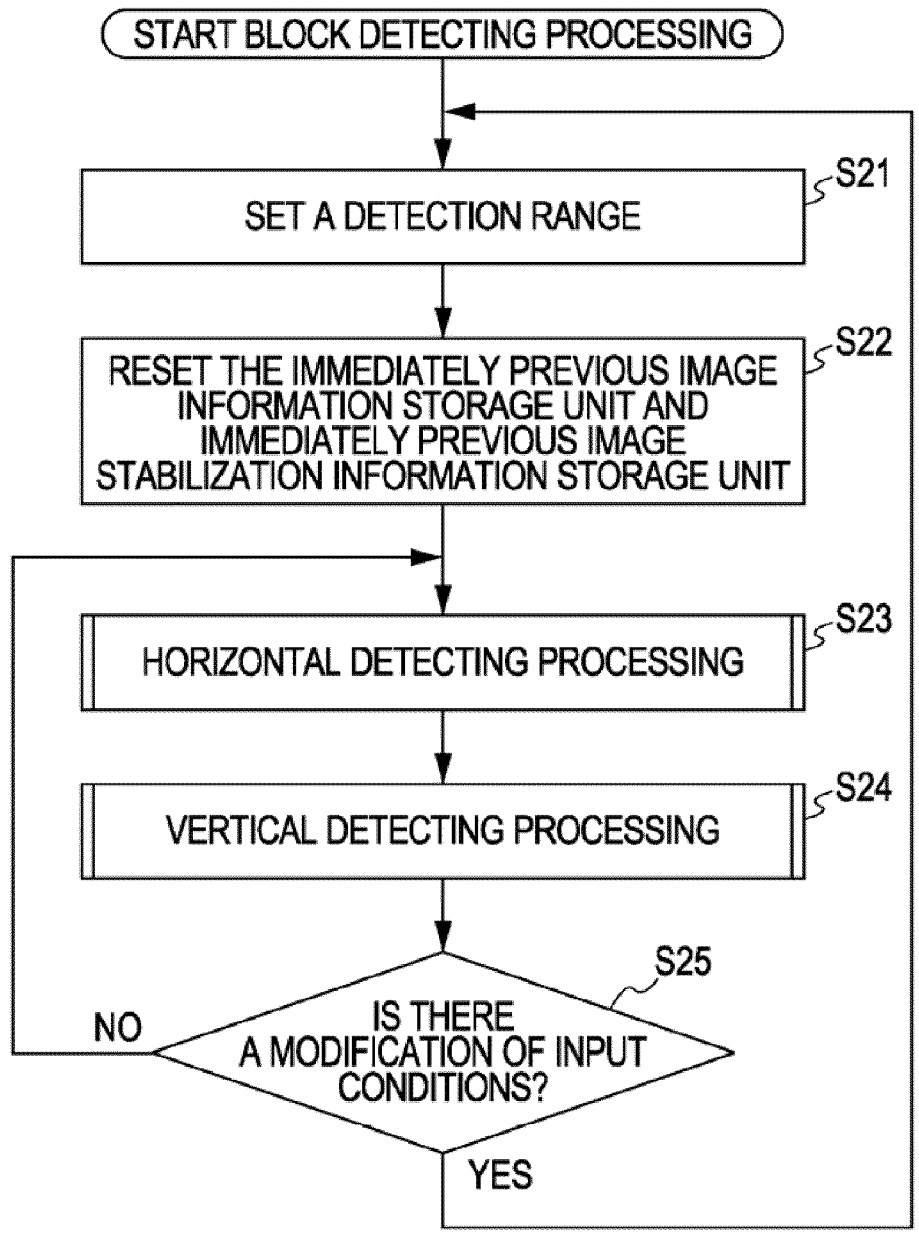
FIG. 16 is a flowchart describing block detecting processing.

Let us now return to the flowchart in FIG. 16.

Upon the horizontal detecting processing in step S23 ending, in step S24 vertical detecting processing is executed with the vertical detecting unit 42 and the vertical block size and vertical block border position are detected.

The vertical detecting processing will be described with reference to the flowchart in FIG. 32.

In step S501, the block level information obtaining unit 501 executes the block level information obtaining processing to obtain block level information, and accumulates this in the distribution information buffer 502.

Figure 33:
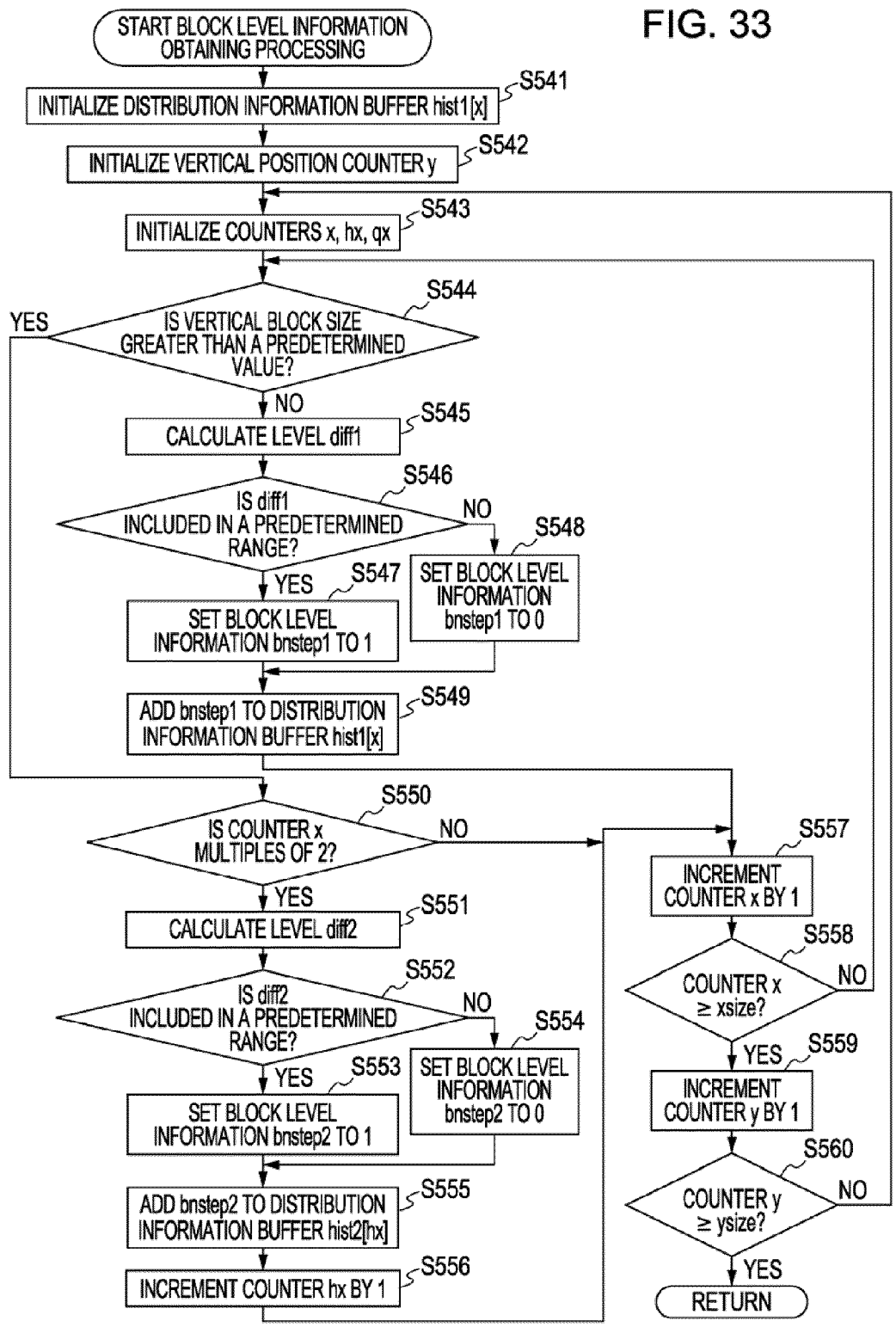
FIG. 33 is a flowchart describing the block level information obtaining processing in FIG. 32.

The block level information obtaining processing will be described now with reference to the flowchart in FIG. 33. Note that with the exception of the processing in step S544, the flowchart in FIG. 33 is similar to the processing in steps S41 through S55 and steps S63 through S66 in the flowchart in FIG. 18, so description thereof will be omitted.

That is to say, in step S544, the size determining unit 541 determines whether or not the detectable vertical block size is greater than a predetermined value, based on the horizontal block size. In the case that determination is made in step S544 that the detectable vertical block size is not greater than the predetermined value, the processing in steps S545 through S549, S557, and S558 is repeated with the position determining unit 542, level calculating unit 543, level storage unit 544, block level feature detecting unit 545, and buffer hist[x] updating unit 546, whereby the distribution information buffer hist[x] which is the same as the narrow area distribution information buffer hist1 is obtained.

On the other hand, in the case that determination is made in step S544 that the detectable vertical block size is greater than the predetermined value, the processing in steps S550 through S558 is executed, whereby the distribution information buffer hist[x] which is the same as the mid-area distribution information buffer hist2 is obtained.

That is to say, the vertical block size is limited beforehand by the horizontal block size, whereby only the distribution information buffer corresponding to the vertical block size has to be obtained, and therefore only one of the narrow area distribution information buffer or mid-area distribution information buffer has to be obtained. Note that with the above description, an example wherein the narrow area distribution information buffer or mid-area distribution information buffer is obtained according to the vertical block size is described, but an in the case wherein an image taking a large vertical block size is handled, an arrangement may be made wherein the wide area distribution information buffer is also obtained. Also, an arrangement may be made wherein any two of the narrow area distribution information buffer, mid-area distribution information buffer, and wide area distribution information buffer are selected to obtain according to the vertical block size.

Figure 32:
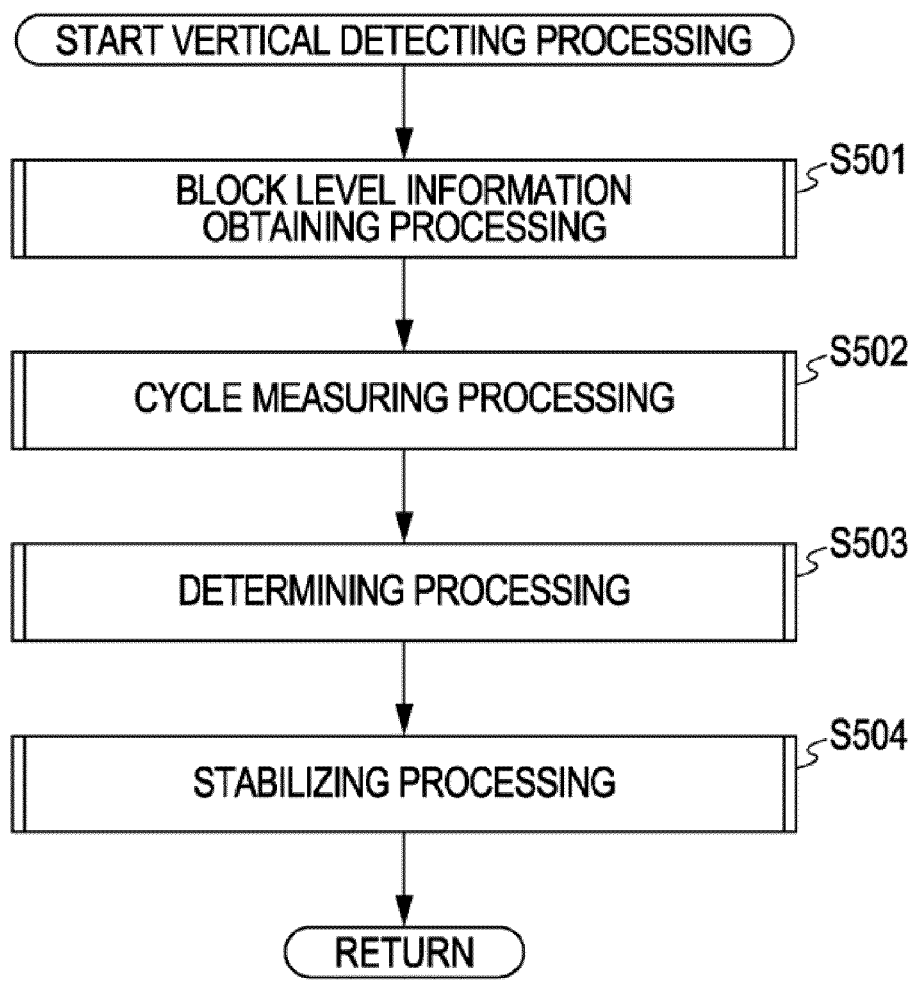
FIG. 32 is a flowchart describing the vertical detecting processing in FIG. 16.

Let us now return to the flowchart in FIG. 32.

Upon the block level information obtaining processing in step S501 ending, in step S502 the cycle measuring unit 503 executes cycle measuring processing to obtain the short cycle buffer.

Figure 34:
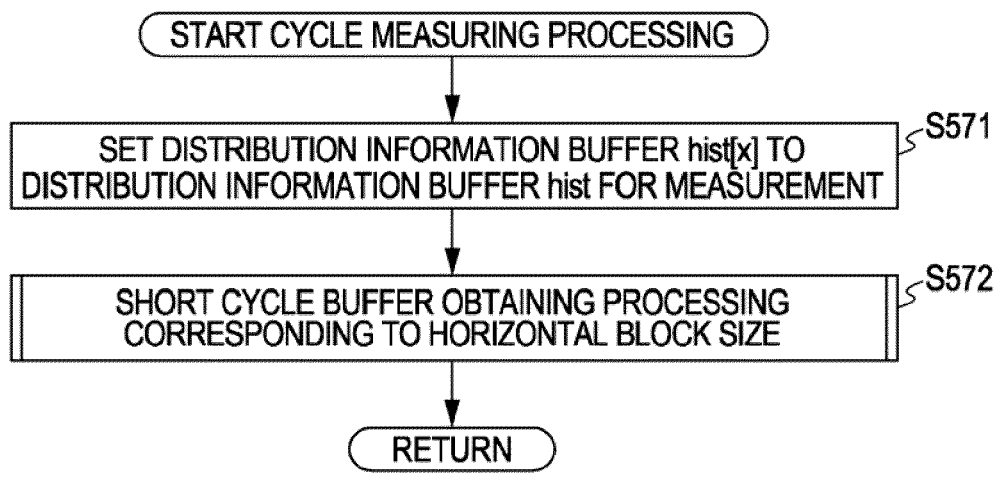
FIG. 34 is a flowchart describing the cycle measuring processing in FIG. 32.

The cycle measuring processing with the cycle measuring unit 503 will be described now with reference to the flowchart in FIG. 34.

In step S571, the cycle measuring unit 503 sets the distribution information buffer for measurement to be processed to the distribution information buffer hist[x] stored in the distribution information buffer 502.

In step S572, the short cycle buffer obtaining unit 562 controls the peak determining unit 591, short cycle buffer updating unit 592, and border condition occurrence total updating unit 593, based on the horizontal block size supplied from the size obtaining unit 561, to execute the short cycle buffer obtaining processing corresponding to the number of pixels of the vertical block size corresponding to the horizontal block size. Note that the short cycle buffer obtaining processing is similar to the processing described with reference to the flowchart in FIG. 24, so description thereof will be omitted.

That is to say, with the vertical processing, the block size is limited beforehand with the horizontal block size, whereby the short cycle buffer obtaining processing only has to be performed for the limited block number.

Let us now return to the flowchart in FIG. 32.

Upon the cycle measuring processing being performed and the short cycle buffer being obtained in step S502, the determining unit 505 executes determining processing and determines the vertical block size and vertical block border position in step S503.

Figure 35:
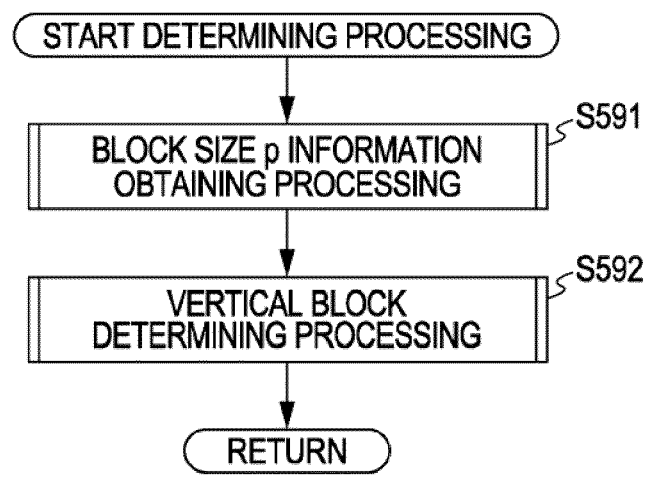
FIG. 35 is a flowchart describing the determining processing in FIG. 32.

The determining processing by the determining unit 505 will be described with reference to the flowchart in FIG. 35.

In step S591, the determining unit 505 executes the block size p information obtaining processing. Note that this processing is similar to the narrow area block size 8 information obtaining processing described with reference to FIG. 26, so description thereof will be omitted.

Upon the block size p information obtaining processing being executed and the block size p information being obtained in step S591, in step S592 the determining unit 505 executes vertical block determining processing based on the determination results of the block size p information obtaining processing to determine the vertical block size and vertical block border position. As a result thereof, the vertical block size bsize_cur, vertical block border position bpos_cur, vertical reliability brank_cur, and border condition occurrence total counter btotal are obtained and output. Note that the vertical block determining processing is similar to the horizontal block size determining processing described with reference to FIG. 30, so description thereof will be omitted.

Let us now return to the flowchart in FIG. 32.

Upon the vertical block size and vertical block border position being determined with the determining processing in step S503, in step S504 the stabilizing processing is performed with the stabilization processing unit 506, and the vertical block size and vertical block border position determined with the determining processing are stabilized. Subsequently, the block size information of the stabilized vertical block, and the block border position information of the vertical block border position are output. Note that the stabilizing processing is similar to the processing described with reference to the flowchart in FIG. 31, so description thereof will be omitted.

Let us now return to the flowchart in FIG. 16.

Upon the vertical detection processing being executed in step S24, in step S25 the block border information detecting unit 32 determines whether or not there are any changes to input conditions, in the case that determination is made that there are no changes, the processing returns to step S23. That is to say, as long as there are no changes to input conditions, the processing in steps S23 through S25 is repeated.

In the case that determination is made in step S25 that there are changes to input conditions, the processing is returned to step S21, and the processing thereafter is repeated.

Note that with the above description, by obtaining the vertical block size after obtaining the horizontal block size, the work to obtain the vertical block size can be omitted, based on the horizontal block size, and processing can be realized at a higher speed.

Also, the block size can be obtained even at a value below the decimal, whereby hereafter, even if various image formats occur, the block size and block border position can be obtained with high accuracy.

Note that with the above description, an example for obtaining the vertical block size after obtaining the horizontal block size has been described, but it goes without saying that an arrangement may be made wherein the horizontal block size is obtained after the vertical block size is obtained. Further, an arrangement may be made wherein only one of the horizontal detection processing or vertical detection processing is used.

With the above-described processing, the block size and block border position can be obtained with high accuracy.

Note that, with the above-mentioned image processing system 10, the scaling rate has been input from the image sending device 11 to the image processing device 12, but an arrangement may be made wherein no scaling rate is input to the image processing device. The configuration of the image processing system in this case is shown in FIG. 36.

Figure 36:
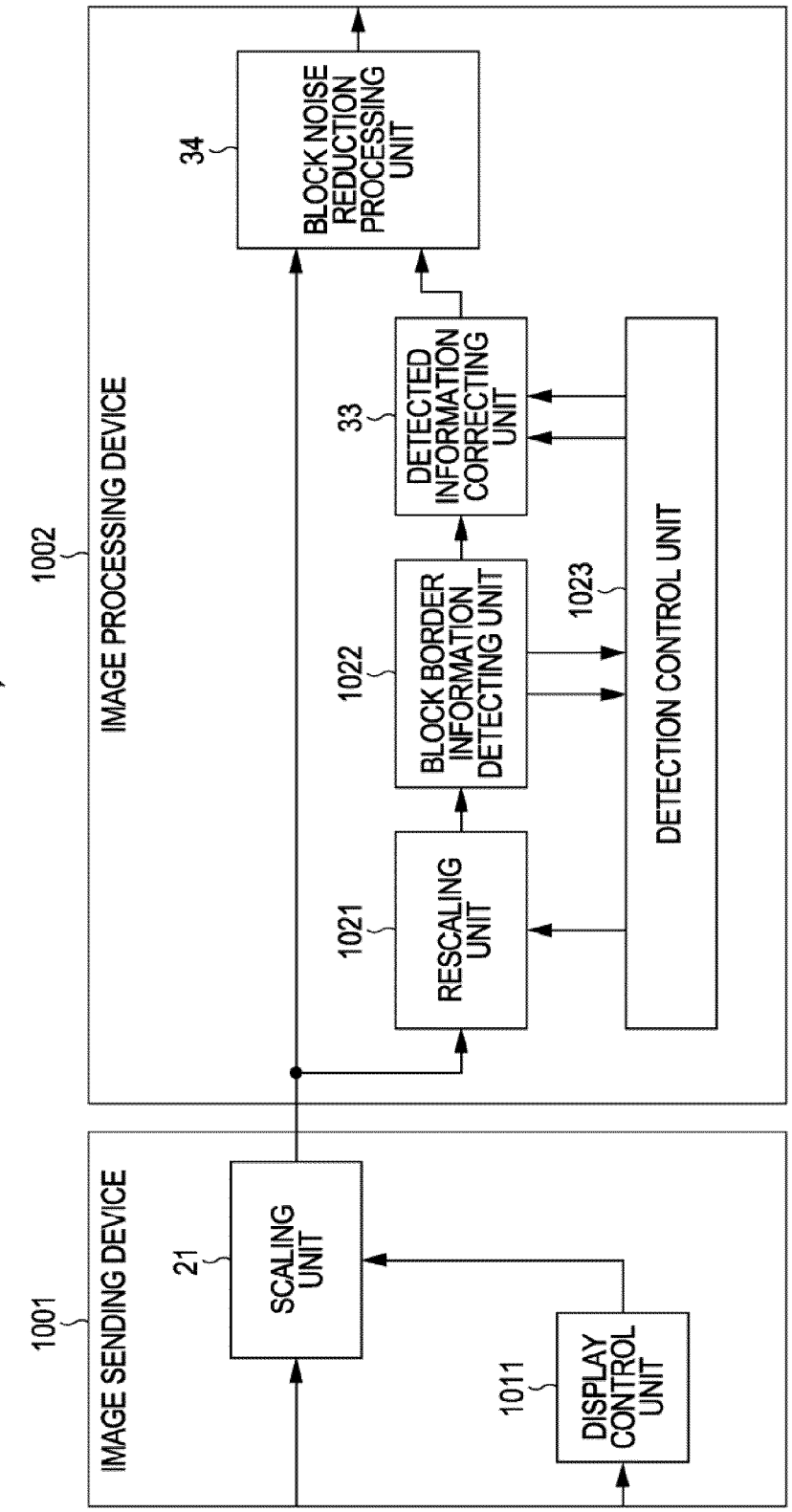
FIG. 36 is a block diagram illustrating a configuration example of another embodiment of the image processing system to which the present invention is applied.

The image processing system 1000 in FIG. 36 is configured of an image sending device 1001 and image processing device 1002. Note that, in FIG. 36, the same components as those in FIG. 1 have been denoted with the same reference numerals, and description thereof becomes redundant description, and accordingly, will be omitted.

The image sending device 1001 is configured of a scaling unit 21 and display control unit 1011, and no scaling rate is input to the image processing device 1002. Specifically, the screen mode of the output image to be output from the image processing device 1001 is input to the display control unit 1011 in the same way as with the display control unit 22 in FIG. 1. The display control unit 1011 determines the scaling rate according to the screen mode in the same way as with the display control unit 22, but the scaling rate thereof is input to the scaling unit 21 alone.

The image processing device 1002 is configured of a detected information correcting unit 33, block noise reduction processing unit 34, rescaling unit 1021, block border information detecting unit 1022, and detection control unit 1023. The image processing device 1002 performs rescaling with multiple scaling rates prepared beforehand, and selects, from a plurality of block size information and block border position information obtained as a result thereof, the optimal block size information and block border position information.

Specifically, the rescaling unit 1021 subjects an input image to be input from the scaling unit 21 to rescaling based on the scaling rate supplied from the detection control unit 1023, and supplies a rescaled image obtained as a result thereof to the block border information detecting unit 1022.

The block border information detecting unit 1022 detects, in the same way as with the block border information detecting unit 32 in FIG. 1, the block size, block border position, and reliability from the rescaled image supplied from the rescaling unit 1021. Subsequently, the block border information detecting unit 1022 supplies the block size information and block border position information obtained as a result thereof to the detection control unit 1023.

Also, the block border information detecting unit 1022 obtains, based on the reliability and border condition occurrence total counter, a rate of the reliability as to the border condition occurrence total counter as a detected concentration rate Q representing a detected concentration rate. The sum of the detected concentration rates obtained regarding each of the horizontal direction and vertical direction is taken as a detected concentration rate Q here. Subsequently, the block border information detecting unit 1022 supplies the detected concentration rate Q obtained as a result thereof to the detection control unit 1023.

The detection control unit 1023 supplies multiple scaling rates prepared beforehand to the rescaling unit 1021 sequentially. Also, the detection control unit 1023 controls the detection results of the block size information and block border position information by the block border information detecting unit 1022.

Specifically, the detection control unit 1023 determines the scaling rate corresponding to the highest detected concentration rate Q of all the detected concentration rates Q supplied from the block border information detecting unit 1022 as the scaling rate optimal for rescaling, identical to the scaling rate with the scaling unit 21, and supplies this to the detected information correcting unit 33. Also, the detection control unit 1023 supplies the block size and block border position corresponding to the optimal scaling rate to the detected information correcting unit 33 as detection results.

Next, the detected concentration rates Q will be described with reference to FIGS. 37A and 37B.

Figure 37A:
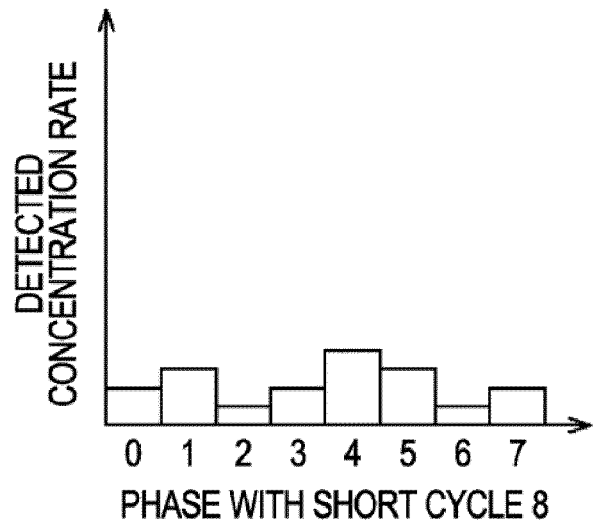
FIGS. 37A and 37B are diagrams illustrating a detected concentration rate.
Figure 37B:
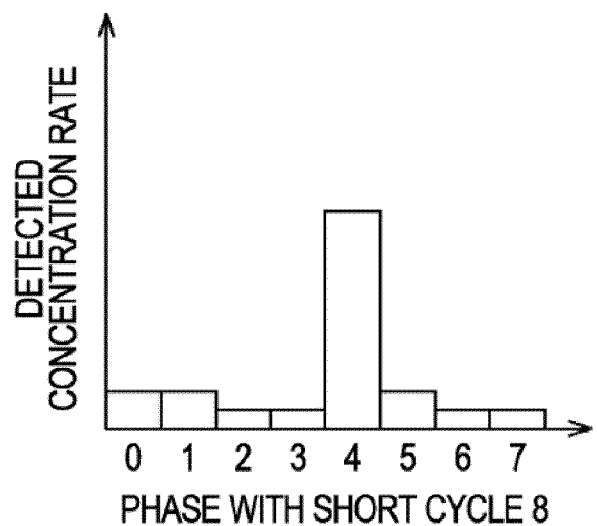

Note that, in FIGS. 37A and 37B, the horizontal axis represents the number of each phase in the case that the short cycle is 8 pixels, and the vertical axis represents the detected concentration rates Q.

In FIGS. 37A and 37B, the number of a phase of which the detected concentration rate Q is the highest is 4, so a phase of which the number is 4 is detected as the block border position. However, in FIG. 37A, there is almost no difference between the detected concentration rate Q in the block border position and the detected concentration rates Q of the other phases, and the detected concentration rate Q in the block border position is low. That is to say, in FIG. 37A, the scaling rate for rescaling differs from the scaling rate with the scaling unit 21, and accordingly, border conditions have not occurred periodically, and the detected concentration rates Q have been averaged.

On the other hand, in FIG. 37B, the detected concentration rate Q in the block border position outstands as compared to the detected concentration rates Q of the other phases, and the detected concentration rate Q in the block border position is high. That is to say, in FIG. 37B, the scaling rate for rescaling is identical to the scaling rate of the scaling unit 21, border conditions have occurred periodically, and occurrences of border conditions have been concentrated on the block border position.

Figure 38:
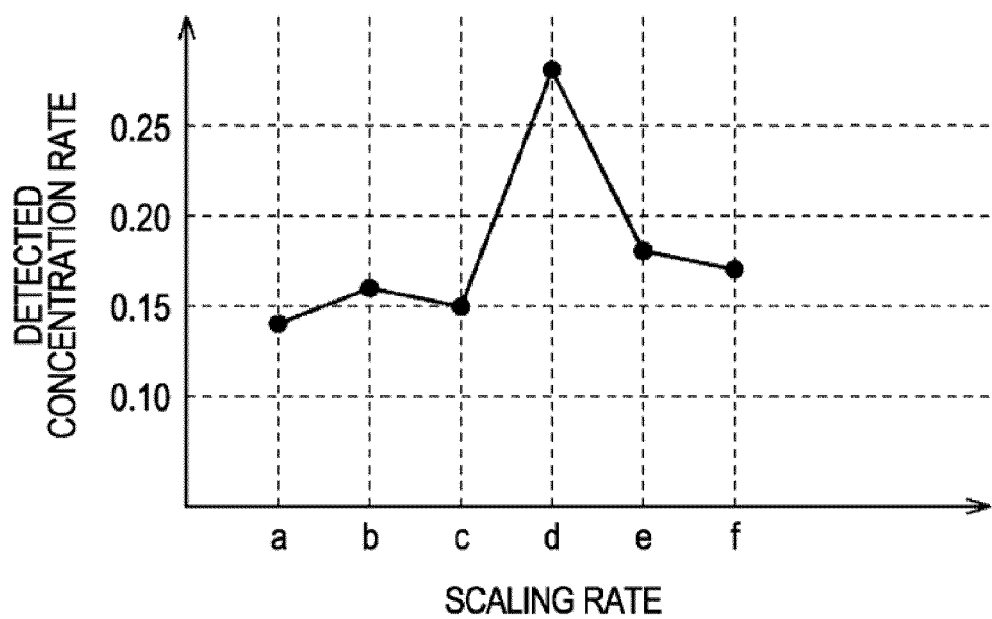
FIG. 38 is a diagram illustrating the detected concentration rate for each scaling.

As described above, the detected concentration rate Q differs according to the scaling rate, and the detected concentration rate Q for each scaling rate is, for example, such as shown in FIG. 38. Note that there are six types of scaling rate of a through f in FIG. 38. Also, in FIG. 38, the horizontal axis represents the types of scaling rate, and the vertical axis represents detected concentration rates.

In the case that the detected concentration rate Q for each scaling rate is such as shown in FIG. 38, the detection control unit 1023 determines the scaling rate d corresponding to the highest detected concentration rate Q as the scaling rate optimal for rescaling, identical to the scaling rate with the scaling unit 21.

Figure 39:
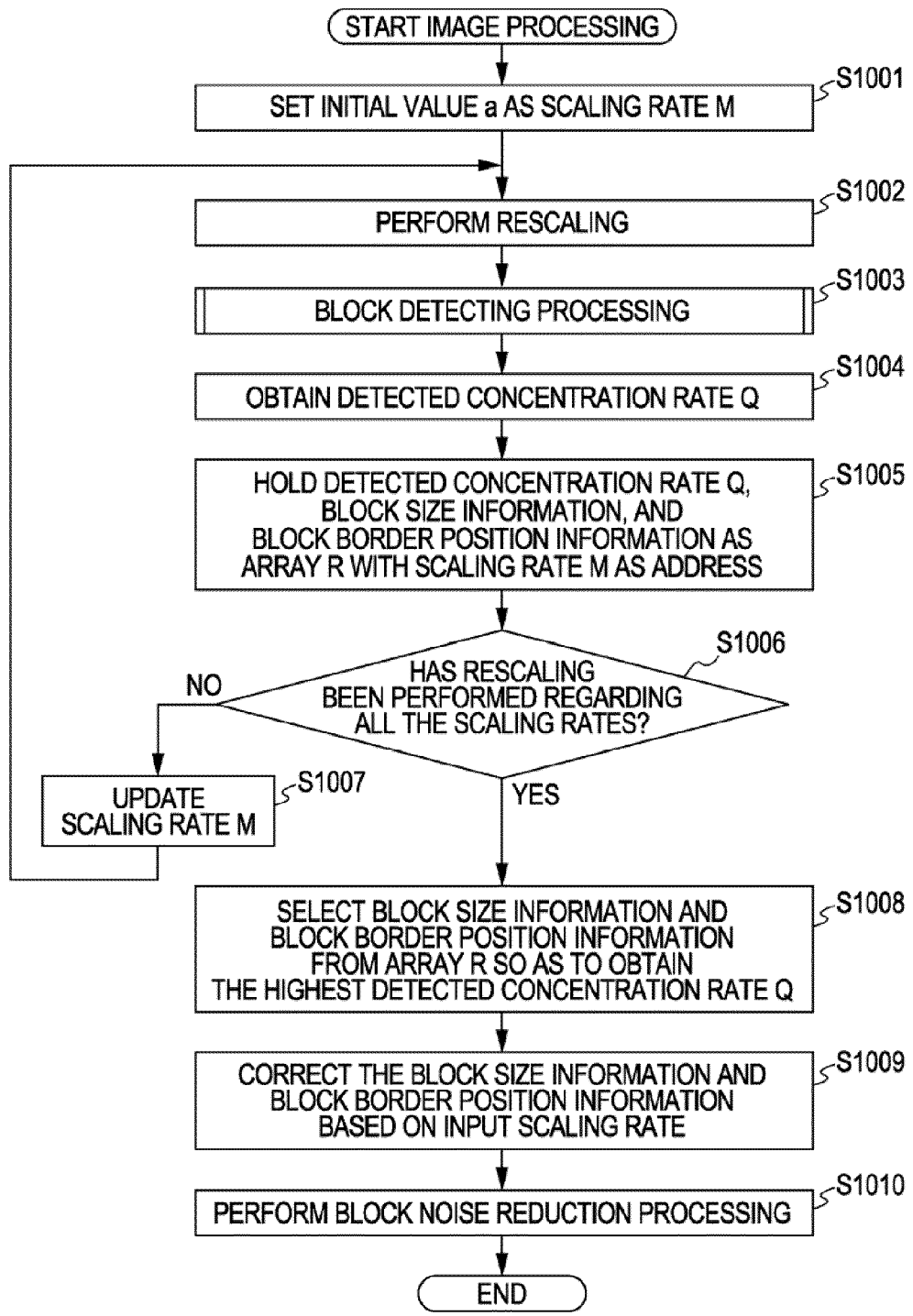
FIG. 39 is a flowchart describing image processing according to the image processing device in FIG. 36.

Next, the image processing by the image processing device 1002 in FIG. 36 will be described with reference to the flowchart in FIG. 39. This image processing is started, for example, when an input image is input from the image sending device 1001.

In step S1001, the detection control unit 1023 sets the initial value a of the scaling rate as the scaling rate M for rescaling. Subsequently, the detection control unit 1023 supplies the scaling rate M thereof to the rescaling unit 1021.

In step S1002, the rescaling unit 1021 performs, based on the scaling rate M supplied from the detection control unit 1023, in the same way as with the rescaling unit 31 in FIG. 1, subjects an input image to be input from the scaling unit 21 to rescaling. Subsequently, the rescaling unit 1021 supplies the rescaled image obtained as a result thereof to the block border information detecting unit 1022.

In step S1003, the block border information detecting unit 1022 subjects the rescaled image to block detecting processing. This block detecting processing is the same as the block detecting processing in FIG. 16, so description thereof will be omitted.

In step S1004, the block border information detecting unit 1022 obtains the detected concentration rate Q based on the reliability and border condition occurrence total counter obtained by the block detecting processing, and outputs this to the detection control unit 1023.

In step S1005, the detection control unit 1023 holds the detected concentration rate Q supplied from the block border information detecting unit 1022, block size information, and block border position information in built-in memory (not shown) as an array R with the scaling rate M as address.

In step S1006, the detection control unit 1023 determines whether or not rescaling has been performed regarding all the scaling rates prepared beforehand, i.e., whether or not all the scaling rates prepared beforehand have been set to the scaling rate M.

In the case determination is made in step S1006 that rescaling has not been performed regarding all the scaling rates prepared beforehand, in step S1007 the scaling rate M is updated to a scaling rate prepared beforehand that has not been set yet. Subsequently, the processing is returned to step S1002, and the processing thereafter is repeated.

On the other hand, in the case determination is made in step S1006 that rescaling has been performed regarding all the scaling rates prepared beforehand, in step S1008 the detection control unit 1023 selects the block size information and block border position information from the array R such that the detected concentration rate Q is the highest, and supplies the block size information and block border position information thereof, and the scaling rate M serving as the address corresponding thereto to the detected information correcting unit 33.

In step S1009, the detected information correcting unit 33 corrects the block size information and block border position information supplied from the detection control unit 1023 based on the scaling rate to be input from the detection control unit 1023.

In step S1010, in the same way as with the processing in step S14 in FIG. 6, based on the block size information and block border position information corrected by the detected information correcting unit 33, the block noise reduction processing unit 34 changes the strength of the block noise reduction processing as to the input image in an adaptive manner, thereby reducing the block noise of the input image. Subsequently, the block noise reduction processing unit 34 outputs the block noise reduction processed image obtained as a result thereof as an output image.

As described above, the image processing devices 12 and 1002 subject the input scaled image to rescaling to restore the block size thereof, and then detect the block size and block border position with an integer cycle, whereby the block size and block border position of the rescaled image can be detected accurately. As a result thereof, even in the case that the input image has been subjected to scaling with an arbitrary scaling factor, the block size and block border position detected from the rescaled image are corrected according to the scaling rate, whereby the block size and block border position of the input image can be detected accurately.

On the other hand, in the case that the block size and block border position are detected with an integer cycle by employing the input image subjected to scaling as is, with the detection employing the original image before scaling, as shown in FIG. 37B, even in the case that the detected concentration rate protrudes in the block border position, in the case that the scaling rate is 105 or the like, border conditions do not occur periodically, and as shown in FIG. 37A, the detected concentration rates are averaged. As a result thereof, the block size and block border position fail to be detected accurately.

Also, with the image processing devices 12 and 1002, as described above, the block size and block border position of the input image can be detected accurately, and accordingly, the block noise of an input image of which the decode information such as the block size, block border position, and so forth is not input in a correlated manner, can be reduced. Note that the detection method of the block size and block border position is not restricted to the above-mentioned method.

Incidentally, the above-described series of image processing may be executed with hardware or may be executed with software. In the case of executing the series of processing with software, a program configuring such software is installed from a storage medium onto a computer wherein dedicated hardware is built in, or onto a general-use personal computer or the like, for example, wherein various functions can be executed by installing various types of programs.

FIG. 40 shows a configuration example of a general-use personal computer. This personal computer has a built-in CPU (Central Processing Unit) 1051. An input/output interface 1055 is connected to the CPU 1051 via a bus 1054. The bus 1054 is connected to ROM (Read Only Memory) 1052 and RAM (Random Access Memory) 1053.

The input/output interface 1055 is connected to an input unit 1056 made up of an input device such as a keyboard, mouse, and so forth for a user to input operation commands, an output unit 1057 to output processing operation screens and processing result images on a display device, a storage unit 1058 made up of a hard disk drive or the like to store programs and various types of data, and a communication unit 1059 to execute communication processing via a network represented by the Internet, made up of a LAN (Local Area Network) adapter or the like. Also, a drive 1060 to read and write data as to a removable media 1061 such as a magnetic disk (including flexible disk), optical disk (including CD-ROM (Compact Disc-Read Only Memory) and DVD (Digital Versatile Disc)), magneto-optical disk (including MD (Mini Disc)), a semiconductor memory, or the like is also connected thereto.

The CPU 1051 executes various types of processing according to the program stored in the ROM 1052, or the program that is read from a removable media 1061 such as a magnetic disk, optical disc, magneto-optical disk, semiconductor memory, or the like, and installed on a storage unit 1058, and loaded from the storage unit 1058 to the RAM 1053. Data for the CPU 1051 to execute various types of processing is also stored as appropriate in the RAM 1053.

Note that, with the present Specification, the term "system" means the entirety of equipment configured of multiple devices.

Also, with the present Specification, steps describing the program recorded in the recording medium include processing performed in a time-series manner in the order described as a matter of course, but are not restricted to processing in a time-series manner, and processing executed in parallel or individually is also encompassed thereby.

The present application contains subject matter related to that disclosed in Japanese Priority Patent Application JP 2008-168055 filed in the Japan Patent Office on Jun. 27, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device comprising:
   a rescaling means configured to obtain an image subjected to scaling, and subject the image to rescaling with the scaling rate of the image;
   a block border information detecting means configured to detect a block size and a block border position from the image after rescaling;
   a detected information correcting means configured to correct the block size and the block border position detected by the block border information detecting means based on the scaling rate; and
   a detection control means configured to control the detection results of the block size and the block border position;
      wherein the rescaling means subjects the image to rescaling with each of a plurality of scaling rates;
      wherein the block border information detecting means detects the block size and the block border position from each of a plurality of the images obtained as a result of rescaling with each of the plurality of scaling rates, and also obtains a detected concentration rate representing the concentration rate of the detection thereof;
      wherein the detected information correcting means corrects the block size and the block border position that serve as the detection results based on the scaling rate corresponding to the highest detected concentration rate; and
      wherein the detection control means takes as detection results the block size and the block border position that correspond to the detected concentration rate that is the highest of a plurality of the block sizes and a plurality of the block border positions detected by the block border information detecting means.

2. The image processing device according to claim 1, wherein the rescaling means obtains the scaling rate.

3. An image processing method for an image processing device that processes an image subjected to scaling, comprising the steps of:
   obtaining the image subjected to scaling to subject the image to rescaling with the scaling rate of the image;

detecting a block size and a block border position from the image after rescaling;

correcting the block size and the block border position detected by the processing in the detecting step based on the scaling rate; and controlling the detection results of the block size and the block border position;

wherein subjecting the image to rescaling comprises subjecting the image to rescaling with each of a plurality of scaling rates;

wherein detecting the block size and the block border position comprises:

detecting the block size and the block border position from each of a plurality of the images obtained as a result of rescaling with each of the plurality of scaling rates, and obtaining a detected concentration rate representing the concentration rate of the detection thereof;

wherein correcting the block size and the block border position comprises correcting the block size and the block border position that serve as the detection results based on the scaling rate corresponding to the highest detected concentration rate; and wherein controlling the detection results of the block size and the block border position comprises taking as detection results the block size and the block border position that correspond to the detected concentration rate that is the highest of a plurality of the block sizes and a plurality of the block border positions detected.

4. A non-transitory computer-readable medium causing a computer to serve as an image processing device comprising:

a rescaling means configured to obtain an image subjected to scaling, and subject the image to rescaling with the scaling rate of the image;

a block border information detecting means configured to detect a block size and a block border position from the image after rescaling;

a detected information correcting means configured to correct the block size and the block border position detected by the block border information detecting means based on the scaling rate; and a detection control means configured to control the detection results of the block size and the block border position;

wherein the rescaling means subjects the image to rescaling with each of a plurality of scaling rates;

wherein the block border information detecting means detects the block size and the block border position from each of a plurality of the images obtained as a result of rescaling with each of the plurality of scaling rates, and also obtains a detected concentration rate representing the concentration rate of the detection thereof;

wherein the detected information correcting means corrects the block size and the block border position that serve as the detection results based on the scaling rate corresponding to the highest detected concentration rate; and wherein the detection control means takes as detection results the block size and the block border position that correspond to the detected concentration rate that is the highest of a plurality of the block sizes and a plurality of the block border positions detected by the block border information detecting means.

5. An image processing device comprising:

a rescaling unit configured to obtain an image subjected to scaling, and subject the image to rescaling with the scaling rate of the image;

a block border information detecting unit configured to detect a block size and a block border position from the image after rescaling;

a detected information correcting unit configured to correct the block size and the block border position detected by the block border information detecting unit based on the scaling rate; and a detection control unit configured to control the detection results of the block size and the block border position;

wherein the rescaling unit subjects the image to rescaling with each of a plurality of scaling rates;

wherein the block border information detecting unit detects the block size and the block border position from each of a plurality of the images obtained as a result of rescaling with each of the plurality of scaling rates, and also obtains a detected concentration rate representing the concentration rate of the detection thereof;

wherein the detected information correcting unit corrects the block size and the block border position that serve as the detection results based on the scaling rate corresponding to the highest detected concentration rate; and wherein the detection control unit takes as detection results the block size and the block border position that correspond to the detected concentration rate that is the highest of a plurality of the block sizes and a plurality of the block border positions detected by the block border information detecting unit.

6. A non-transitory computer-readable medium causing a computer to serve as an image processing device comprising:

a rescaling unit configured to obtain an image subjected to scaling, and subject the image to rescaling with the scaling rate of the image;

a block border information detecting unit configured to detect a block size and a block border position from the image after rescaling;

a detected information correcting unit configured to correct the block size and the block border position detected by the block border information detecting unit based on the scaling rate; and a detection control unit configured to control the detection results of the block size and the block border position;

wherein the rescaling unit subjects the image to rescaling with each of a plurality of scaling rates;

wherein the block border information detecting unit detects the block size and the block border position from each of a plurality of the images obtained as a result of rescaling with each of the plurality of scaling rates, and also obtains a detected concentration rate representing the concentration rate of the detection thereof;

wherein the detected information correcting unit corrects the block size and the block border position that serve as the detection results based on the scaling rate corresponding to the highest detected concentration rate; and wherein the detection control unit takes as detection results the block size and the block border position that correspond to the detected concentration rate that is the highest of a plurality of the block sizes and a plurality of the block border positions detected by the block border information detecting unit.

* * * * *